United States Patent
Huang

(10) Patent No.: US 11,343,368 B2
(45) Date of Patent: *May 24, 2022

(54) ENHANCED SYSTEM AND METHOD FOR FULLY AUTOMATED REVERSE LOGISTICS PLATFORM

(71) Applicant: Future Dial, Inc., Sunnyvale, CA (US)

(72) Inventor: George Huang, Los Altos Hills, CA (US)

(73) Assignee: Future Dial, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/898,814

(22) Filed: Jun. 11, 2020

(65) Prior Publication Data

US 2020/0304623 A1 Sep. 24, 2020

Related U.S. Application Data

(63) Continuation of application No. 16/393,857, filed on Apr. 24, 2019, now Pat. No. 10,708,406.

(60) Provisional application No. 62/662,719, filed on Apr. 25, 2018.

(51) Int. Cl.
*H04M 1/72406* (2021.01)
*G06Q 10/00* (2012.01)
*G06F 9/4401* (2018.01)
*G06F 11/36* (2006.01)

(52) U.S. Cl.
CPC ...... *H04M 1/72406* (2021.01); *G06F 9/4406* (2013.01); *G06F 11/366* (2013.01); *G06F 11/3688* (2013.01); *G06Q 10/20* (2013.01); *G06Q 10/30* (2013.01)

(58) Field of Classification Search
None
See application file for complete search history.

(56) References Cited

U.S. PATENT DOCUMENTS

| 10,708,406 | B2 | 7/2020 | Huang | |
|---|---|---|---|---|
| 2012/0043231 | A1* | 2/2012 | Perrier | G06F 1/1628 206/216 |
| 2014/0278244 | A1* | 9/2014 | Humphrey | G01N 21/01 702/182 |
| 2016/0171544 | A1* | 6/2016 | Heminger | G01S 19/13 705/14.55 |
| 2016/0284019 | A1* | 9/2016 | Bowles | G06K 9/4661 |

(Continued)

*Primary Examiner* — Ernest G Tacsik
(74) *Attorney, Agent, or Firm* — Greenberg Traurig

(57) ABSTRACT

Disclosed are systems, methods, and computer-readable media for inspecting mobile devices. In one embodiment, a method is disclosed comprising executing a de-trash operation on a mobile device, the de-trash operation resulting in the removal of extraneous material attached to the mobile device; categorizing an operating system of the mobile device; connecting the mobile device to a reading device and installing one or more software applications on the mobile device, the one or more software application operable to read one or more identifiers from the mobile device; visually inspecting the mobile device and classifying the physical condition of the mobile device; performing a functional test on the mobile device upon determining that the physical condition of the mobile device is free of defects; and removing all test data from the mobile device after performing the functional test and flashing the mobile device with a new operating system image.

22 Claims, 81 Drawing Sheets

(56) References Cited

U.S. PATENT DOCUMENTS

2018/0129595 A1\* 5/2018 Seo ................... G06F 11/3672
2019/0227917 A1\* 7/2019 Henry ................ G06F 11/3664
2019/0335033 A1\* 10/2019 Huang ................. G06Q 10/20

\* cited by examiner

ENHANCED SYSTEM AND METHOD FOR FULLY AUTOMATED REVERSE LOGISTICS PLATFORM

CROSS-REFERENCE TO RELATED APPLICATIONS

The present application is a continuation of U.S. patent application Ser. No. 16/393,857 filed Apr. 24, 2019, which claims the benefit of U.S. Provisional App. Ser. No. 62/662,719 filed Apr. 25, 2018, the entire disclosures of which applications are hereby incorporated herein by reference.

The present application is related to Prov. U.S. Pat. App. Ser. No. 62/598,394, filed Dec. 13, 2017 and entitled "System and Method for Identifying Best Location for 5G In-Residence Router Location", U.S. patent application Ser. No. 15/681,233, filed Aug. 18, 2017 and entitled "System and Method for Enhanced Retail Device Testing and Evaluation", and U.S. patent application Ser. No. 15/162,421, filed May 23, 2016 and entitled "Using Automatically Collected Device Problem Information to Route and Guide Users' Requests", which is a continuation of U.S. patent application Ser. No. 13/797,327, filed Mar. 12, 2013 and issued as U.S. Pat. No. 9,363,367 on Jun. 7, 2016, which claims priority to Prov. U.S. Pat. App. Ser. No. 61/762,797, filed Feb. 8, 2013.

The entire disclosures of the applications above are hereby incorporated herein by reference.

BACKGROUND

Often, transferring data in phones can be very cumbersome. In particular, modern phones may hold multiple gigabytes of data comprising pictures and other graphical representations, address records, emails, etc. A lot of overhead going through the applications creates a data bottleneck for service stations and other stores that offer such data transfer services.

FIG. 1 shows two typical telephone/PDA device data transfer stations. In FIG. 1A, transfer station 100 has a phone data transfer machine (PDTM) 110, typically a PC with USB and Bluetooth connectivity running phone data transfer applications such as PC Suite, PC Tools and other phonebook transfer applications, which typically may connect to two handsets: originating handset 101 and a receiving handset 102. Said connections are typically made via USB cables 103 or custom cables 104. Each phone has its own operating system with software 101a and 102a, respectively, and data sets 101b1-n and 102b1-n, respectively. This data may contain a variety of information, including, but not limited to, address book data, phone numbers, email addresses, pictures, video clips, and other types of data that may be used by cell phones and their applications. In some cases even the applications installed on the phone and/or the application data may be transferable. Typically, machine 110 would have its own operating system 110a, which has multiple programs 110b. Often, machine 110 with operating system 110a and programs 110b is actually a custom, dedicated PC, and as such it has to contain drivers or DLLs 110c for all the phones to which it may be connected. As a result of having a large library of DLLs (or drivers, used interchangeably here) almost any data transfers between two different phones can work. The machine can, by using the DLLs, communicate and download the data objects (each item typically comes down as one or more data objects from the phone), which are then stored in machine 110 temporarily and eventually sent on to the other phone, as its data objects, using the matching DLL. Each of these devices has a CPU and memory, both volatile and nonvolatile, and thus each forms a small, distinct computing device.

FIG. 1B shows another type of known data transfer station 120. Copy machine 121 has only one connector. It is first plugged into the originating machine 101, using connection 105, via which connection the data is transferred into machine 121. Then the receiving device 102 is connected by a cable connection 106 (dotted) in a second step, and that connection is used to transfer the data from machine 121 to phone 102. Again, these devices have operating systems, programs, and DLLs, as described above in the discussion of FIG. 1A.

A large cost is inflicted on cellular network operators by the user practice of returning devices for repair or exchange that are not actually defective. There are several reasons for this problem: some operating intermittencies may not be caught during in store testing of a defective device, or the problem may be caused by peripheral devices that are not returned with the supposedly faulty phone. A large portion of the problem may be attributed to user configuration errors, network configuration errors, or user software add-ons that are installable in the phone but may not be completely compatible with the particular phone set up and its particular network. Only a small fraction of returns are due to actual failure of the hardware. However, efficient and expedient repair of handsets is very important, because the cost of each handset repair affects the final profitability of an operator. One of the most important aspects of handset repair is efficiently achieving a specific level of program and data sets in a repaired handset.

When large numbers of phones are returned or exchanged, often manual handling is required. Also, often, operating systems and software require manual input that can not be automated for security reasons. In large volumes, the costs can easily add up.

When taking returns at point of sales, an objective evaluation system and method is important, as the lack of such a system can quickly lead to losses of a financial nature through overpaying for buybacks, and also to a loss of confidence in customers who exchange information with friends, relatives and acquaintances and can quickly feel treated unfairly if not treated objectively.

In some cases, more thorough diagnostics of devices with problems are needed than the diagnostics that are available currently. These diagnostics should not merely rely on internal functional diagnostics, but they should also include hardware configuration diagnostics, program configuration diagnostics, and network configuration diagnostics; and they should also look for other factors, including but not limited to program compatibility issues.

Often, the exchange of data objects between different phones is desired or required. Some phones do not support such a feature; other phones have a very limited ability in this regard. For example, such phones may allow exchange of an object such as a business card, but do not support exchange of photos, videos or other larger graphic images.

In some cases wired telephone connections may be difficult or impossible due to defective connectors, unavailable infrastructure, etc.

Some telephone devices are notoriously difficult to access with an in-store diagnostic device, be it wirelessly or via wired connection. In the context of universal serial bus (USB) devices, the manufacturers are supposed to use vendor ID (VID) and product ID (PID) numbers to distinctly identify every product.

These VID/PID numbers are often also used in other connectivity schemes, including but not limited to Bluetooth (BT), local area network (LAN) and over the Internet. These access problems occur due to various legitimate or not-so-legitimate reasons, and more frequently, device manufacturers either re-use the same VID/PID numbers for different devices to save money on registration fees, or in other cases, a fly-by-night garage-style manufacturer clandestinely produces a series of few hundred or a few thousand devices and then closes up shop. This is often because such phones infringe copyrights or other intellectual property, pretending to be brand-name manufacturers' phones, but using different components, such as chips. Despite these problems, it is sometimes desirable for an operator, such as, for example, an independent store operator, to provide service nevertheless, doing so to maintain good customer relations, rather than to rebuff or annoy a customer.

In many cases, it is desirable to back up the data on a mobile communication device with a back-up device that does not require a connection to a standard computer, such as, for example, the exemplary computer of FIG. 7. For example, when a person with a mobile communication device is traveling away from the office, sometimes it is necessary or desirable to travel without a computing device such as a laptop computer; however, a person may still need to back up the data in his or her mobile communication device.

Often in some settings, such as quality control, mass reprogramming, or incoming materials check, it is necessary to run multiple devices, such as smartphones or tablets, at the same time. Depending on the situation, the batteries of these devices may be mostly or completely exhausted. Because many of the newer devices require upwards of 2 amperes (A) of charge current, often as much as up to 3 A, normal hubs or computers can not deliver sufficient power for multiple devices.

Previous co-pending patents (content incorporated above and throughout) describe a system and method in which mobile devices may be collected at sales points or other customer points of access and then shipped to a central facility for processing. However, one undesirable result of this approach is that devices may still be locked when the processing begins, and the user is not available to provide unlocking information. In other cases, the process of receiving, shipping to the processing facility, and processing the device may takes much time that by the time the device is ready for shipping several weeks may have elapsed, and during that time period, the device may have dropped in value (up to 50 percent per week, in some cases). For example, when a new model of a particular device is released, the value of the old model may drop immediately and precipitously. Thus such a prolonged processing time may create substantial damages to the entity holding the inventory.

Various embodiments of the present disclosure may be implemented in computer hardware, firmware, software, and/or combinations thereof. Methods of the present disclosure can be implemented via a computer program instructions stored on one or more non-transitory computer-readable storage devices for execution by a processor. Likewise, various processes (or portions thereof) of the present disclosure can be performed by a processor executing computer program instructions. Embodiments of the present disclosure may be implemented via one or more computer programs that are executable on a computer system including at least one processor coupled to receive data and instructions from, and to transmit data and instructions to, a data storage system, at least one input device, and at least one output device. Each computer program can be implemented in any suitable manner, including via a high-level procedural or object-oriented programming language and/or via assembly or machine language. Systems of the present disclosure may include, by way of example, both general and special purpose microprocessors which may retrieve instructions and data to and from various types of volatile and/or non-volatile memory. Computer systems operating in conjunction with the embodiments of the present disclosure may include one or more mass storage devices for storing data files, which may include: magnetic disks, such as internal hard disks and removable disks; magneto-optical disks; and optical disks. Storage devices suitable for tangibly embodying computer program instructions and data (also called the "non-transitory computer-readable storage media") include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

In some cases, a system for testing and reprogramming mobile communication devices, such as, for example, cellular phone, tablets, etc., may enable parallel connection of a large number of devices via, typically, USB cables, to connectors in the system box, with indicator lights for communicating to an operator the device status and readiness. Further, in such a system only one step may be required to charge the device to an operational state, without operator interaction.

In other cases, a system for testing and reprogramming mobile communication devices may enable parallel connection of a large number of devices to connectors in the system box, with the system using different sequences to test, verify, securely delete content, and reprogram devices. Further, the system analyzes problems such as, for example, bricked devices, dead batteries, and unprogrammable and unstable devices, and collects information about of the quality of devices based on their different sources. In addition, the system may collect data about the efficiency of the operators connecting and removing devices at any one system box, or about operators at multiple systems in one testing facility. The system may then communicate its collected data to a central server.

In some cases, a system may include with a computer containing software for processing both data and programs on mobile devices. Further, the system may perform a quick evaluation of said mobile device and where feasible, may determine the current commercial value of the mobile device based on make, model, physical condition and other parameters associated with device. Additionally the system includes a tower containing a number of lockable compartments connected to the computer. Each compartment can receive a mobile device, and an application on a mobile device, such as a tablet, of an authorized user can lock the compartment so the device in the compartment can be tested for certain parameters. After a successful test, the system makes an offer to the device owner, and upon legally binding electronic acceptance of the offer, the system locks the drawer of the owner's device and back up into secure local storage the owner's data as needed, with determination of the need based on questions presented to the owner during or immediately after the presentation and/or acceptance of the offer. Then the owner's address book is processed, so it is available as quickly as possible so the owner can then transfer it to a new device without undue delay. Subsequently, large bulk data can be transferred in a throttled mode, on a first-come, first-serve manner. Additionally, the system makes provisions for the onward disposition logistics of the owner's device, based on information supplied by or in conjunction with the entity taking possession of the device.

In some cases, a system for migration of computer content, including but not limited to applications and various types of data, from one computing device, such as, for example, a smartphone, a phablet, a tablet, or other, similar device, and from cloud services to another device and other cloud services may create a map showing what content needs to be migrated, and where to, so that that the content can be transferred to the new device and/or one or more cloud services upon activation of the new device.

In some cases, a system may simulate a human user touching the screen of a device, such as a cell phone or similar, that has a capacitive touch screen, with the device positioned on a touch simulator that has a matrix of individually addressable, electric structures based on an LCD display. In such a system, a camera may photograph the device screen and transmit the resulting images to a computer, where the interactions of the touch simulator and the device are recorded. Additionally, software on a computer can create scripts for future, similar interactions, using the stored images to test similar devices for functionality. Alternatively, the system may simulate human touch on the device screen through a matrix of individually addressable, XY resolved electric structures based on inflatable tubes.

In some cases, an attachment to a mobile device, such as a smart cell phone, may enable a 5G signal to be detected and scanned. This signal and other environmental information, including but not limited to view, GPS, Wi-Fi and other radio signals, etc., may be recorded concurrently to create a map of the environment that could be stored so an application could calculate the optimal location for a gateway type router. Thus a 5G signal from the outside could be fed securely and reliably to all rooms of a unit in a building, enabling the use of 5G communication devices inside buildings with poor or no reception, in some cases by translating the communication to an alternate band such as 4G or Wi-Fi. Such a scan could include also immediate adjacent areas outside a unit. This software could be the primary method to determine the optimal location for such a router. Additionally, the data may be sent to a technician for further review leading to determination of a preferred location, and in some cases, the user's permission must be obtained to share the data before sending the data to the technician for review.

BRIEF SUMMARY

In one embodiment, the method comprises executing a de-trash operation on a mobile device, the de-trash operation resulting in the removal of extraneous material attached to the mobile device; categorizing an operating system of the mobile device; connecting the mobile device to a reading device and installing one or more software applications on the mobile device, the one or more software application operable to read one or more identifiers from the mobile device; visually inspecting the mobile device and classifying the physical condition of the mobile device; performing a functional test on the mobile device upon determining that the physical condition of the mobile device is free of defects; and removing all test data from the mobile device after performing the functional test and flashing the mobile device with a new operating system image.

In another embodiment, the apparatus comprises one or more robotic arms; a processor; and a storage medium for tangibly storing thereon program logic for execution by the processor, the stored program logic comprising: executing a de-trash operation on a mobile device, the de-trash operation resulting in the removal of extraneous material attached to the mobile device, categorizing an operating system of the mobile device, connecting the mobile device to a reading device and installing one or more software applications on the mobile device, the one or more software application operable to read one or more identifiers from the mobile device, visually inspecting the mobile device and classifying the physical condition of the mobile device, performing a functional test on the mobile device upon determining that the physical condition of the mobile device is free of defects, and removing all test data from the mobile device after performing the functional test and flashing the mobile device with a new operating system image.

In another embodiment, a computer-readable media comprises computer program instructions defining the steps of: executing a de-trash operation on a mobile device, the de-trash operation resulting in the removal of extraneous material attached to the mobile device; categorizing an operating system of the mobile device; connecting the mobile device to a reading device and installing one or more software applications on the mobile device, the one or more software application operable to read one or more identifiers from the mobile device; visually inspecting the mobile device and classifying the physical condition of the mobile device, performing a functional test on the mobile device upon determining that the physical condition of the mobile device is free of defects; and removing all test data from the mobile device after performing the functional test and flashing the mobile device with a new operating system image.

Today large volumes of mobile devices, such as cellular telephones, tablets, etc., are recycled and often refurbished. As part of the process, they need to be inspected, catalogued, cleaned of user personal identifiable information (PII) or user data, and applications installed, as well as updated to the most recent operating system (OS) and applications (apps) as required by the customer. Then these devices can be resold to new users.

Currently, this refurbishing process requires multiple steps on different, specialized workstations, and such a multi-step process requires lots of manual interaction, which is both error-prone and expensive.

In some cases, a mobile device such as a smart phone or smart computing device may be connected to a network, and an operating system, an application for communicating to other devices, and applications are installed. This device may be a wireless device, a smart phone or a tablet, a mobile communication device, and/or a wearable device; and it may be connected to a wireless communication network. These applications may enable a user to pursue additional interests, including but not limited to listening to and/or creating music, viewing and/or editing documents, viewing and/or creating videos, consuming and/or creating video games, participating in social networks, etc. on the device. Additionally, software may be installed to follow user activities on the device and to catalogue and record these activities. Further, based on activities, device accessories used in the activities, and on service plans to which the user has subscribed, a user profile is created. The system may then compare this user profile to other user profiles that match at least in one of the groups of accessories, activities, and service plans and then determines whether the user could benefit from adding one of the other groups that other users have. Thus the system may determine whether an upsell opportunity exists, in which case an offer for additional products and/or services that would enable a user to take advantage of additional offerings to make better use of his device and/or services may be extended to the user.

The system and method described herein is installed at a point of acceptance for devices that may be a store selling new devices, or it may be a dedicated point of acceptance for returns, or any other similar, suitable location. At this point of acceptance the system can test devices for functionality, memory, model, current value, and other characteristics. Importantly, the system can determine a specific value for the returned device and immediately offer the owner that value for the device, to be applied to the purchase of another device, should the owner accept the offer. When, and if, the owner accepts the offer, the system can remove and secure the personal data from the old device and save it to a location from which the owner can load the data onto the selected replacement device. Then, in most cases, the system can process the device so that it is suitable, after being processed, to be offered as a replacement device to subsequent customers, requiring, additionally, only some cleaning and packaging with necessary accessories, such as, for example, a power supply, a charging cable, etc.

In the 5G phone environment, one of the biggest challenges is that the 5G signal mostly behaves much more like visible light than previous generations of mobile device signals. Than characteristic can create all kinds of problems to make phones work inside apartments, homes, etc., as the waves barely work away from windows and also do not spread well inside buildings, even with very light walls or simple furniture.

The system and method disclosed herein utilizes proprietary software known to the inventor to execute certain operations, typically on a previously activated mobile communication device, such as, for example, a smart phone. These operations may include reading the device automatically and delivering an application to the handset, which application identifies the device to a robot throughout the process.

Some of this software, including applications, has been previously disclosed herein, but some other applications are given out by original equipment manufacturers (OEMs) of the handsets under NDA only. While the details of these applications may not be discussed, enough of their characteristics can be incorporated to enable the understanding or even recreation of a full system, without violating any of these NDAs.

One of the applications in the system identifies to the system hardware and other applications the specific make, model and some or all features of the device and the tests that need to be performed via QR code, Bluetooth and/or WiFi. Further, this application can visually grade the cosmetic condition of the device and functionally test and clear the device of all data prior to warehousing the device for resale or repair.

The system and method disclosed herein can integrate with a client's warehouse management and shop floor control system so all information is visible throughout the processing and is recorded properly in the client's operational records. Further, the system digitally certifies device receipt, cosmetic condition, functional test results, and removal of all customer information. All information, other than specific customer information, sometimes also referred to as Personally Identifiable Information or PII, is available for future reference.

In some cases, a system may know all requirements for the Mobile Reverse Logistics process to read, test, classify, and clear a device being returned to a warehouse for processing.

DETAILED DESCRIPTION

Figure 1B:
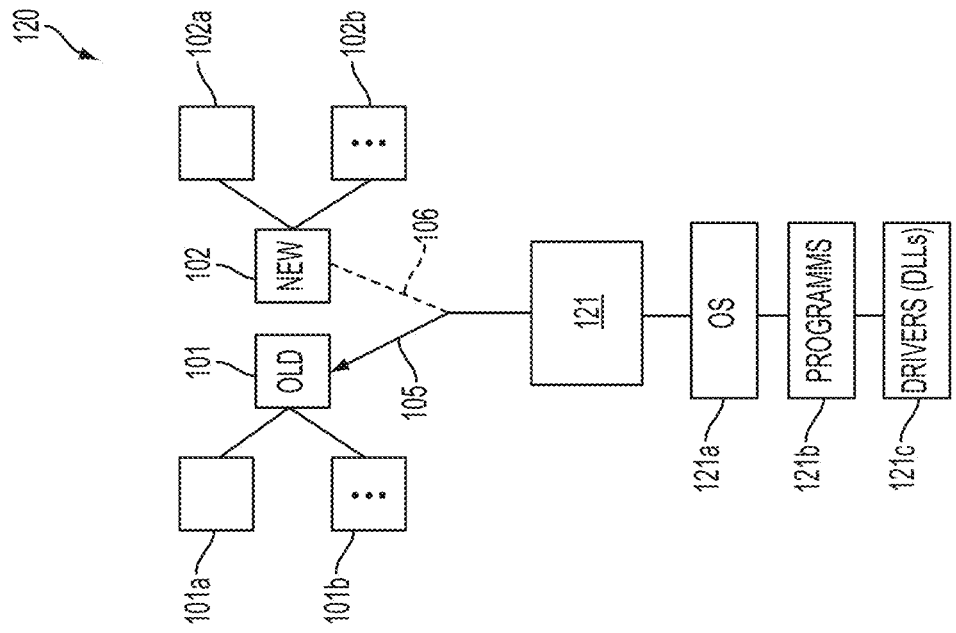
FIGS. 1A and 1B show an exemplary conventional telephone/PDA device data transfer station.
Figure 1A:
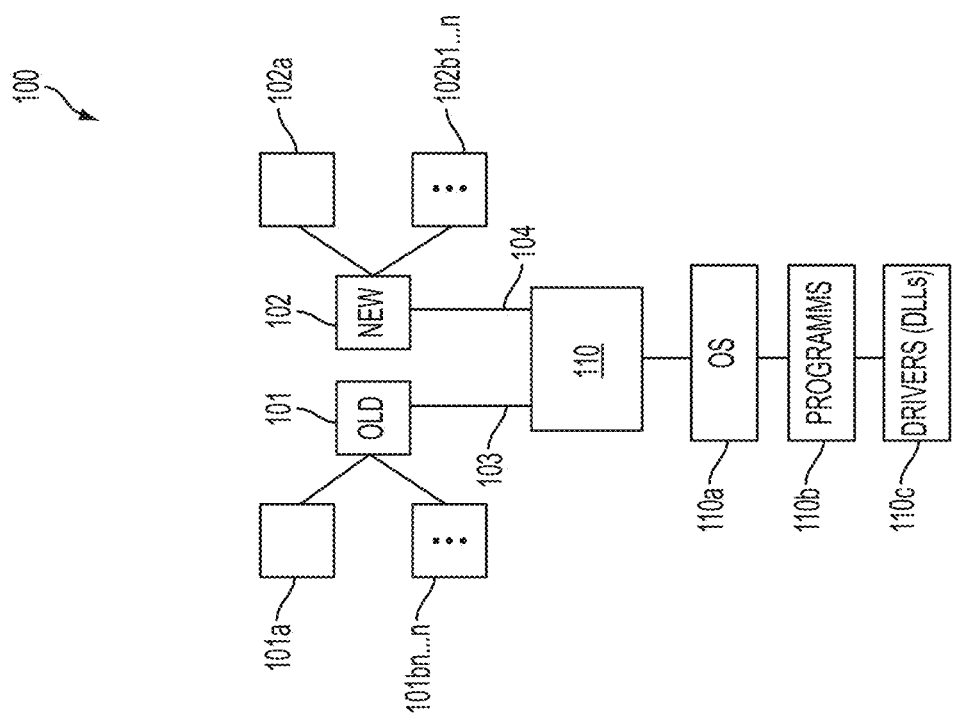

What is needed is a system and method for tracking and detecting device failures, and by doing so analyzing the problems and detecting the incorrect return of hardware, thus reducing dramatically the overall cost of network operations.

Additionally needed is an enhanced system and method to collect information about faults and problems mostly created by misbehaving or malicious applications. However, any problems between applications and operating system, driver, hardware, other apps, or any combination thereof due to software incompatibilities of hardware or of software installed in said mobile computing device can be observed and recorded. Also needed is an enhanced system and method that not only takes into account statistical data collected from software recording, but further adds information gleaned from social networking sites, technical forum sites, etc., relevant to the specific models of mobile communication devices.

What is further needed is a system and method that allows data transfer between phones without requiring PDTMs such as 110 or 121, thus allowing the user to transfer data at his own pace and, if multiple transfers must be done, they can be done concurrently, because limited resources, such as copy machine 110 or 121, are generally not required.

Further, it is desired, that such a system operates cross-platform. For example currently, a Palm device can beam to another Palm device and a Nokia device can beam to another Nokia device, but currently a Palm device cannot beam to a Nokia device and vice versa, or to phones manufactured by any other manufacturer, by in large. Some exceptions exist within limited groups of some devices by different manufacturers that use same operating systems.

What is further needed is a system and method that, using a small, portable device such as a USB key, can create backups directly from mobile communication and personal computing devices.

What is additionally needed is a system and method for tracking and detecting device failures, and by doing so analyzing the problems and detecting the incorrect return of hardware, thus reducing dramatically the overall cost of network operations.

Additionally needed is a system and method for reducing the number of interactions required to take in, catalog, charge, test, clean of PII, and update OS and apps as needed.

In most cases, manufacturers need to preload client software to at least one if not both devices for a beaming operation to work. In an embodiment, the present invention does not require client software to be pre-installed. In this respect, the device containing the "old" data can be communicated with as if a computer is communicating with the device. This functionality is generally is supported on the mobile phone devices, even on older models, in their stock configuration without additional special purpose applications being installed. In an embodiment, the "old" phone is interfaced with using stock interfaces already on the phone, for example by an application installable on a PC that allows the PC to read from devices through a USB cable without first having to pre-install a client. Further, the wireless technology used by the device does not matter, as it can read can read from both CDMA and GSM phones, like the PC based tool.

What is clearly needed is a system and method to simulate manual touch on devices such as phones, preferably without requiring movable parts that simulate fingers, as these would wear out quickly.

What is needed is a system and method that enables a returned device to be evaluated in the most objective form and manner possible, with the least personal judgment required by the reviewer. Also needed is a system and method for keeping the reviewer honest by keeping optimal track of all steps of the reviewer.

What is clearly needed is a novel approach that can take those signals from a gateway location in a residence or in rooms of some other type of unit in a building, for example, a window or door, either directly or with a simply attached antenna, and then, for example, redistribute it inside room by room either on different frequencies, such as 4G femto cells, or via an intermediate signal such as Wi-Fi to a device or to a further distribution point in another room.

Figure 2:
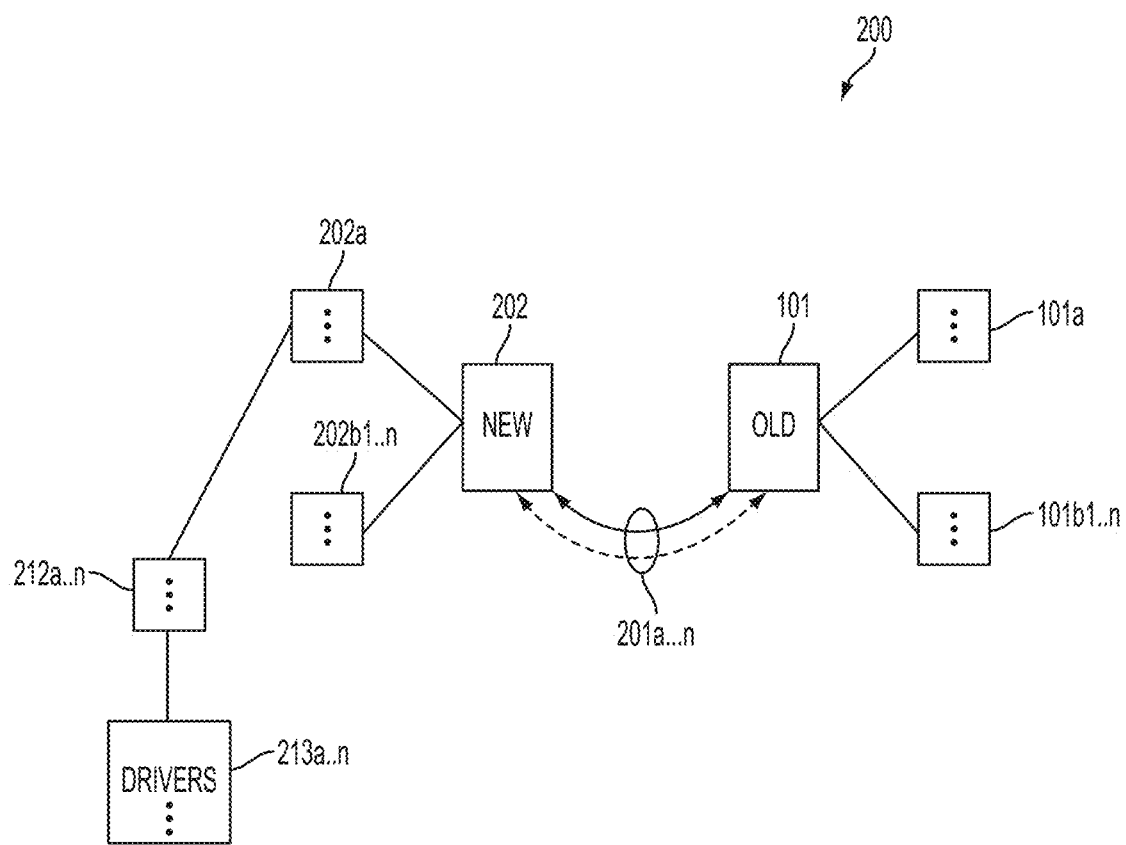
FIG. 2 an example of a typical telephone/personal data assistant ("PDA") device data transfer station which can be utilized with the system and method according to the disclosed subject matter.

FIG. 2 shows an example of a system 200 according to one embodiment of this disclosure. In this example, the receiving phone 202 may be connected, either by wired or wireless connection, to the originating phone 101, as indicated by connection lines 201*a-n*. This connection could be via Wi-Fi ad hoc connection, Bluetooth connection, wired connection, or in some embodiments an over-the-air network connection. In an embodiment, the originating phone 101 has, as before, an operating system 101*a* and a data set 101*b*1-*n*. The receiving phone 202 has the same software; however, additionally, the operating system 202*a* contains applications 212*a-n*, at least one of which (referred to herein as 212*x*, not shown) is the copying software. This software may be, for example, downloaded from a network provider and installed in the phone or, in some embodiments, pre-installed in the phone by the manufacturer. More than one type of copying software may be required, depending on the various different phones involved in a transfer, but requiring only one application for a given new phone. Copying software 212*x* has access to a complete set of drivers and DLLs 213*a-n*, which drivers and DLLs may be required for various different phones. The complete library of drivers and DLLs may be pre-installed in the originating phone and updated through the Internet. In some embodiments, these drivers and DLLs 213*a-n* may not be downloaded until phones 202 and 101 are paired, so that only the driver(s) and DLL(s) for the specific paired devices are downloaded. In other embodiments, some or all available drivers and DLLs may be downloaded, but some or all drivers and DLLs may be removed later to free up memory in the receiving device 202. As previously mentioned, devices such as phone 202, and optionally phone 101, are generally known as smart phone computing devices or other mobile Internet/computing devices, including, but not limited to, smart phones, tablets, etc. Typically these devices have a very powerful CPU, a relatively large amount of memory of different kinds (including but not limited to RAM, flash, removable media, etc.), input devices, display devices, speaker, microphone, and other such components and a software operating system 202*a*, so that they are actually fully functional, hand-held computing platforms, with functionality limited only by their size and sometimes by restrictions of their operating system 202*a*. In some embodiments, the copy software and adapted or simulated DLLs may be adapted to run on the phone's operating system ("OS"), and in other embodiments an additional OS that runs within a protected environment (similar to a virtual machine) but allows use of unmodified DLLs may be provided.

What is additionally needed is a system and method for processing devices at the point of acceptance and exchanging the device for another satisfactory, working device, so the customer leaves with the transaction fully executed. Further, a reduction of time spent by customer for the processing of the return device is needed.

Figure 3:
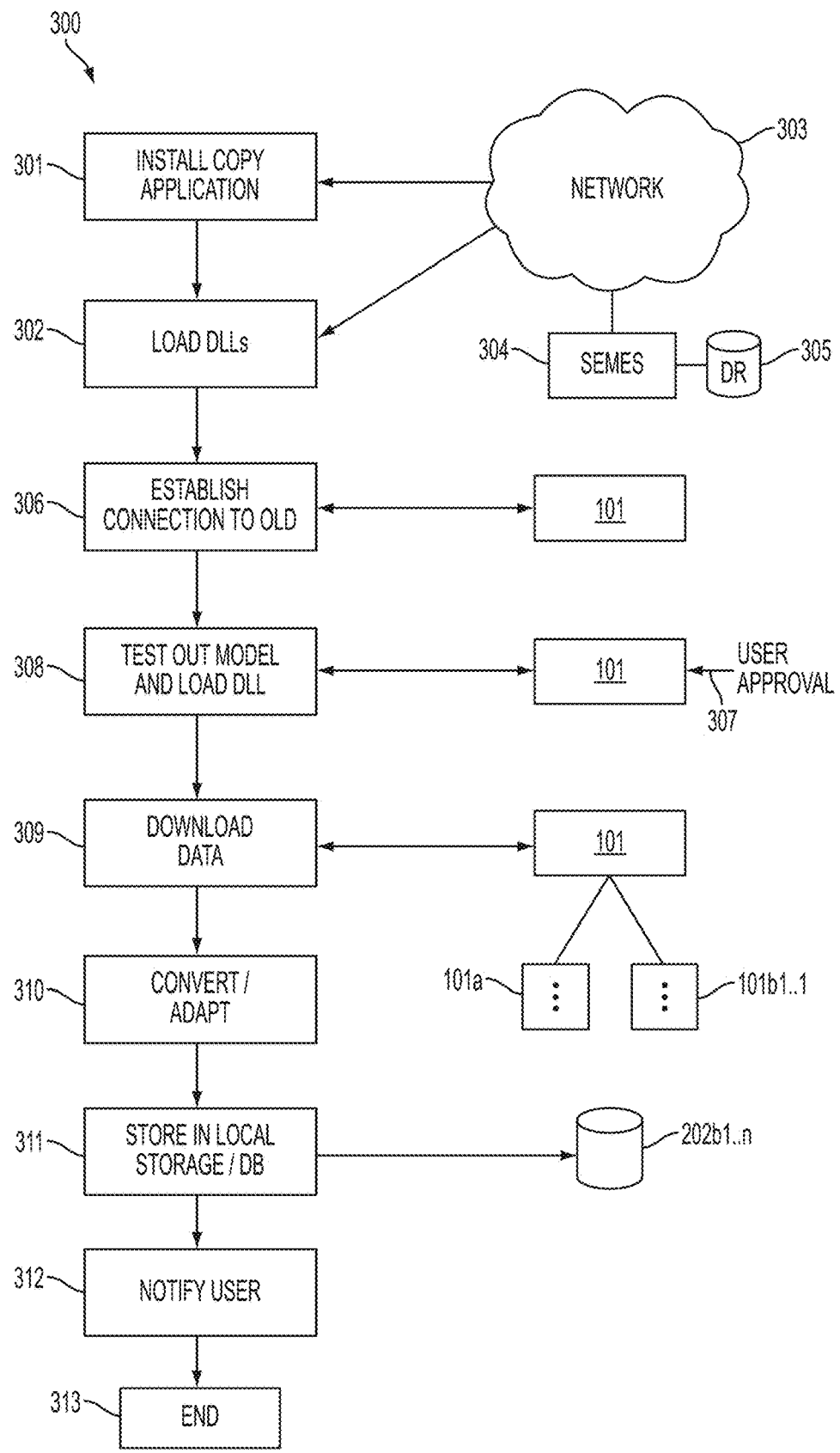
FIG. 3 shows an exemplary process for data transfer.

FIG. 3 shows an exemplary process 300 for data transfer according to one embodiment of the disclosed system. In step 301 the copy application is downloaded into a receiving phone such as phone 202. In this example, the download is via network 303 from data repository 305 that resides in server 304 and that contains copy applications for all supported phones. In step 302, DLLs are loaded into device 202, also from data repository 305 in server 304. As mentioned previously, this step may occur only after connection with an originating phone such as phone 101 is established. In step 306, the connection is established with originating phone 101. As previously described, this connection may be made via any of various types of connectivity means that are currently known in the art or that may in the future be developed and made publicly available. In all cases, the connection process would involve a confirmation or pass code, such as the process currently used for the connection of Bluetooth devices. In some cases, this connection would actually be between two Bluetooth devices, but in other cases a similar process could be emulated via the phone number and passwords over the network or over a physical wire. In step 308 the system tests the originating device 101 to determine its specific model. This testing typically requires some user approval 307 or a user action on the originating phone, either of which may also act as a privacy protection (sometimes it may be part of communication protocols, such as pairing of BlueTooth devices. etc.). Then typically the DLL 213x for that specific model is loaded for use by the copying software 212x. This DLL could be loaded from the library downloaded in step 302, or it could be requested from the data repository 305 via over-the-air network or other suitable connections. In step 309, the system downloads data from device 101. To the internal intelligence (software and firmware) of device 101, this process appears to occur just as if the device were connected to a computer. In step 310 the system then converts or adapts the downloaded data objects to the requirements of the receiving phone 202 by means of another DLL, which essentially mimics the process of the download to internal database 202b1-n. In step 311 the data is then downloaded into database 202b1-n. In step 312 the user is notified that the data download is complete, and in step 313 the process ends. Progress of the various procedures may be displayed to the user via progress bars on the display device of the receiving phone, showing the progress as a percentage of the overall process or as a percentage of a typical process. Such a progress display is commonly used and well known in computing devices.

Figure 4:
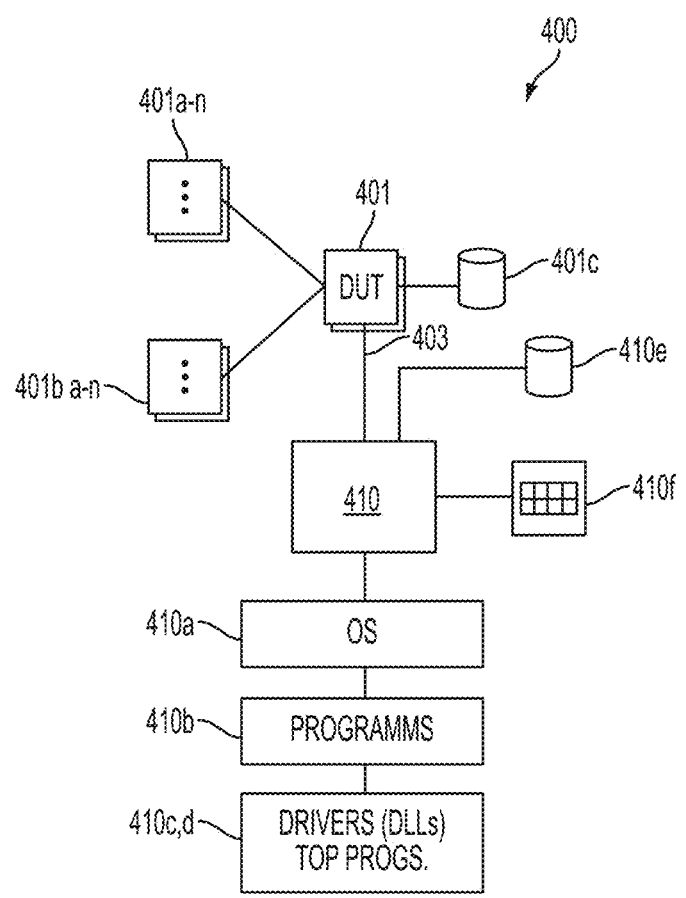
FIG. 4 shows an overview of an exemplary transfer station.

FIG. 4 shows an overview of an exemplary station 400 similar to typical telephone/PDA device data transfer stations as are currently in use. In FIG. 4, phone data transfer machine (PDTM) 410 is typically a PC or other suitable computing device with USB and Bluetooth connectivity running phone data transfer applications such as PC Suite, PC Tools and other phonebook transfer applications, which typically may connect one or two handsets, such as the handset of a device under test (DUT) 401 as shown in FIG. 4. Said connections are typically made via USB cables 403 or custom cables 404 (not shown). Each phone has its own operating system with software 401a and data sets 401b1-n. This data may contain all kinds of information, including, but not limited to, address book data, phone numbers, email addresses, pictures, video clips, and other types of data that may be used by cell phones and their applications. In some cases even the applications or the application data may be transferable. Typically machine 410 would have its own operating system 410a, which has multiple programs 410b, including a test application 410b1 (not shown separately). Often machine 410 with operating system 410a and programs 410b is actually a custom, dedicated PC, and as such it has to contain drivers or DLLs 410c for all the phones to which it may be connected. As a result of having a large library of DLLs (or drivers, used interchangeably here) almost any data transfers between two different phones can work. The machine can, by using the DLLs, communicate and download the data objects (each item typically comes down as one or more data objects from the phone), which are then stored in machine 410 temporarily and eventually sent on to the other phone, as its data objects, using the matching DLL. It is clear that each of these devices has a CPU and memory, both volatile and nonvolatile, and thus each forms a small, distinct computing device.

Figure 5:
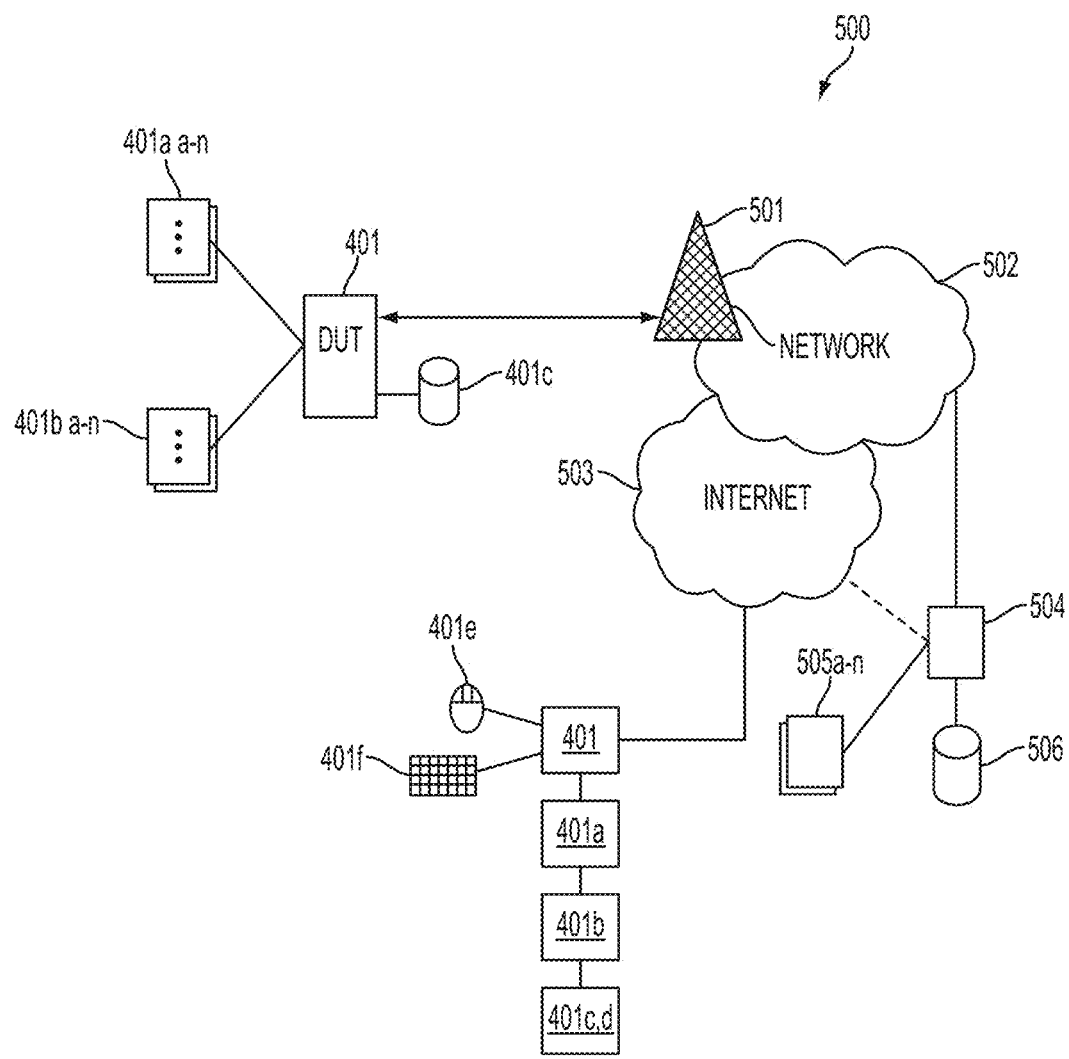
FIG. 5 shows a simplified overview of an exemplary testing system.

FIG. 5 shows a simplified overview of an exemplary testing system 500, using the same DUT 401, according to one aspect. Here, rather than being connected to a hardware testing device, a test application 410b1 (not shown separately) may, for example, be downloaded over the network 502 from a server 504, or from its data repository 506. In some cases the PDTM 410 may tell the server 504 which device, identified by its ESN, IMEI, phone number, etc., should receive the application, as the network operator has the ability to send special system messages to remotely install software on devices.

Figure 6:
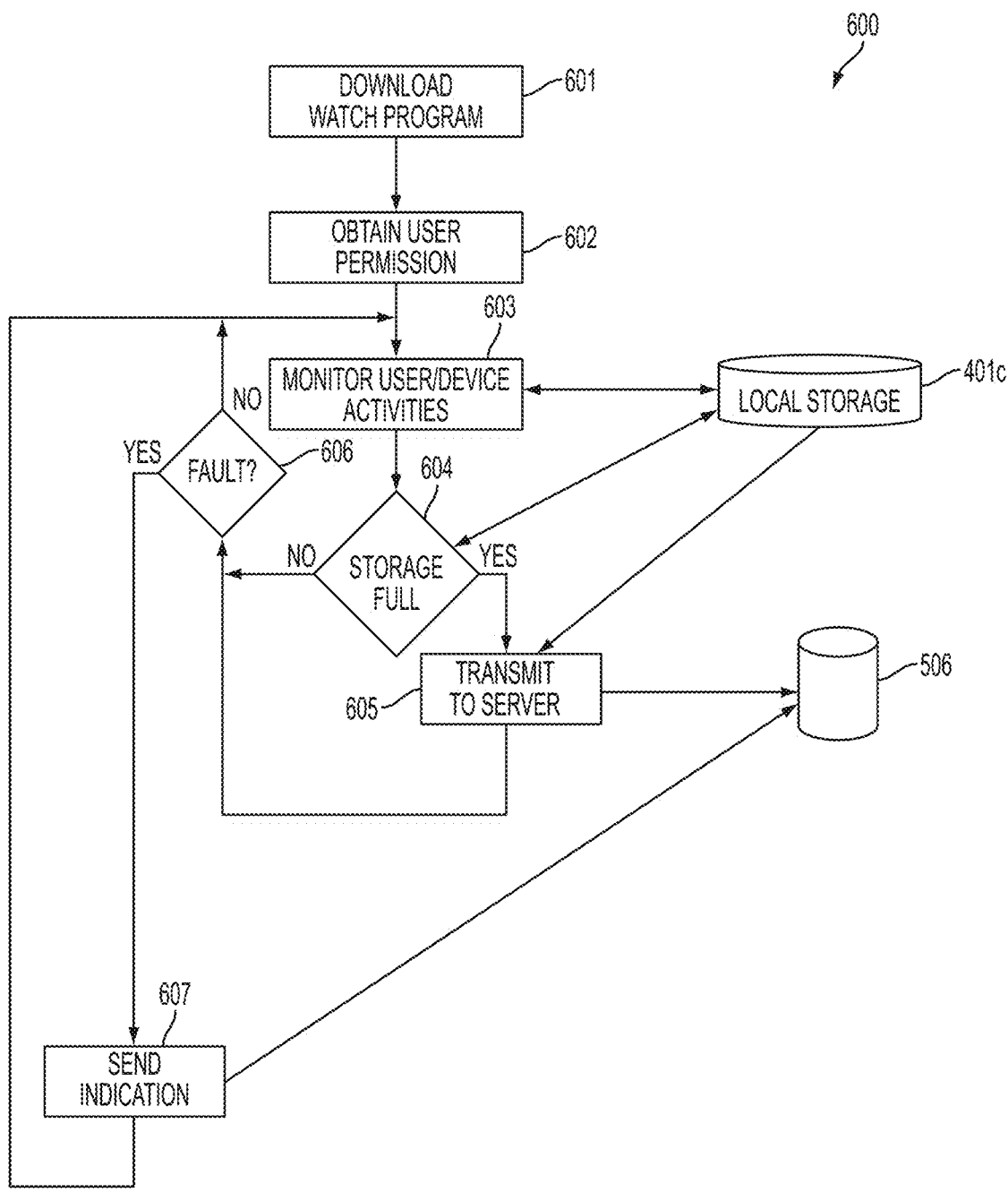
FIG. 6 shows an exemplary process for implementation of system test software.

FIG. 6 shows an exemplary process 600 for implementation of the system test software. In step 601 the system downloads a monitoring application onto a target device. In step 602, the system obtains user permission to run the application. In addition to asking a simple Yes or No question, the system may require the user to enter a password, such an account password or the user password for this device, to verify that this is not an illegal attempt to install software on the device.

In step 603, the program starts to monitor user and device activities, including but not limited to such as cell changes, roaming table updates, installation and activation of software applications, installation and activation of plug-in software, phone calls, etc. Other monitored data includes a preferred roaming list (PRL), battery operation, temperature control, logging of RF signal in and out during various operations, etc. In some cases, it is also possible to obtain a precrash memory dump, which may be stored in the local storage 401 c of device 401. Local storage 401 c may be, for example, a segregated section of nonvolatile memory in the device, which would preferably survive a crash without losing data.

The monitoring application preferably repetitively writes a list of applications that were launched or installed to flash memory of the device in multiple consecutively written files. In an embodiment, the monitoring application repetitively writes the list of applications to three consecutively written files in the flash memory in the following manner. A first file is opened, data is written to the file, and the first file is closed. A second file is then opened, data is written to the file, and the file is closed. A third file is then opened, data is written to the file, and the file is closed. The process is then repeated, with the first file being opened, data written to it, the first file closed, and so on. If multiple files are used in this manner in an ongoing monitoring process, then it is much more likely that at least one of the files will be readable and not corrupted after an event such as when the user pulls the battery, when the user performs a hard reset, or the when the device crashes. Furthermore, a snapshot of the state of the device can be reconstructed from a combination of two or more of the multiple files after such event even if one of the files is corrupted by the event. In an embodiment, the monitoring application is configured to selectively upload the data files to a central data repository only when a Wi-Fi connection is available to the device so as not to incur data usage charges. This mode of operation is particularly useful where the user of the device does not have an unlimited data plan, and pays per-megabyte or per-gigabyte charges for data usage.

Also, in step 604 the system monitors the remaining capacity of local storage 401c. When the storage 401c reaches a preset threshold of occupied space (yes), it is considered full and the process moves to step 605, where the system now sends data to data repository 506 on server 504, from where it can be analyzed either automatically or on demand when a customer comes to a store or repair depot to complain about the phone. From step 605 or, if the local storage is not yet full (no), from step 604, the process moves to step 606. There, the system analyzes the data transmitted by the downloaded application and stored either in local storage 401c or data repository 506. If the system does not detect a fault, the process loops back to step 603, where the system continues to monitor the device. If the system detects a fault or other relevant state or event (yes), the process moves to step 607, where the system sends a fault indication to data repository 506 of server 504. Server 504 may be running programs to respond to the fault indication by, for example, sending an email to the user of device 401 explaining the problem. A copy of this email may also be sent to the phone number's account log at the network operator's system, or, in other cases, only to the network operator's system. After the email is sent, the process loops back to step 603, where the system continues to monitor the device. By anonymizing certain data, abuses of the data may be reduced. Also, server 504 may keep a log of who has access to the phone data, who uses the data, and how it is used. These measures may reduce the incidence of unauthorized employee snooping into the phone usage of certain customers, such as, for example, celebrities. Further, statistical and multivariate analysis may be used to extract useful information, such as the fact(s) that visiting some web-sites, or installing and respectively running some software alone or in combinations, may cause instability. That information can be mined, and also used to alert users, for example by email, SMS or other suitable means, that after installation of a certain applications, for example, their phone may become unstable etc. Also, locations of unusually high frequency of dropped calls may be discovered, and countermeasures may be used, including but not limited to alerting the user that a femtocell at his home may help him avoid those dropped calls, or installing an auxiliary cell in a bend or hollow may solve the problems for cars driving through that location. In yet other cases, end of life of battery, or programs that drain batteries may be found and users alerted either obtain a new battery or turn off power hogging software. This allows the system to do some pre-emptive troubleshooting, reducing costs and making customers more satisfied with the service offerings.

Figure 7:
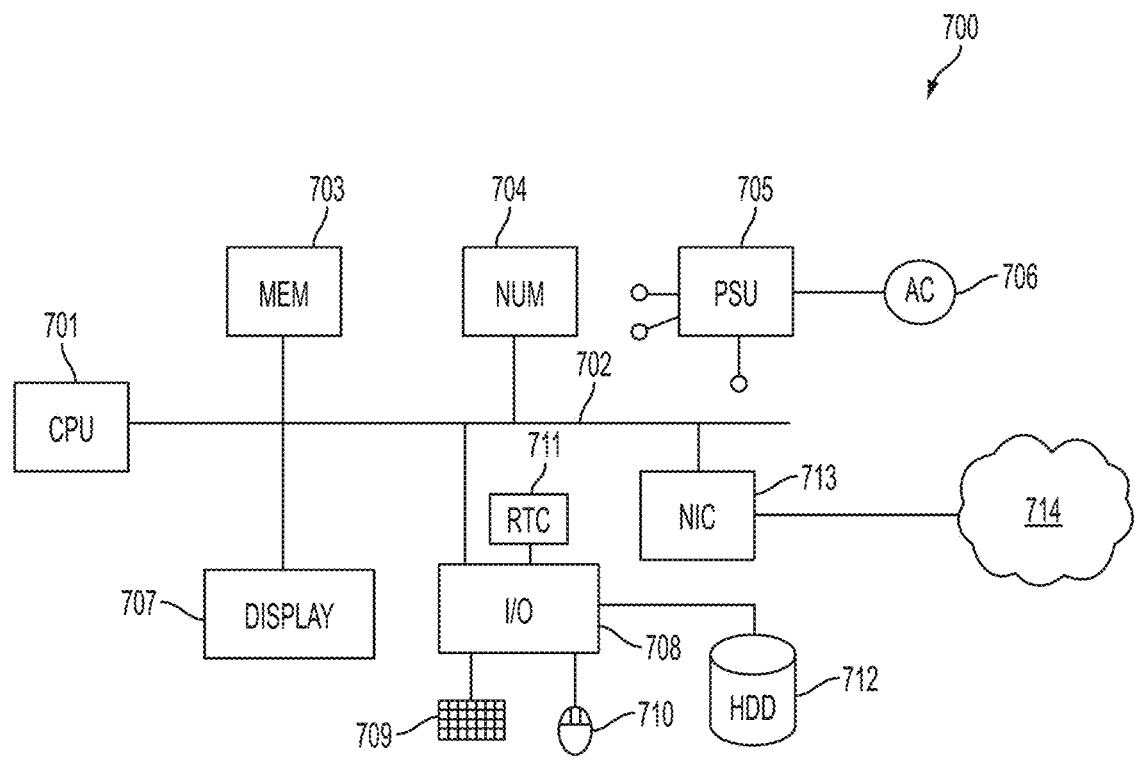
FIG. 7 shows an exemplary overview of a computer system as may be used in any of the various locations throughout disclosed system.

FIG. 7 shows an exemplary overview of a computer system 700 as may be used in any of the various locations throughout system 400. It is exemplary of any computer that may execute code to process data. Various modifications and changes may be made to the computer system 700 without departing from the broader spirit and scope of the current invention. CPU 701 is connected to bus 702, to which bus is also connected memory 703, nonvolatile memory 704, display 707, I/O unit 708, and network interface card (NIC) 713. I/O unit 708 may, typically, be connected to keyboard 709, pointing device 710, hard disk 712, and real-time clock 711. NIC 713 connects to network 714, which may be the Internet or a local network, which local network may or may not have connections to the Internet. Also shown as part of system 700 is power supply unit 705 connected, in this example, to ac supply 706. Not shown are batteries that could be present, and many other devices and modifications that are well known but are not applicable to the specific cases discussed herein.

Figure 8:
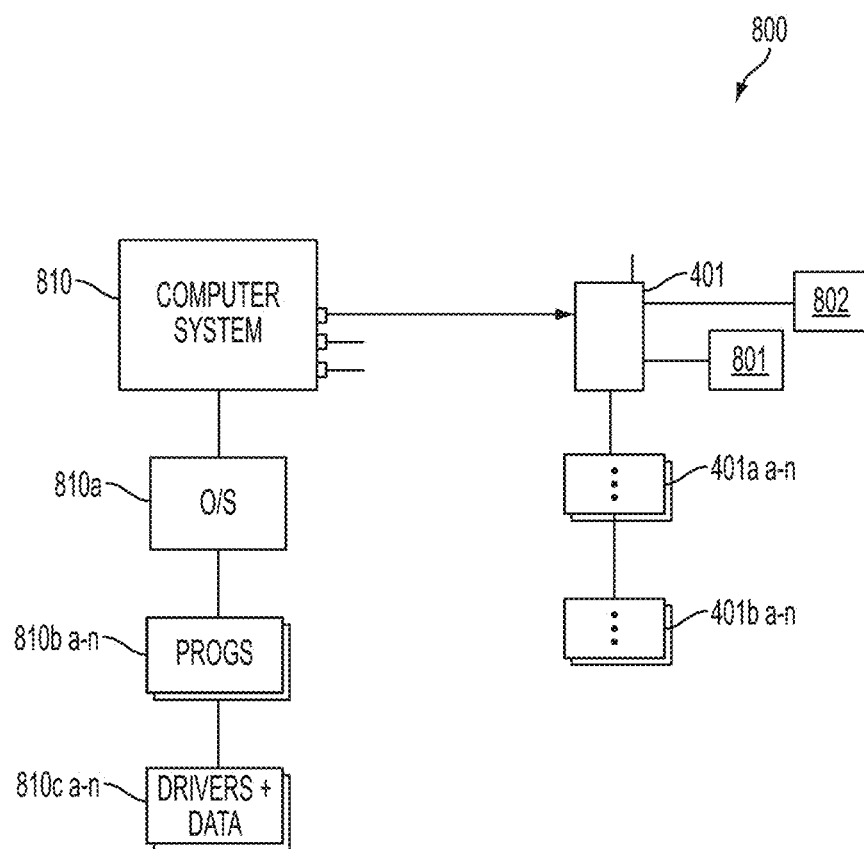
FIG. 8 shows a more detailed overview of an exemplary system similar to typical telephone/PDA device data transfer stations.

FIG. 8 shows a more detailed overview of an exemplary system 800 similar to typical telephone/PDA device data transfer stations as are currently in use and are known to the inventor. In FIG. 8, testing computer 810 is typically a PC with USB and Bluetooth connectivity running phone data transfer applications such as PC Suite, PC Tools and other phonebook transfer applications, which typically may connect one or two handsets, such as the handset of a device under test (DUT) 801 as shown in FIG. 8. These connections are typically made via USB cables 803 (not shown) or custom cables 804 (not shown). Each phone has its own operating system with software 801a and data sets 801b1-n. This data may contain various types of information, including, but not limited to, address book data, phone numbers, email addresses, pictures, video clips, and other types of data that may be used by cell phones and their applications. In some cases even the applications or the application data may be transferable. Typically machine 810 would have its own operating system 810a, which has multiple programs 810b, including a test application 810b1 (not shown separately). Often machine 810 with operating system 810a and programs 810b is actually a custom, dedicated PC, and as such it has to contain drivers or DLLs, data tables, and configuration data 810ca-n for all the phones to which it may be connected. These data tables and configuration data also contain any known combination of programs and drivers, comprising combinations that are known to be functional, as well as the ones that are known to have problems. Thus the table can indicate the existence of problems. Further, enhanced test functionality is created by downloading an additional diagnostic program 802 that supports additional manipulation and tests beyond factory diagnostic program 801 in the device 401 under test. As a result of having a large library of DLLs (or drivers, used interchangeably here) almost any data transfers between two different phones can work. The machine can, by using the DLLs, communicate and download the data objects (each item typically comes down as one or more data objects from the phone), which are then stored in machine 810 temporarily and eventually sent on to the other phone, as its data objects, using the matching DLL. It is clear that each of these devices has a CPU and memory, both volatile and nonvolatile, and thus each forms a small, distinct computing device.

Figure 9:
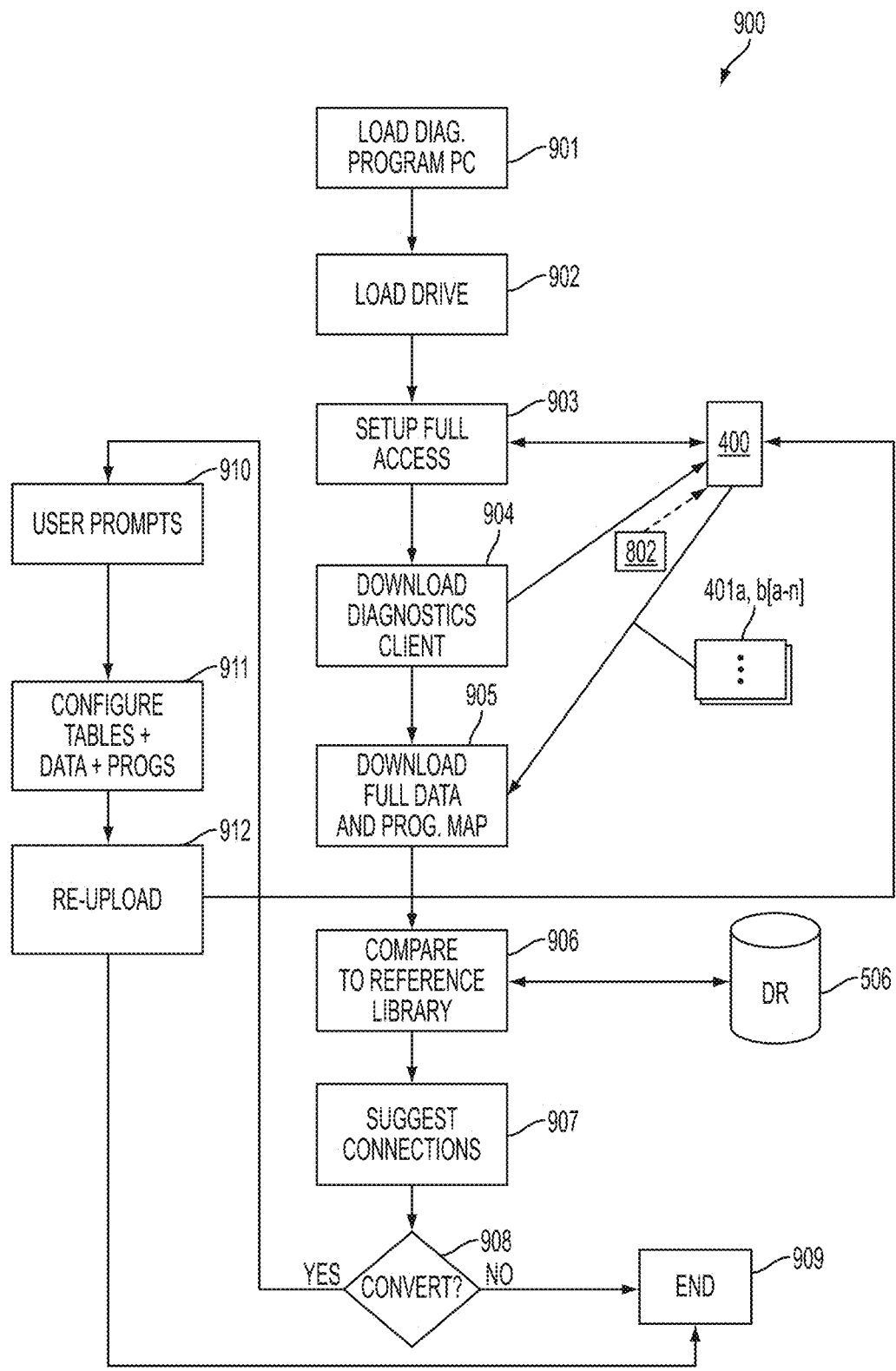
FIG. 9 shows an exemplary process for implementation of enhanced system test software.

FIG. 9 shows an exemplary process 900 for implementation of the additional enhanced system test software. In step 901 the diagnostic program is loaded into a PC, such as PC 810. In step 902 the driver for device under test is loaded, allowing connection between test computer 810 and DUT 401. In step 903 full access to DUT 401 is set up. In step 904 the enhanced diagnostics 802 are downloaded into DUT 401, which diagnostics permit access to data not normally available through previously known access methods for any of various reasons, including but not limited to security restrictions. In step 905 the full data and program map is downloaded into PC 801 from DUT 401. In step 906 the downloaded data is compared to a reference library that may reside in data repository 506 on server 504, or it may be downloaded from a source via the Internet, or via a local intranet. This comparison shows which data from device 401 may be good and which data may have problems. In step 907 results of the comparison of step 906 are flagged with suggested corrections, such as, for example, removing certain programs, or updating or modifying certain configurations, or updating certain of the software or firmware of device 401 to ensure that the configuration of device 110 is functionally compliant with the most recent data stored in the data repository. In step 908, the system may offer an option of automatic reconfiguration. If the option is not offered or not accepted (no), the process moves to step 909, where it ends. If the option is offered and accepted (yes), the process moves to step 910, where the person executing the implementation of the system (process 900) is prompted on a per-item basis to accept updates and modifications. This manual, per-item selection of modifications is necessary because some modifications may cause loss of data and/or applications, which the user may be unwilling to endure. In step 911, the accepted modifications are executed, including configuring data, programs, and tables per user options. In step 912 the modified material is uploaded into DUT 401. Upon completing the uploading, the process moves to step 909, where it ends. These diagnostics with data table comparison capabilities may also have a reminder ("nag") function that prompts the user to load updates that were not accepted in step 910. For example, a user may have been in a situation, such as a business trip, where he did not trust the connection, or the security, or he did not have time, or for some other reason he preferred to wait until a more convenient time and place. The system may also require an account password or other security mechanism to prevent unauthorized people from changing the DUT configuration. Logs of the functions may be transmitted to a server in the network operation center, allowing review of all past transactions by any technician who is attempting to assist the customer. Additional functionality that may be provided include features such as radio tagging, field strength and GPS tracking, or other add-ons.

It is clear that many modifications and variations of this embodiment may be made by one skilled in the art without departing from the spirit of the novel art of this disclosure. These modifications and variations do not depart from the broader spirit and scope of the invention, and the examples cited here are to be regarded in an illustrative rather than a restrictive sense. For example, the application for determining if a mobile phone device is defective can be loaded onto the device from another computing device either in the store or over the network. Such application analyzes for problems in at least one of hardware, software and configuration. Further, in some cases, such application may be downloaded from a computing device connected with a cable or a local area wireless connection. In other cases, it may be downloaded over the wireless wide area communication network, even at the service location, or anywhere else. In some embodiments, the application continues to run after the local test, and then subsequently transmits information about key events to a server on the communication network. In some embodiments, the application will request a user password to verify the user wishes to have it installed, and is the authorized user of the device. In some embodiments, the data transmitted reflects or describes at least one of the following types of events: crashes of the device, other application crashes or hang-ups, loss of signal, location, loss of battery power, loss of connection, user configuration changes, user application installation and removals, data synchronization, inserting or removing data cards. Such events are time stamped, and in case of a subsequent crash, the event log can be transmitted after the mobile device regains functionality.

What is needed is a system and method that allows the exchange of any kind of object between two phones, whether exchange is originally supported by these phones or not, in a secure and safe manner. Such an exchange may be accomplished, for example, over BlueTooth, infrared, or other connection types that are well known. As discussed above, the ability to insert diagnostic tools into a phone, and more specifically, the ability to insert software into a phone, is known to the inventors.

Figure 10:
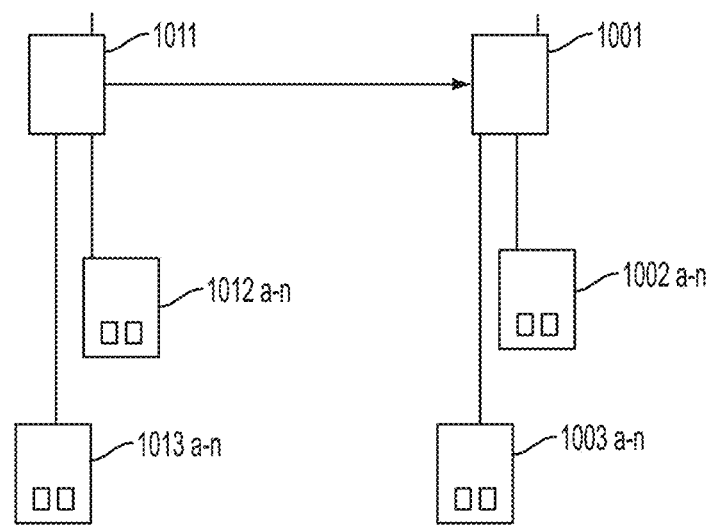
FIG. 10 shows a simplified overview of two phones that are communicating with each other, according to one embodiment of the disclosed system.

FIG. 10 shows a simplified overview of two phones, 1001 and 1011, that are communicating with each other, according to one embodiment of the current invention. Each phone 1001 and 1011 has its own store 1002a-n and 1012a-n, respectively, of software, such as, for example, programs. Similarly, each phone 1001 and 1011 has a set of data objects 1003a-n and 1013a-n, respectively. In the manner described above, the phone that is initiating communication, in this case phone 1011, is sending a diagnostic program, which in this example is a file plan for a utility, to phone 1001.

Figure 11:
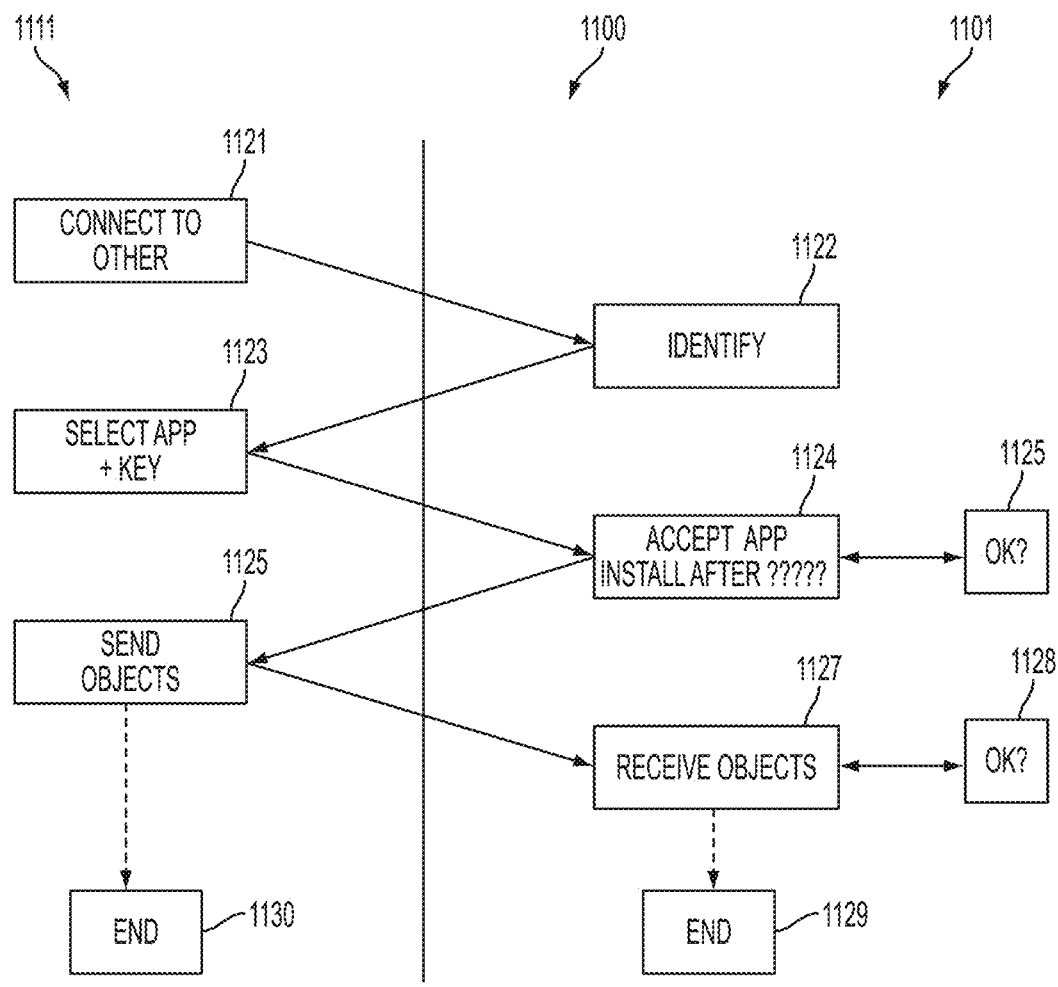
FIG. 11 shows an exemplary process of the interaction between the two phones according to one embodiment of the disclosed system.

FIG. 11 shows an exemplary process 1100 of the interaction between the two phones, according to one embodiment of the current invention. The two communication streams are stream 1111 (for phone 1011) and stream 1101 (for phone 1001). In step 1121, the initializing phone (in this example, phone 1012) connects to the other phone (in this example, phone 1001). In step 1122, phone 1001 identifies phone 1011. In step 1123, based on the identification, an application that is suitable for the object phone 1001 is taken from the application store, which forms part of the program store 1012, and is transferred to phone 1001. Typically, the phone's security system asks the user to confirm this transfer, and upon acceptance, in step 1124, phone 1001 accepts and installs the application. That application may contain a key that sets up a trusted relationship between the two phones for the future, similar to the relationship between nodes in a home or workgroup network of computers. Different types of settings may be offered, such as, for example, "Always allow" or "Always ask" in the case of a request to transfer data. In step 1125, initiating phone 1011 sends a selected object to receiving phone 1001, and in step 1127, receiving phone 1001 receives the object. The user may be prompted to accept the object, particularly depending on the nature of the object. This process may continue until all desired objects are transferred. In some cases, the transfers may be bidirectional; in other cases, they are only unidirectional. Both phones end their communications in step 1129 and 1130, respectively, after which a new session must be started again from step 1121 to send more data. When the application is installed, depending on its permissions settings, it may remain in the phones and permit new connection for data transfers without reinstallation, or it may allow such connections only with user approval. However, in other cases, the application may be deleted after each session for purposes of security.

What is needed is a system and method that can transfer the data of either multiple devices simultaneously or one device on a one-to-one basis in sequence, using wireless connections and thus avoiding connection problems such as defective connectors, unavailable infrastructure, etc.

Figure 12:
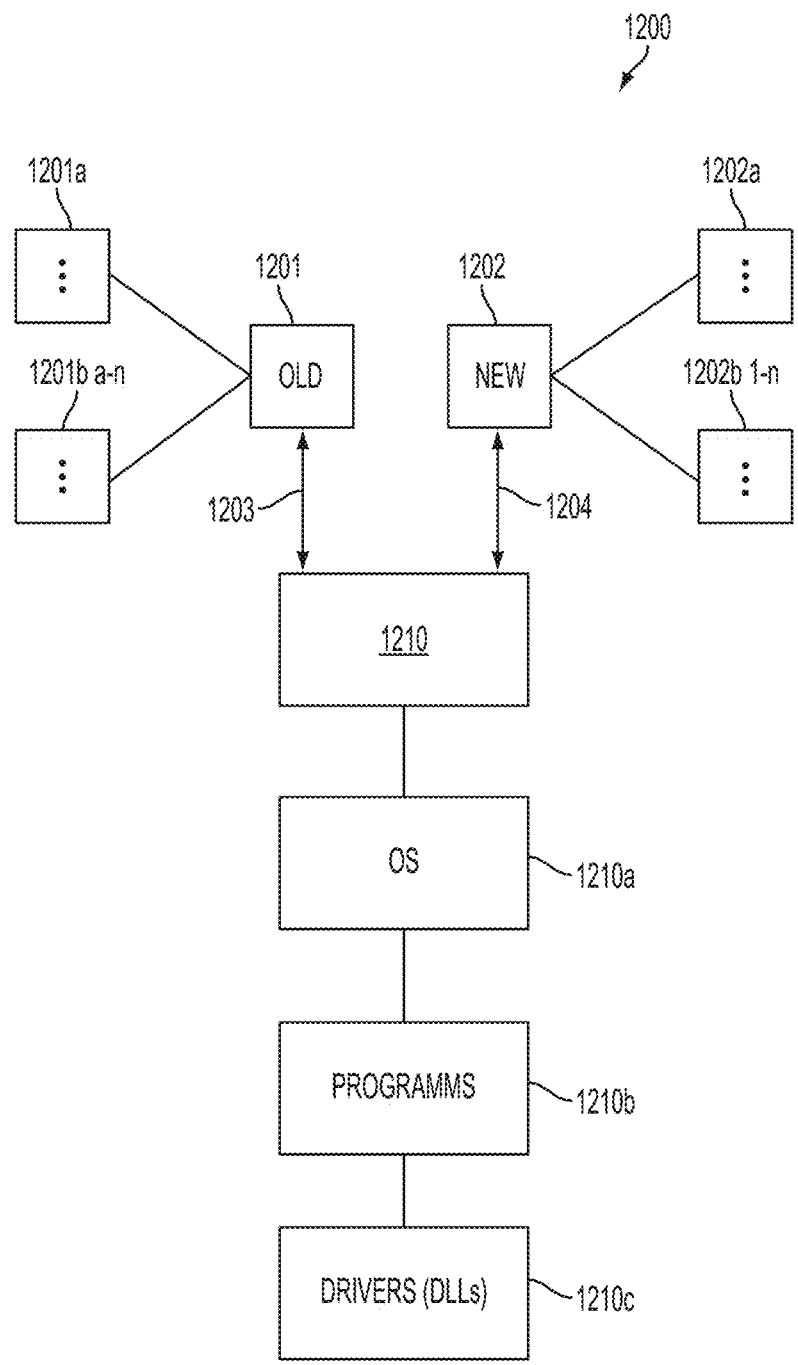
FIG. 12 shows a block diagram illustrating a transfer station.

FIG. 12 shows transfer station 1200. Station 1200 has a phone data transfer machine (PDTM) 1210, typically a PC with USB and Bluetooth connectivity running phone data transfer applications such as PC Suite, PC Tools and other phonebook transfer applications, which typically may connect to two handsets: originating handset 1201 and a receiving handset 1202. These connections are, in some cases, typically made via any suitable wireless connection such as 1203 or 1204, including, but not limited to, Bluetooth, Wi-Fi, ZigBee, or any other suitable wireless protocol, or over the wireless carrier network and via the Internet (not shown) to device 1210. For this purpose, device 110 may have one or more additional wireless interfaces (not shown for clarity). In some cases, these interfaces may reside in one or more access points (not shown) connected through a local area network (not shown). Also, device 1210 may, in some cases, support more than two sets at a time. Thus, a single device could support, for example, transfer between four pairs (i.e., total of eight devices, four old devices and four new devices). Each phone has its own operating system with software 1201a and 1202a, respectively, and data sets 1201b1-n and 1202b1-n, respectively. This data may contain all kinds of information, including, but not limited to, address book data, phone numbers, email addresses, pictures, video clips, and other types of data that may be used by cell phones and their applications. In some cases even the applications or the application data may be transferable. Typically machine 1210 would have its own operating system 1210a, which has multiple programs 1210b. in some embodiments, machine 1210 with operating system 1210a and programs 1210b is actually a custom, dedicated PC, and as such it contains drivers or DLLs 1210c for all the phones to which it may be connected. As a result of having a large library of DLLs (or drivers, used interchangeably here) almost any data transfers between two different phones can work. The machine can, by using the DLLs, communicate and download the data objects (each item typically comes down as one or more data objects from the phone), which are then stored in machine 1210 temporarily and eventually sent on to the other phone, as its data objects, using the matching DLL. In various embodiments, each of these devices has a CPU and memory, both volatile and nonvolatile, and thus each forms a small, distinct computing device.

What is needed is a system and method that allows connection of telephone devices of unknown or questionable origin, with incorrect or spoofed VID/PID, and the ability to provide services such as data transfer, software repair of damaged flash, etc.

Figure 13:
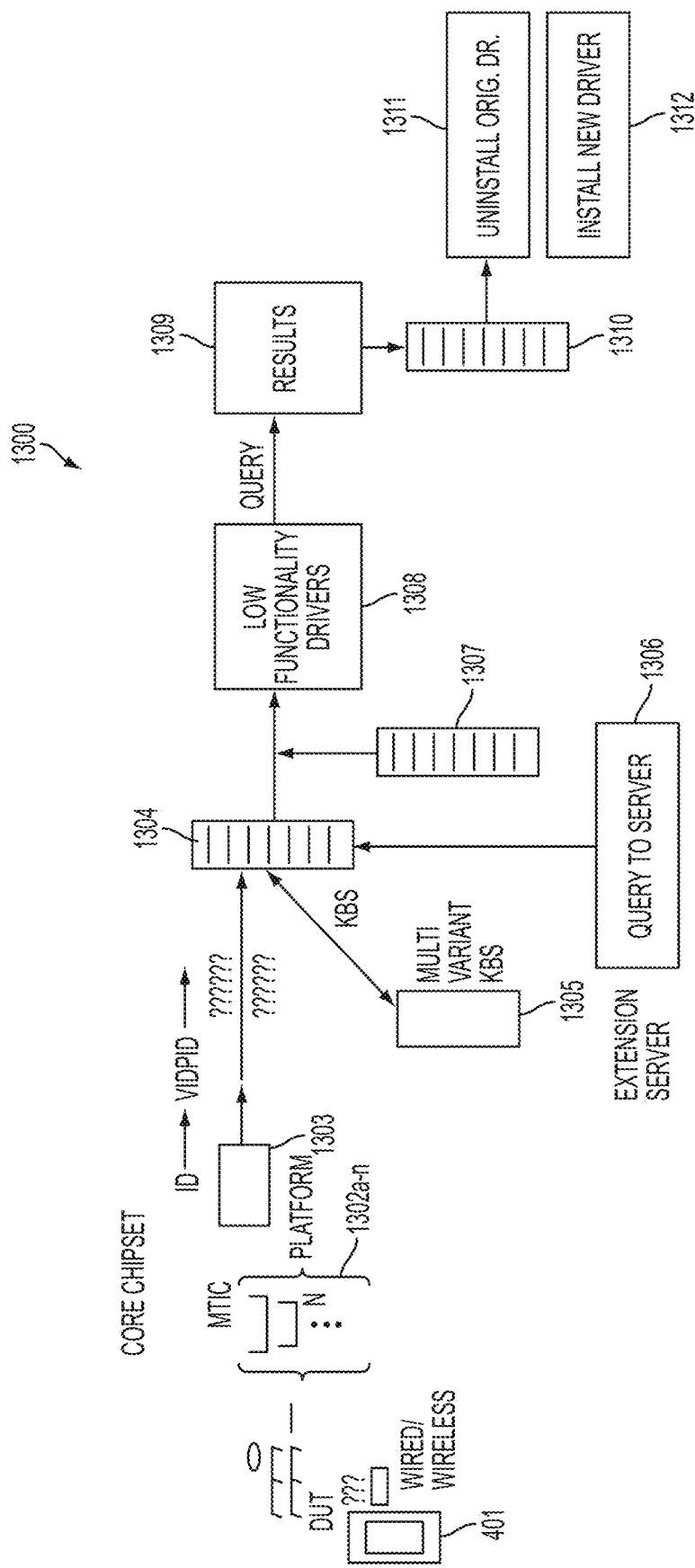
FIG. 13 shows an exemplary process for discovering the actual identity of a telephone device.

FIG. 13 shows an exemplary process 1300, according to one aspect of the system and method disclosed herein, for discovering the actual identity of a telephone device, which actual identity may differ from the indicated identity of said device, and installing correct drivers for said device. A device under test (DUT) 401 is connected via a wired connection or wirelessly to system 1300. At step 1303 the system attempts to determine the ID of DUT 401, typically by determining the VID/PID from the USB or from the wireless plug 'n' plays used. In general, only a few actual distinct platforms of chipsets, symbolized as elements in list 1302a-n, are widely used. Currently about seven main platforms are in use, including, but not limited to, platforms from chipset manufacturers such as MTK, Infineon, Motorola, Qualcomm, Nokia, etc. However, myriad variations are made in designing telephone or mobile computing devices using those chipsets, both in the chipsets from the chipset manufacturers mentioned above, as well in as custom modifications by handset manufacturers that add additional chips, software, and software modifications, resulting in a complex, vast array of combinations and permutations of the platform elements used in a device, sometimes within the same VID/PID. This VID/PID (referred to as ID here) is then compared to the contents of a look-up table 1304, where the device may be identified. Table 1304 is a part of a knowledge base (not shown), which contains various tables and data accessed by the system. If the look-up list does not return a conclusive ID result, meaning that more than one model and/or hand set manufacturer (HSM) are using it, the system then queries table 1305, which has multi-variant content. This is a list of devices that are known to have multiple variants. Also, in some cases, the system may prompt the user to enter additional information, or the system may send a query from server 1306. This server 1306 may be used, for example, as a common knowledge base for all or a group of service entities, such as, for example, within a certain store network, or provider network, to allow knowledge acquired at one entity to be shared among all entities. Queries to a user may include a request that the user manually enter an International Mobile Equipment Identity (IMEI) number, an electronic serial number (ESN), a serial number, or any other, similar type of marking on the device, as well as a model number from the device. However, as previously noted, some manufacturers may mark a device with a known model number, such as, for example, N95 from Nokia or the Apple iPhone model number, even though the device is not from the indicated manufacturer and is, in fact, a counterfeit device. Once the device has been identified, the system looks up its correct driver from a list of drivers in table 1307, and then in step 1308 it installs a low-functionality driver that can make additional queries into the handset's operating system in step 1309 for further identification of a HSM and model number. The results of these queries are applied to a second look-up table 1310 that lists of all the drivers. With the correct driver determined from table 1310, in step 1311 the system uninstalls the low-functionality driver and, in step 1312, it installs the correct driver.

Figure 14:
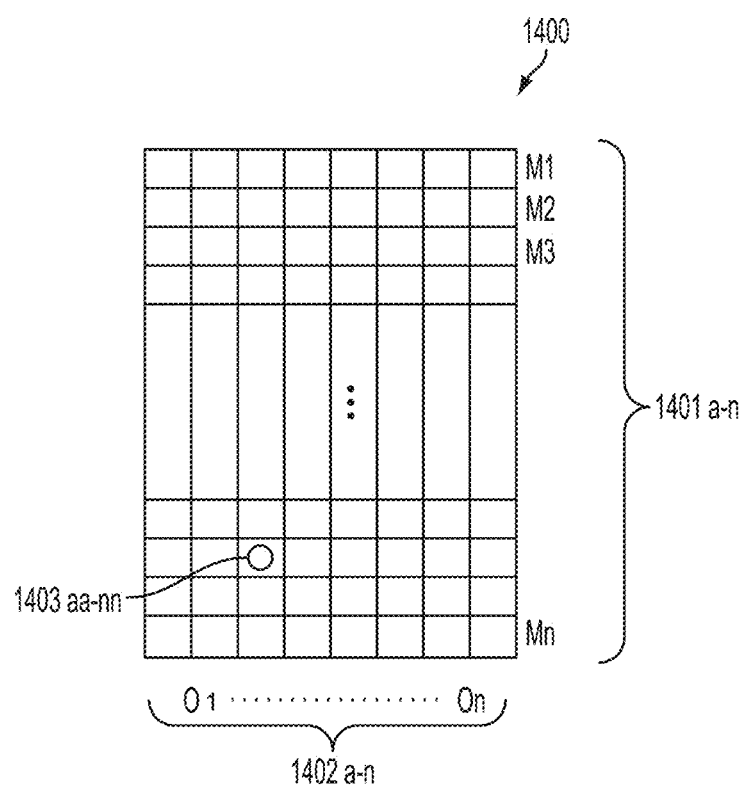
FIG. 14 shows an overview of an exemplary table.

FIG. 14 shows an overview of an exemplary table 1400, typical of tables 1304, 1307, or 1310. Table 1400 shows OEM IDs O1 through On 1402a-n and model numbers M1 through Mn 1401a-n. Thus a user or the system as disclosed herein may create a cross reference 1403aa-nn from the OEM ID and the model numbers appearing within a certain VID/PID of that OEM. Some OEMs, for example, use the same VID/PID for several model numbers as they quickly change chip versions, but do not change the overall device architecture. However, different chip versions may have different functions and features, as well as different internal memory, and thus may need different diagnostic tools and/or different transfer tools to recover and transfer and reinstall the operating system, as well as applications, data, and user information, such as calendar, address book, images, video, etc. By providing this dynamic look-up and problem-management tool, the system can flexibly adapt itself.

Figure 15B:
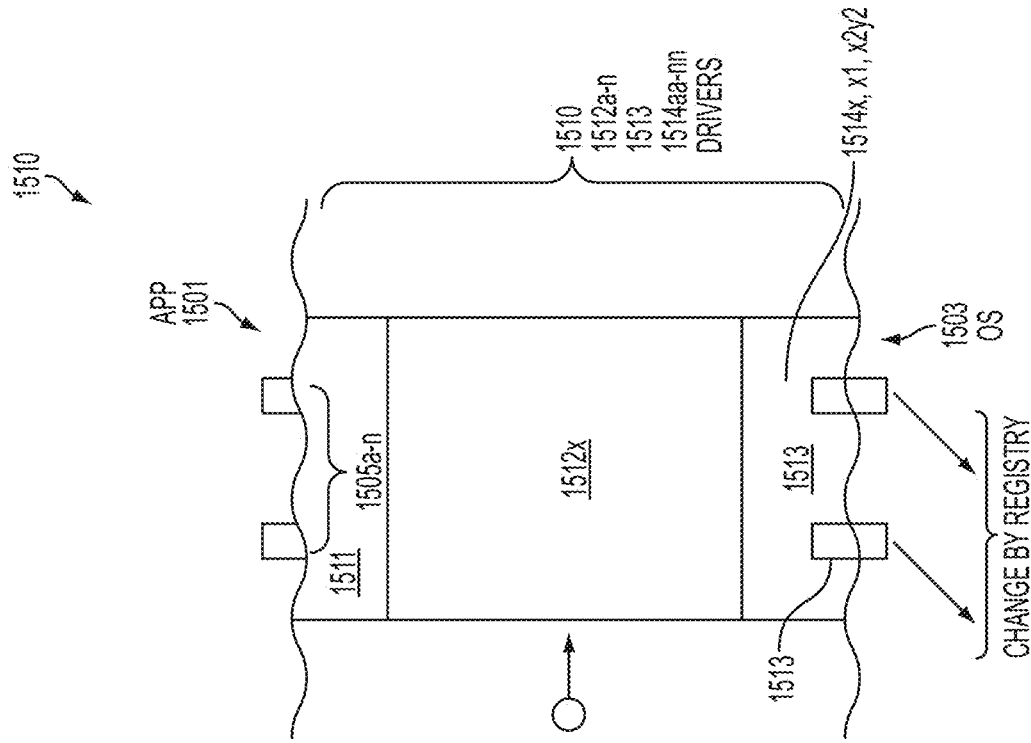
FIGS. 15A and 15B illustrate a system and method for exchanging drivers.
Figure 15A:
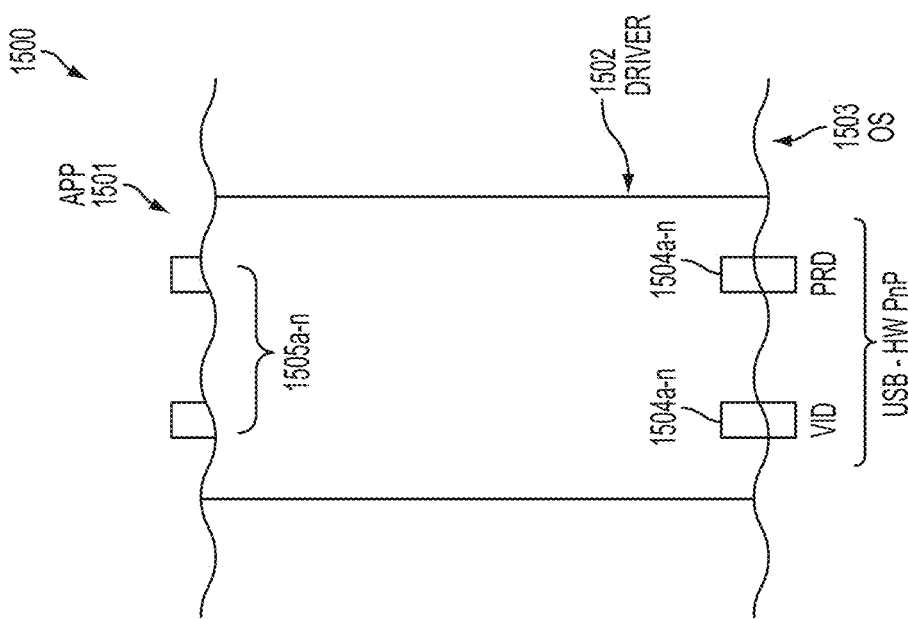

FIGS. 15A and 15B show an additional aspect of the system and method disclosed here, namely, an innovation to speed up the process as, during the discovery of a device, multiple drivers may need to be exchanged, and that operation can take a long time using the typical plug 'n' play process. A new approach for exchanging drivers is herein proposed:

FIG. 15A shows an overview of a classic driver model 1500 as is well known in the art, with the application 1501 sitting on top of the driver 1502 and the OS 1503 sitting below, and the driver having the VID/PID and other interfaces to software and hardware plug 'n' play, etc., as indicated by elements 1504a-n, and interfaces to the applications 1505a-n.

FIG. 15B shows a novel approach 1510 for a driver stack layer view, according to one aspect of the system and method disclosed herein. Reinstalling the whole driver every time requires massive changes in the registry. In the novel approach of the system and method disclosed herein, for drivers that have the same VID/PID (or even different VID/PID in some cases), the driver is cut into three sections: application-facing 1511 (with subsections 1505*a-n*)" the main body 1512*x* (which can be now exchanged without requiring a reboot), and OS-facing section 1513 (with subsections 1514*xy* out of 1514*aa-nn*). In this embodiment, section 1511, which contains certain functional elements 1505 *a-n* of the driver, is now absorbed as part of the application 1501 and, as such, is no longer a part of the driver. Section 1512*x* contains the remaining portions of the driver, which, in many applications, can be represented by a uniform driver that has a small footprint and can load relatively quickly. This novel approach no longer requires the loading of all functional elements in 1511 with its subsections 1505*a-n* and 1512*x*, which may require a long time to load, but only the uniform driver 1512 together with selected functional elements 1505*a-n* in 1511 that are necessary to interface to a particular device. Not having to load unnecessary functions can save a significant amount of time. Further, section 1513 interfaces to the OS, and main driver section 1511*x* can be easily interchanged with any of 1511*a-n* (not shown), without requiring a reboot every time.

In some cases, the VID/PID is exchanged by writing directly into the registry, rather than by a full plug 'n' play installation. This novel approach has the advantage that the typical change time is now in the millisecond or low seconds range, instead of the tens of seconds typically required currently to uninstall and reinstall a driver. Because up to a dozen or two dozen drivers may need to be tested for a single a phone, the total time to test drivers could become a burden to a business if each uninstall and reinstall cycle of a driver takes up to a minute or longer.

Figure 16:
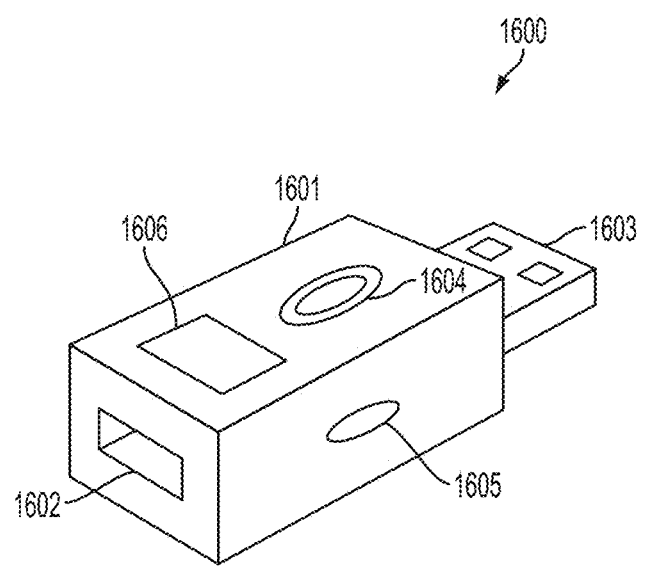
FIG. 16 shows an overview of an exemplary device according to one aspect of the system and method disclosed herein.

FIG. 16 shows an overview of an exemplary device 1600 according to one aspect of the system and method disclosed herein. Device 1600 is, in this example, a USB key 1601. Device-oriented port 1602 can accept a standard USB interface cable for connection from a small mobile communication device (not shown). Computer-oriented connector 1603 may plug into a computing device (not shown), such as the exemplary computer of FIG. 7 or any other, similar standard PC. Connector 1603 may, alternatively, plug into a USB power supply (not shown) to supply power to USB key 1601, if the communication device to which it is attached does not supply enough power. A user may press button 1604 to initiate operation of USB key 1601. (It is clear that button 1604 is exemplary only, and that any of various types of switches, buttons, toggles, keys, etc. may be used to initiate operation.) In some cases a medium for addition data storage may plug into slot 1605. USB key 1601 also has a small display 1606.

Figure 17:
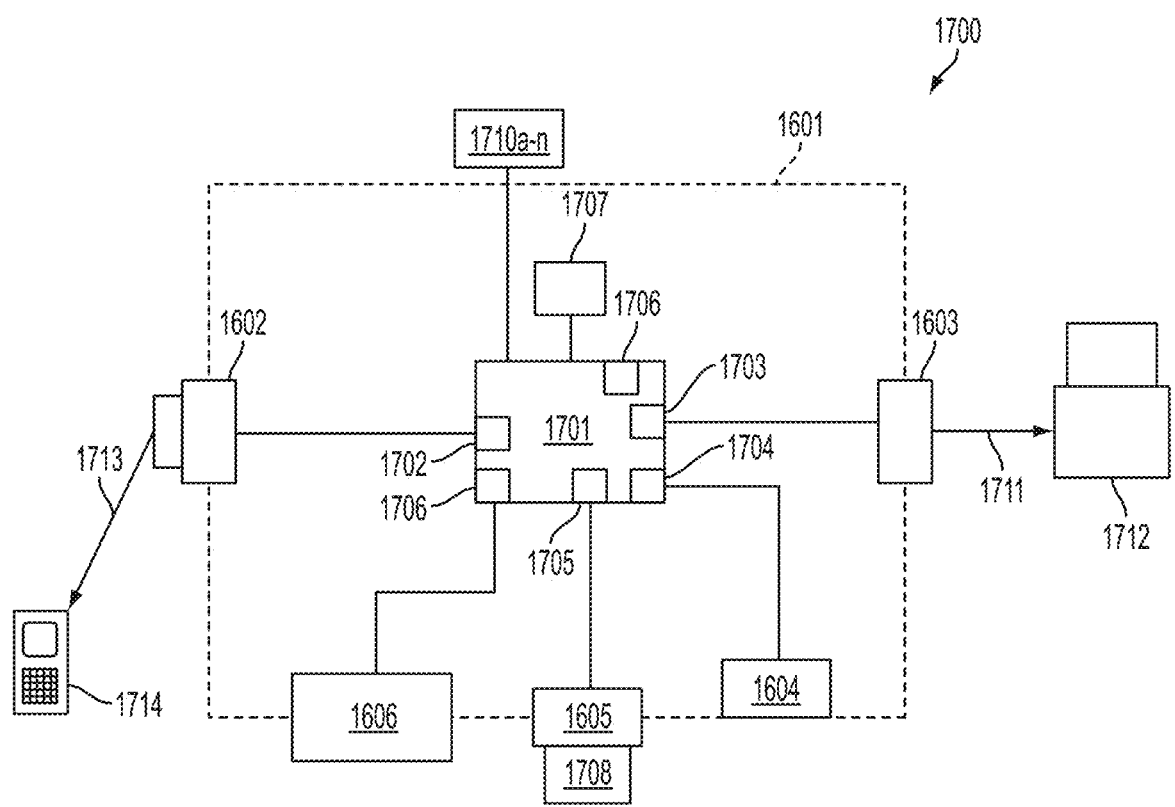
FIG. 17 shows an overview of device architecture.

FIG. 17 shows an overview of device architecture 1700, according to one aspect of the system and method disclosed herein. Again, computer-facing USB connector 1603 is connected via USB cable 1711 to a computer 1712, of the type of complete computer system shown in FIG. 7. The unit 1601 contains, in this example, system on a chip (SOC) 1701. SOC 1701 contain a processor, some volatile memory, and some nonvolatile memory. The nonvolatile memory contains software 1710*a-n* and additional modules described later. It is also used to store and/or to provide information such as address book data, pictures, music, or any other information useable on smart phone 1714, as well as the embedded operating system, and drivers and tables to communicate with a variety of different devices 1714. Device-facing interface 1602 is connected via USB cable 1713 to communication device 1714. Display 1606 may comprise just one LED, a multi-color LED, multiple LEDs, a small LCD, or any other, similar display type. The SOC 1701 has specific interfaces, such as 1706, to drive and/or interface with respective units, such as, in this case, display 1606 (and/or other output devices, such as OLEDs, LEDs, LCDs, etc.). Port 1705 serves for connecting additional storage, in this example, to slot 1605, which may accept a micro SD card 1708. Other interfaces may be supported as well, but are not shown for clarity. Button 1604 is also connected to the SOC via interface 1704; in a similar manner, computer-facing USB connector 1603 is connected to SOC 1701 through interface 1703. Internal memory 1706 contains at least a boot-strap software for SOC 1701. External, additional nonvolatile memory 1707, may contain additional code, drivers, etc., as described in the discussion of FIG. 18, following. Memory 1707 may or may not be present. In some cases, the system memory 1706 may have minimal capacity, and it may only transfer data between smart phone 1714 and computer 1712. In other cases, memory 1707 may have limited capacity, requiring the presence of external memory 1708 for full backups. In some cases, for example, without external memory 1708, device 1600 could back up only, for example, information about 100 contacts; whereas, the addition of external memory 1708 (for example, a flash memory card) would enable backup of all data in the communication device, including even pictures, music, and video. After connecting the device 1601 to phone 1714, and, if necessary, to a power source, such as computer 1712 (or in lieu, not shown, a USB battery pack) to power it up if no power is available from smart phone 1714, as indicated by lack of a light on display 1606, it is then used, as described throughout this disclosure.

Figure 18:
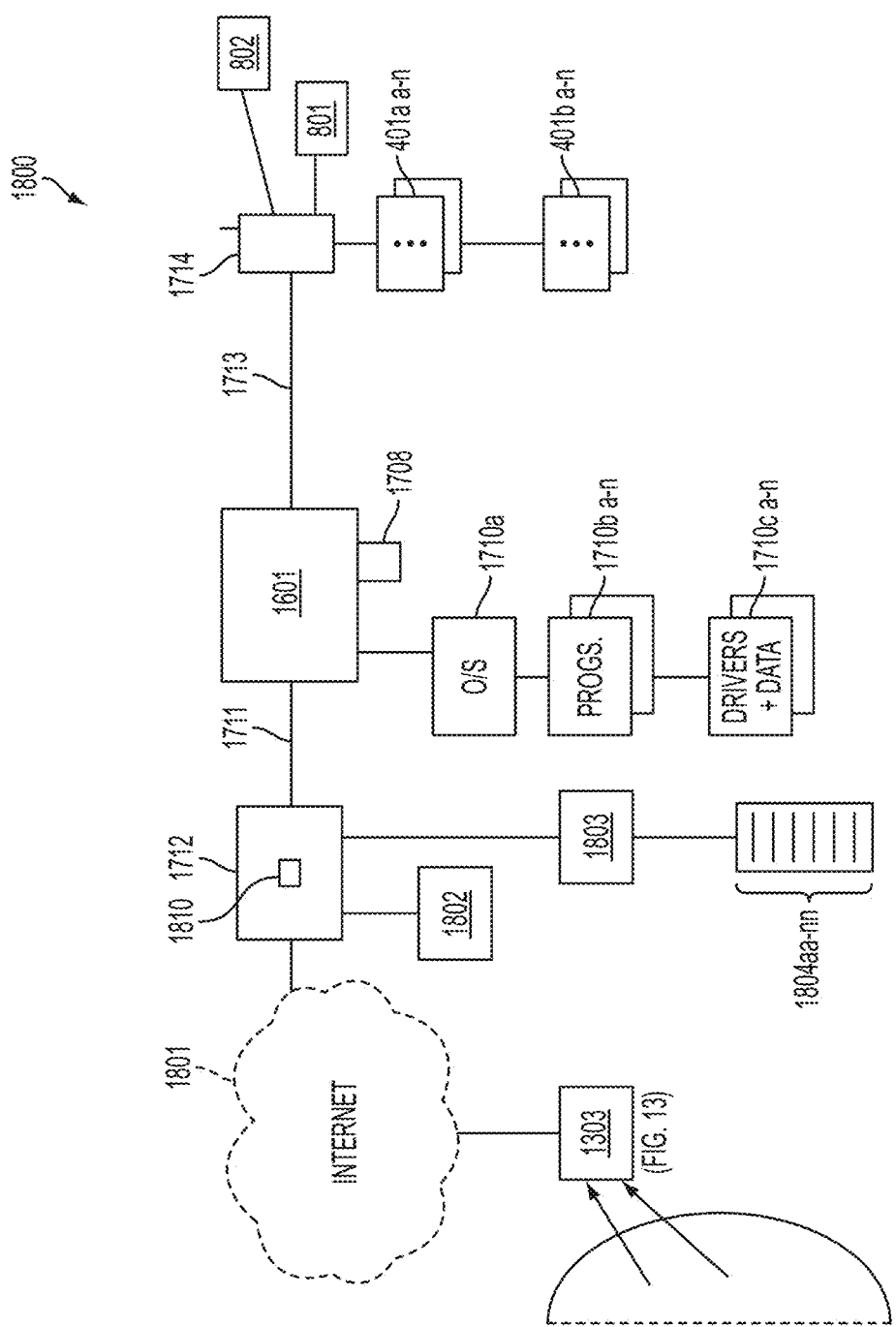
FIG. 18 shows a detailed overview of an exemplary system for updating software in a device.

FIG. 18 shows a detailed overview of an exemplary system 1800 for updating software in device 1601 to enable connecting it to a mobile communication device 1714 for which it does not have information, according to one embodiment of the system and method disclosed herein. In FIG. 18, computer 1712 is typically a PC with USB and Bluetooth connectivity running phone data transfer applications such as PC Suite, PC Tools and other phonebook transfer applications, which typically may connect one or two handsets, such as the handset of a device under test (DUT) 1714 as shown in FIG. 18. These connections are typically made via USB cables 1711 and 1713. Computer 1712 has its own operating system 1802 with software 1803*a-n* and data sets or embedded operating systems 1804*a-n* (not shown) for execution on SOC 1701 in device 1601. This data may contain all kinds of information, including, but not limited to, address book data, phone numbers, email addresses, pictures, video clips, and other types of data that may be used by cell phones and their applications. In some cases even the applications or the application data may be transferable. Typically computer or machine 1712 would have its own operating system 1802, which has multiple programs 1803*a-n*, including a probing/programming application 1803*x* (not shown separately).

Often computer 1712 with operating system 1802 and programs 1810*b* (not shown) is actually a standard PC, and as such it often has lots of other, not relevant software as well. It can combine DLLs, data tables, and configuration data 1804*aa-nn* for most phones 1714 to which it may be connected via unit 1601. These data tables and configuration data also contain an identification of combinations of programs and drivers that are known to be functional, as well as combinations that are known to have problems. Thus the table can indicate the existence of problems. If a driver is not supported, a new configuration is prepared and loaded into device 1601, as described later in more detail. Operating system 1710*a* of unit 1601 is typically an embedded type, such as Unix, Linux or some other, similar embedded, dedicated system. It uses certain programs 1710*b a-n*, and they use drivers or driver tables 1710*c a-n*. Driver tables, in this example, enable a device to use a formulaic driver, instead of a device-specific driver, said formulaic driver using tables and scripts that provide the actual driver functions for the specific device. Thus a single software instance may offer drivers for a variety of devices. However, no matter how diligently a formulaic driver is designed, the number of drivers in the device may be limited by the capacity limitations of memories 1706 and 1707. Additionally, as novel smart phones 1714 appear in the market that are not supported by the existing drivers 1710*c a-n*. Computer 1712, which connects via cable 1711 to unit 1601, has its own operating system 1802, typically a Windows or Linux operating system, and it has an application 1803*x* that contains an enclosed environment 1803*y* that can assemble and create new operating environments for unit 1601, including but not limited to the embedded operating system and its drivers. Thus computer 1712 creates a new image in its internal memory 1810, and then the image is transferred to a flash memory, such as, for example, external memory 1708 in unit 1601, and from there the internal memory 1706 (not shown here) can be used to reprogram itself and/or internal memory 1707 (not shown here, but shown in FIG. 17). This image transfer and reprogramming enables the system to very easily reprogram the firmware in USB key 1601 to adapt to new devices that have not previously been supported. Computer 1712, in turn, can connect via Internet 1801 to expert system as explained in the discussion of FIG. 13, previously, at step 1303, which has access to all the databases of all the drivers and formats for connecting to devices. To identify new communication devices, such as device 1714, the system can switch unit 1601 into transparent mode, enabling the more powerful software in computer 1712 to probe device 1714, to determine its model and possibly the parameters needed to parameterize new drivers. The system can then store those new drivers and/or tables in tables 1804, report them back to 1303 for its database, and then recreate a new environment in memory 1810 that can be reflashed into key 1601, which from now on can service device 1714 independently, without connecting to computer 1712. In some cases, however, key 1601 may still need a power supply device, such as a USB battery, to supply power if the device 1714 cannot supply sufficient power to operate the processor 1701 and other items in key 1601. Further, in cases where no suitable driver and/or table is present, by downloading an additional diagnostic program 1803*z* (not shown separately) that supports additional manipulation and tests beyond programs already present in 1803 *a-n* and/or drivers and tables in 1804*aa-nn*, newer smart phones can be added to the capabilities of device 1601. As a result of having a large library of DLLs (or drivers, used interchangeably here) almost any data transfers between two different phones can work. The computer 1712 can, by using the available drivers and tables, communicate via device 1601 with smart phone 1714 and test download of data objects (each item typically comes down as one or more data objects from the phone), and thus identify the correct combination, which is then stored in memory 1810 of computer 1712 temporarily and eventually sent on to device 1601, as described later, enabling it to connect the phone 1714 by itself, for backing up data objects, without use of a computer 1712. Each of these devices may have a CPU and memory, both volatile and nonvolatile, and thus each can form a small, distinct computing device.

Figure 19:
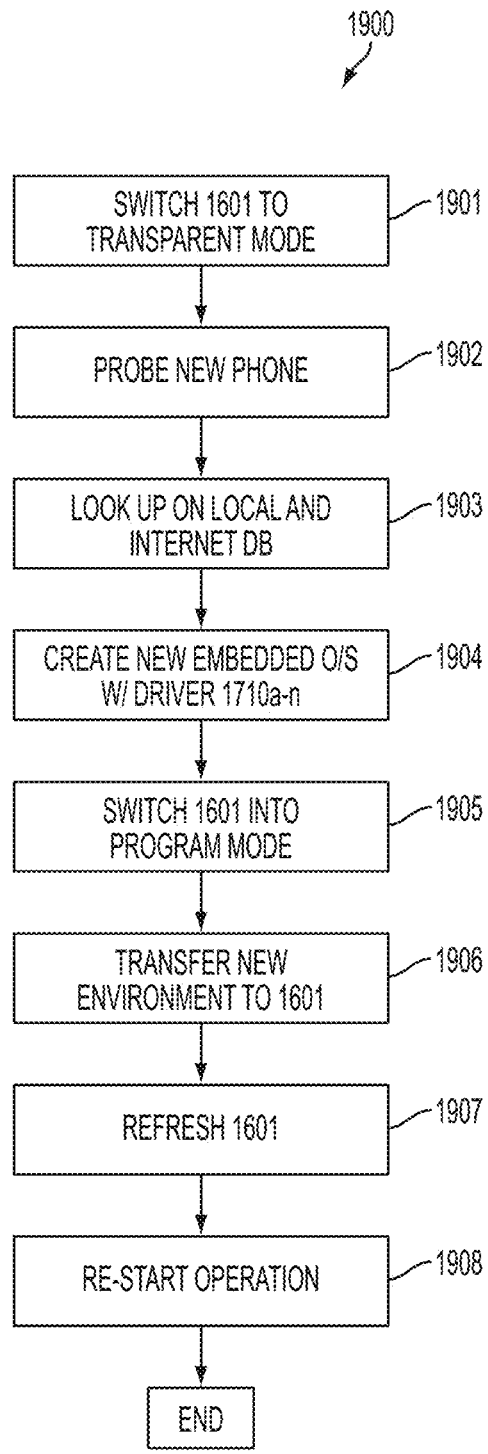
FIG. 19 shows a detailed overview of an exemplary system for updating software in a device.

FIG. 19 shows an exemplary process 1900 for updating software in a device 1601. In step 1901, the system switches unit 1601 to transparent mode. In step 1902, computer 1712 probes mobile communication device 1714 (via device 1601, which is now transparent) to determine its model and possibly the parameters needed to parameterize new drivers. In step 1903 the system looks up the identity and drivers of device 1714 on both local computer 1712 and a remote expert system, as explained in the discussion of FIG. 13, previously, at step 1303. In step 1904, the system creates a new embedded operating system for device 1714 with drivers 1710*a-n*. In step 1905, the system switches unit 1601 to programmable mode, and in step 1906, it then transfers the newly created operating system and drivers to unit 1601. In step 1907, the device 1601 is reflashed, meaning that part or all of the content of the software section of one or more of its nonvolatile memory units (typically, but not always flash memory) is reprogrammed with the downloaded data from step 1906, making the change definitive. In step 1908, the system restarts the operating system of unit 1601, and then the process terminates.

Figure 20:
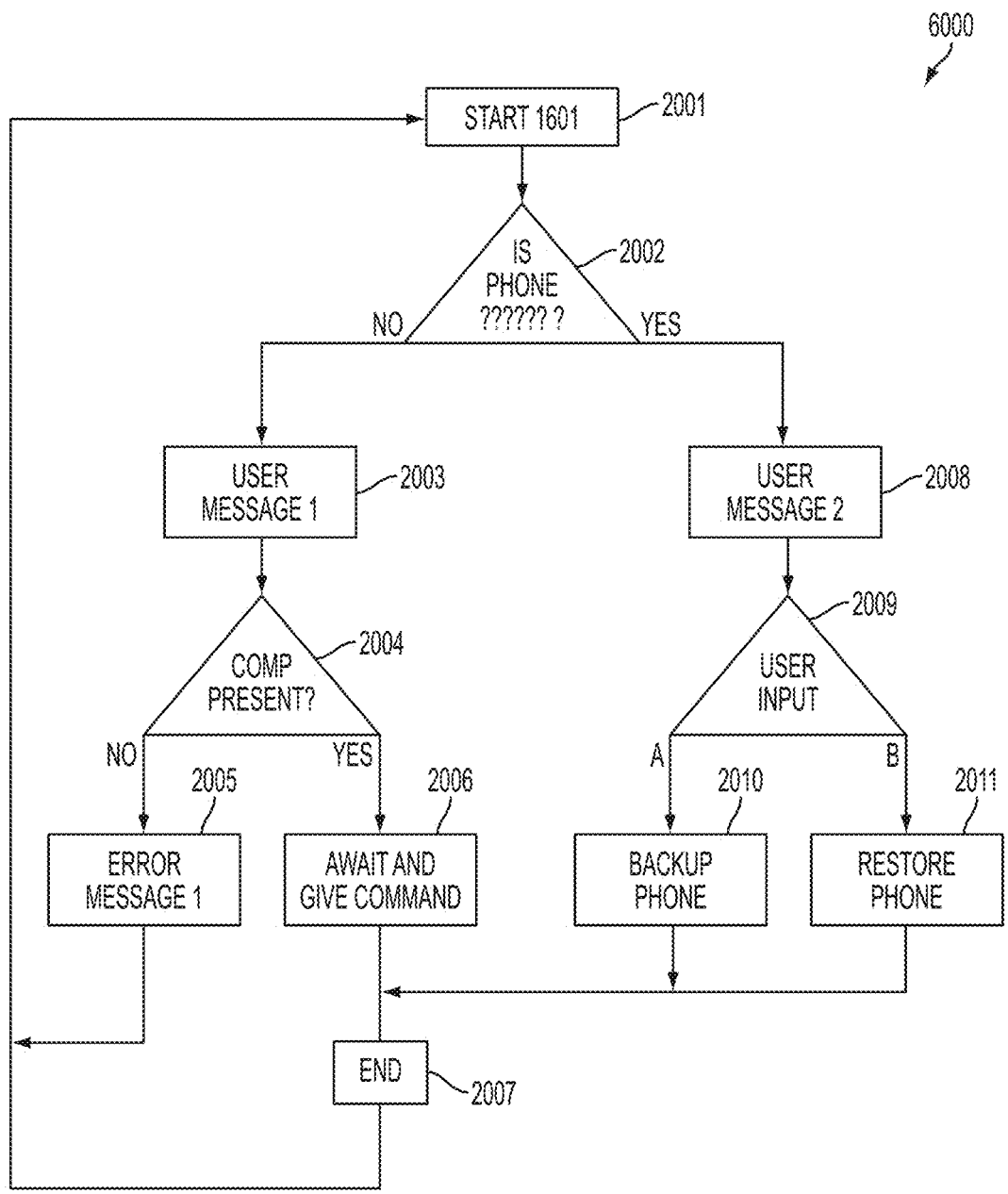
FIG. 20 shows an exemplary process for backing up data from a mobile communication device.

FIG. 20 shows an exemplary process 2000 for backing up data from a mobile communication device, such as device 1714, according to one aspect of the system and method disclosed herein. In step 2001, unit 1601 is begins operation. In step 2002, unit 1601 determines whether it contains information about the identity of device 1714. If it does not (no), the process moves to step 2003, where it displays a message indicating that it cannot identify device 1714. In step 2004, unit 1601 checks to determine whether it is connected to a computer, such as computer 1712. If it is not (no), unit 1601 displays an error message and the process moves back to step 2001, as it has no useable input (besides power) or output to perform any tasks. In some cases, it may wait for user input before continuing back to step 2001. If in 2004, unit 1601 detects that it is connected to a computer (yes), the process moves to step 2006, where the system executes process 1900, described above, and the process ends at step 2007. If in step 2002, unit 1601 determines that it does contain information about the identity of device 1714 (yes), the process moves to step 2008, where unit 1601 displays a message asking the user to choose whether to back up data from device 1714 (A) or restore data to device 1714 (B). If the user elects to back up data, in step 2010 unit 1601 backs up data from device 1714 and the process ends at step 2007. If the user elects to restore data, unit 1601 restores data to device 1714 and the process ends at step 2007.

It is clear that many modifications and variations of this embodiment may be made by one skilled in the art without departing from the spirit of the novel art of this disclosure. For example, the device 1601 may be used with computers 1712 that do not have special software installed by mimicking a flash USB drive, and enabling them to exchange information by reading and writing both by the computer 1712 and processor 1701 to and from that drive. In some cases, the drive may present a section with software that can be installed on a guest computer 1714. In yet other cases, the device 1601 may present itself as both a USB drive and a CDROM with auto-launch, to install software, or to connect to a Website, from which software can be downloaded and installed etc. These modifications and variations do not depart from the broader spirit and scope of the invention, and the examples cited here are to be regarded in an illustrative rather than a restrictive sense.

What is needed is a system and method that enables the parallel programming of many handsets. One of the biggest problems is that the USB connection used by most software for reprogramming handsets has largely unknown limitation: At any given time only one USB device is connected to the host controller and thus to the host. Therefore, if a USB device sends a request while the host is talking to another USB device, that request may be lost. Generally, the device is expected to re-transmit by itself, which is not a problem in normal operating mode; however, often during reprogramming only a very reduced, basic I/O system is available, akin to a bootstrap ROM with very limited capabilities. As a result, if multiple handsets or mobile communication devices, both of which in this example are USB devices, are programmed concurrently, often some "hang up" and the process must be restarted. This hang-up and the associated loss of time and productivity is the result of lost communication packets between the host and the (mobile communication) device being reprogrammed. The way to avoid these frequent packet losses and restarts is to give each USB device its own USB tree with its own USB host controller. The host controller is then dedicated to that device only, and it has the ability to buffer commands before they continue to travel through the PCI bus and into the CPU.

Figure 21:
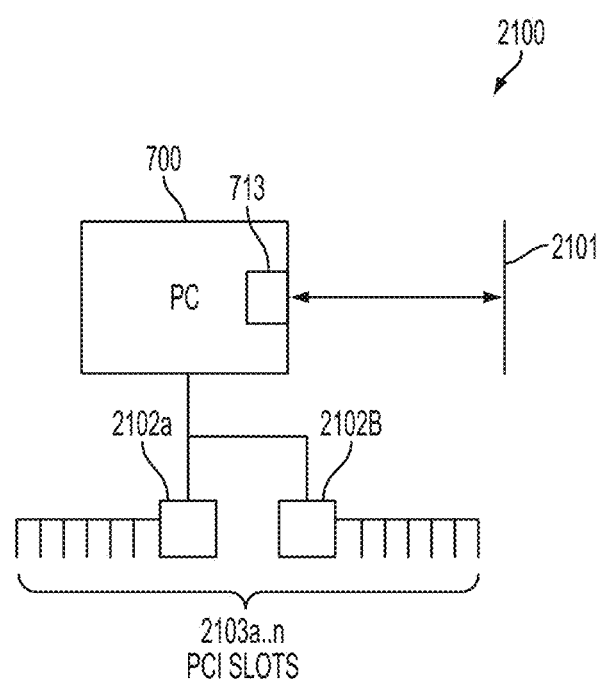
FIG. 21 shows an enhanced system according to one aspect of the system and method described herein.

FIG. 21 shows an enhanced system 2100, according to one aspect of the system and method described herein. System 2100 has a PC 700 (similar to the computing system described in the discussion of FIG. 7), which has an additional enhanced PCI bus/motherboard. Two PCI bridges 2102a and 2102b expand the number of available slots for USB peripheral devices such as mobile communication devices, providing up to 18 such slots. Such computers with up to 18 slots are manufactured for uses such as co-location by telephone companies. For example, 16 USB cards, each of which can handle four phone lines at a time, could be plugged in.

Figure 22:
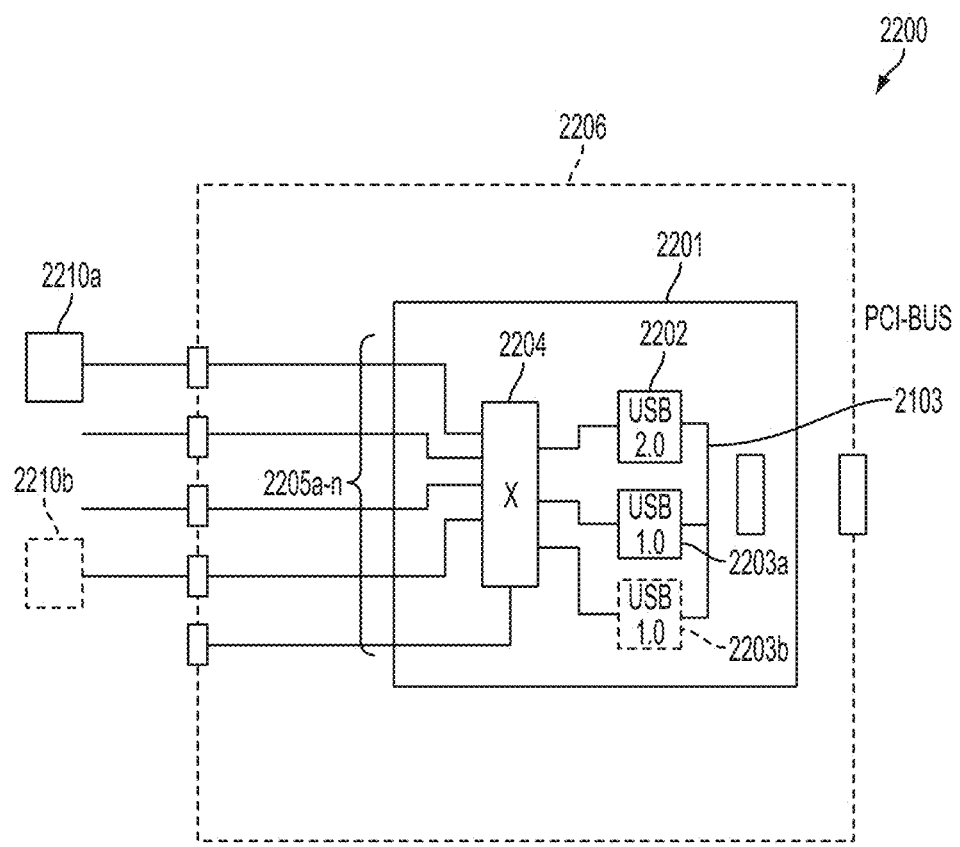
FIG. 22 shows a bus and interface system.

In the case of the system and method disclosed herein, a multitude of PCI cards may be plugged into the available PCI slots 2102a and 2102b, such as, for example, PCI card 2206, shown in FIG. 22. That PCI card 2206 has a typical PCI USB controller chip 2201, which on one side connects to the PCI bus 2103. In this example, PCI card 2206 also has five USB ports, 2205a-n. Typical for PCI cards are five USB ports, one USB host controller 2202 for USB 2.0, and one or two host controllers for USB 1.0 hubs 2203a, and in some cases 2203b. Two USB 1.0 hubs are necessary because in USB 1.0 architecture, each node typically can only address four nodes, and because the card has five ports, at least one port must be addressed by a separate host controller. Cross-matrix 2204 enables the correct connection and selection of the active port(s) to the respective host controllers. Because this exemplary PCI USB controller chip 2201 has two USB 1.0 host controllers, in the case of programming mobile communication devices 2210a-n, which use USB 1.0, two such devices can be programmed concurrently, as long as each device connects to its own host controller 2203a or 2203b. This approach avoids the loss of communication packets. Because in that configuration, once installed and set up, cross matrix 2204 does not change, it therefore maintains a dedicated connection from each device 2210 to each host controller 2201.

Figure 23:
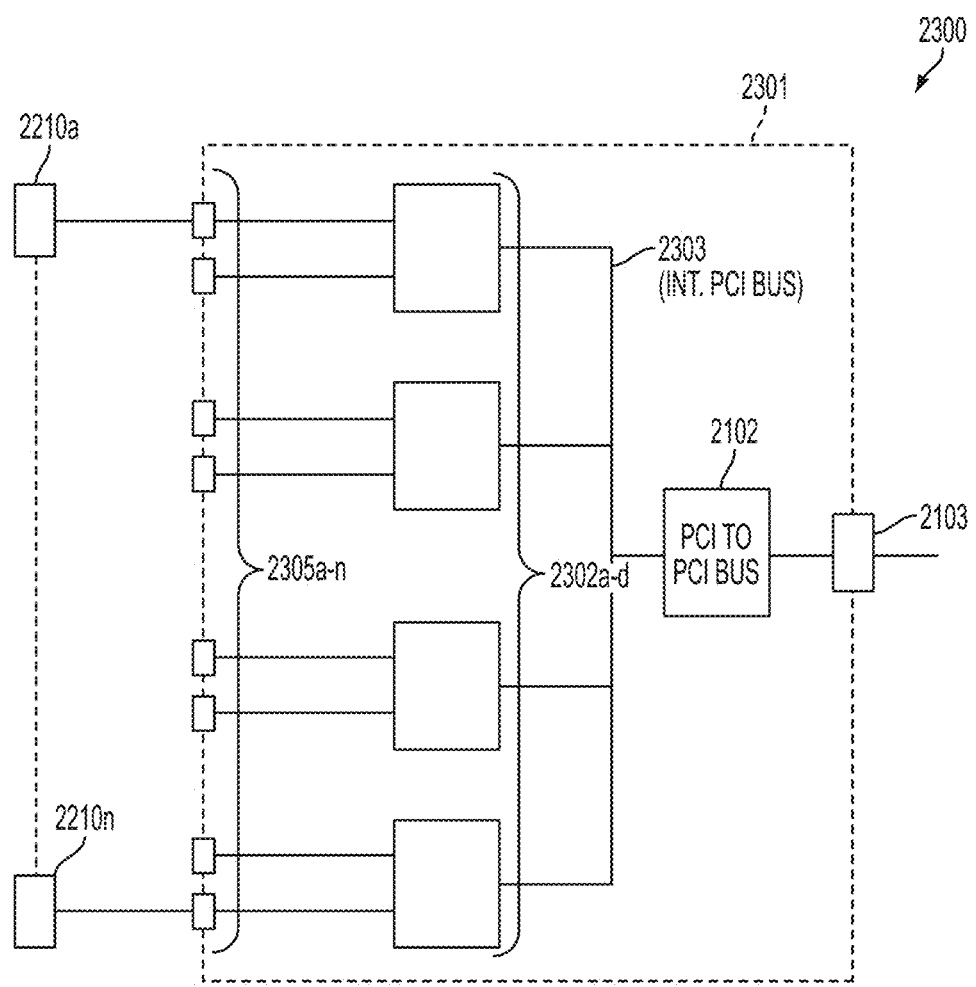
FIG. 23 shows an enhanced USB PCI card.

FIG. 23 shows an enhanced USB PCI card 2301, which has its own PCI-to-PCI bridge 2102. It creates an internal PCI bus 2303, on which multiple PCI USB controller chips 2302a-d are shown. (Typically a PCI segment is limited to four loads.) Each PCI USB controller chip could, using the same architecture described in above in the discussion of FIG. 22, provide two active ports, 2305a-n, thus supporting connection of up to eight USB devices (mobile communication devices), such as devices 2210a-n, to one PCI card. Using this type of card, the capabilities of even a standard office computer, for example, with typically four to six available PCI slots, can be extended. The upper limit of the total number of USB devices in a system is currently 127. Because the motherboard typically contains three to five USB devices and each USB host controller, such as 2202 or 2203, count as one as well, each PCI USB controller chip uses three USB identifiers for itself, limiting the total number available for external USB devices. Also, often system peripherals, such as a sound card, web cam, keyboard, mouse, etc. may be connected through a USB hub and therefore further reduce the number of available USB identifiers. All these uses of USB identifiers must be taken into consideration when calculating how many mobile communication devices can be handled simultaneously by one computer.

Figure 24:
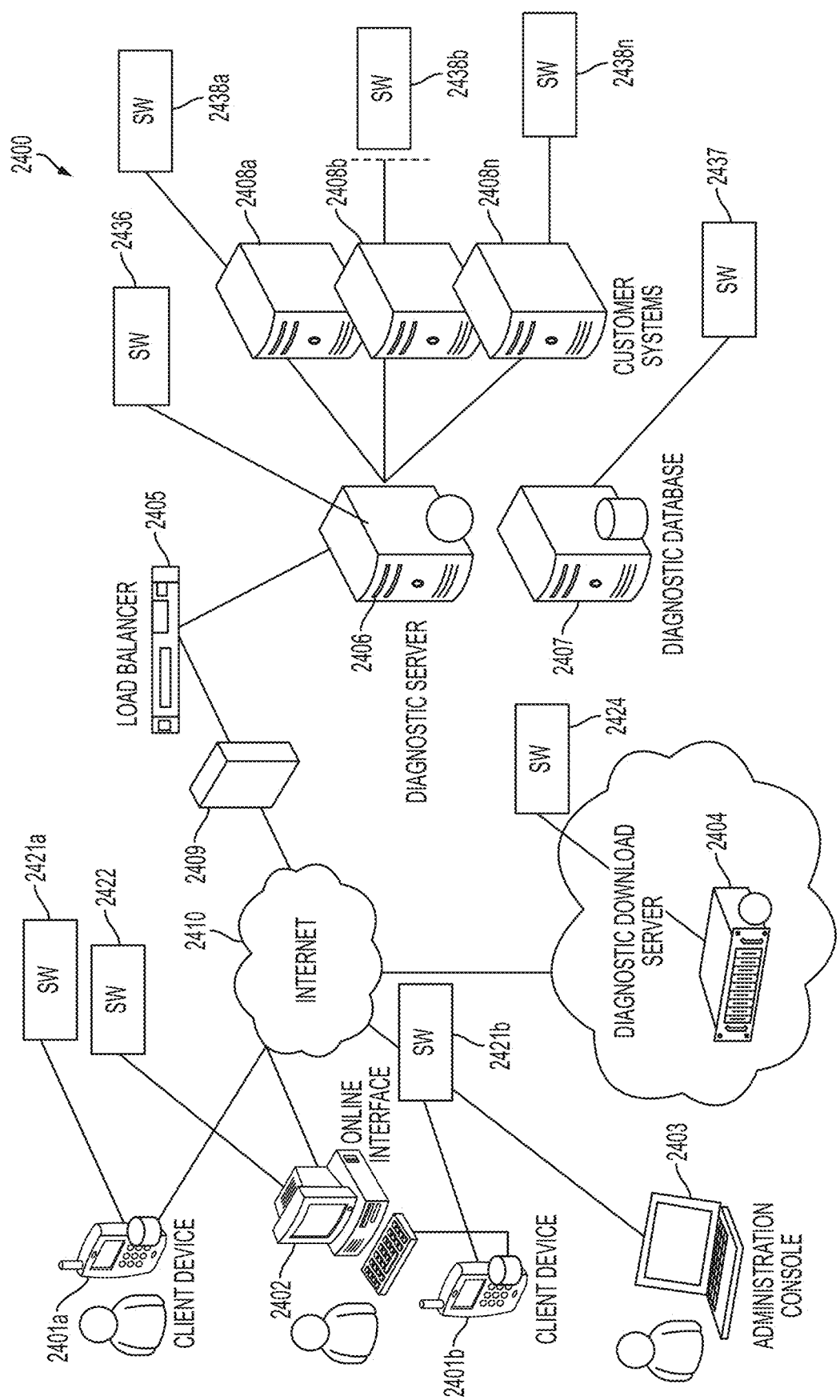
FIG. 24 shows an overview of an exemplary system for enhanced diagnostics.

FIG. 24 shows an overview of an exemplary system 2400 for enhanced diagnostics according to one aspect of the system and method disclosed herein. The devices under test (DUTs) are client devices 2401a and 2401b. DUT 2401a connects to the Internet 2410 via wireless connection (over a network, not shown). DUT 2401b is connected to a computer 2402. Software instances 2421a and 2421b are testing DUTs 2401a and 2401b, respectively. Also, software 2422, such as interconnectivity software or a special driver, may reside the desktop computer 2402. Between Internet 2410 and load balancer 2405 is a firewall 2409. Often the firewall and the load balancer may be combined. Also shown is a main diagnostic server 2406, which in this case is exemplary of one or more servers. Server 2407 manages a diagnostic database. All servers 2406 and 2407 contain, respectively, software 2436 and 2437. Similarly, customer (i.e., carrier) systems 2408a-n contain software instances 2438a-n. Diagnostic server 2406 may download diagnostic and background data as well as any other related data into server 2404, which may be a local server in the domain of a network provider. Server 2404 contains software 2424, which is a partial or full copy of the system and/or the data downloaded from server 2406, or any of its connected servers. Administration console 2403 may connect to one or more server(s). Typically, console 2403 would not require special software to connect to said server(s), because web interface software could be used, requiring only a web browser. In some cases, however, special client software (not shown) may be downloaded from one of the servers, or a special browser plug-in may be downloaded to enhance performance and reduce overhead during operations.

Figure 25:
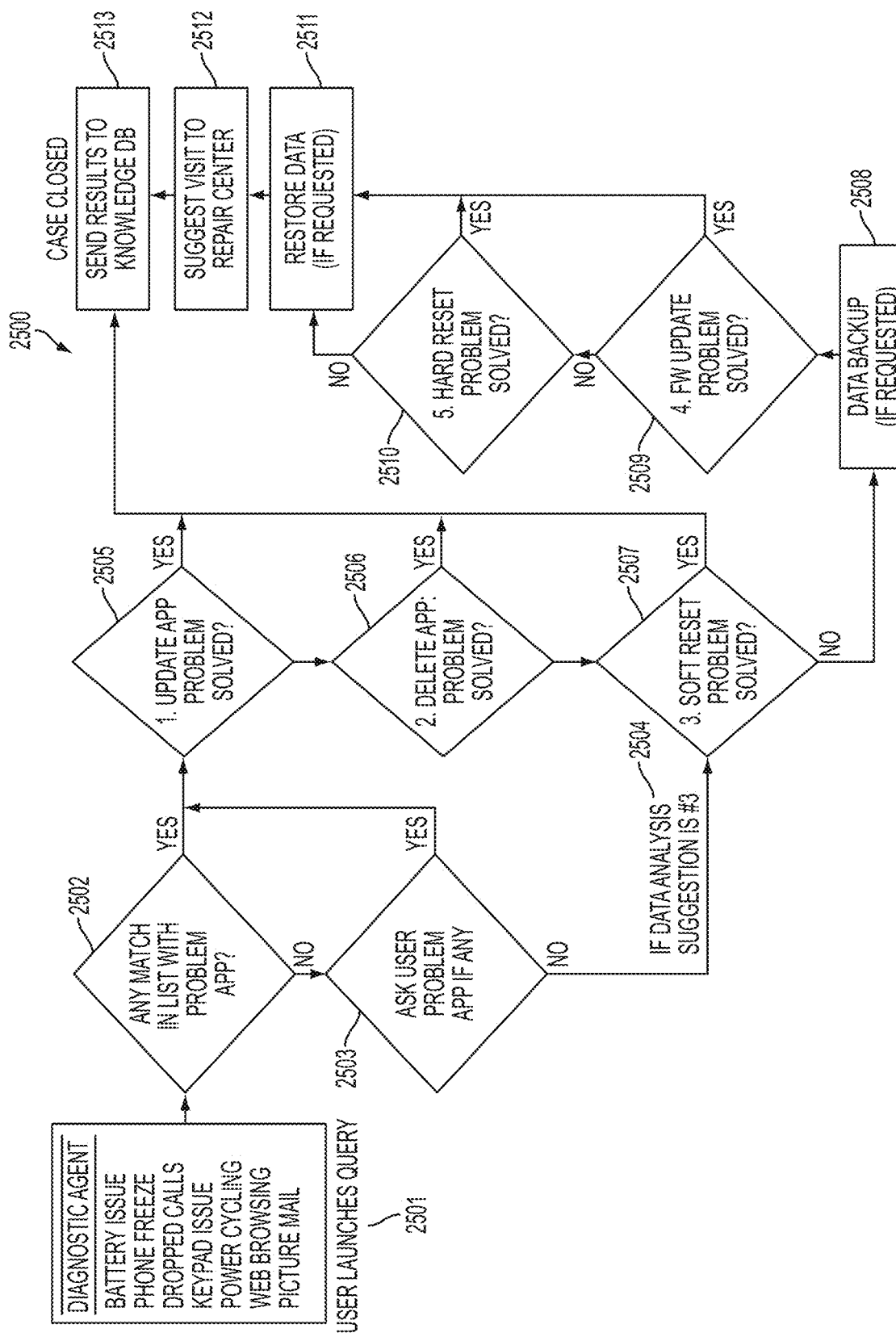
FIG. 25 shows an exemplary process for implementation of the system according to one aspect of the system and method disclosed herein.

FIG. 25 shows an exemplary process 2500 for implementation of the system according to one aspect of the system and method disclosed herein. In step 2501, the user launches the diagnostic application and screen 2511 opens, wherein the user may select from a list the particular application with which he needs help. In step 2502 the system checks if there is an item in the list on the screen, and may have an "Other" field in the list, or in a different menu for the problem application. If not, in step 2503 the system asks the user what the problem is. If it turns out to be that the application exists, the system branches to step 2505. If there is no app, the process continues to step 2504, where it suggests analysis steps outside the automatic venue. The system then continues on to step 2507, where it performs a soft reset of the device. In step 2505, the system updates the problem app. If the problem is solved, the process moves to step 2513, where the system sends the results to the knowledge database. If the problem is not solved, the process moves to step 2506, where the system deletes the application and checks whether the problem is solved. If yes, the process moves to step 2513. In those cases, the offending App can be deleted as part of a trial remedy to resolve an error. If after deletion it was found the App was not part of the problem, then the App would need to be restored. Data backup and subsequent restore could for example, and may be employed in several sections and not necessarily as in this exemplary order. If the problem is not solved, the process moves to step 2507, where the system performs a soft reset of the device. If the problem is solved, the process again moves to step 2513; if the problem is not solved, the process moves to step 2508, where the system performs a data backup and then moves to step 2509, where it updates the device firmware. If the problem is solved, the process moves to step 2511, where the system restores the data; if the problem is not solved, the process moves to step 2510, where the system performs a hard reset. If the problem is solved, the process moves to step 2511, where the system restores the data; if the problem is not solved, system notes the failure but still moves to step 2511 and restores the data. After restoring the data in step 2511, the system in step 2512 suggests a visit to a repair center, and again in step 2513 sends all results, via either wired or wireless communication means, back through the cloud to the knowledge database.

Figure 26:
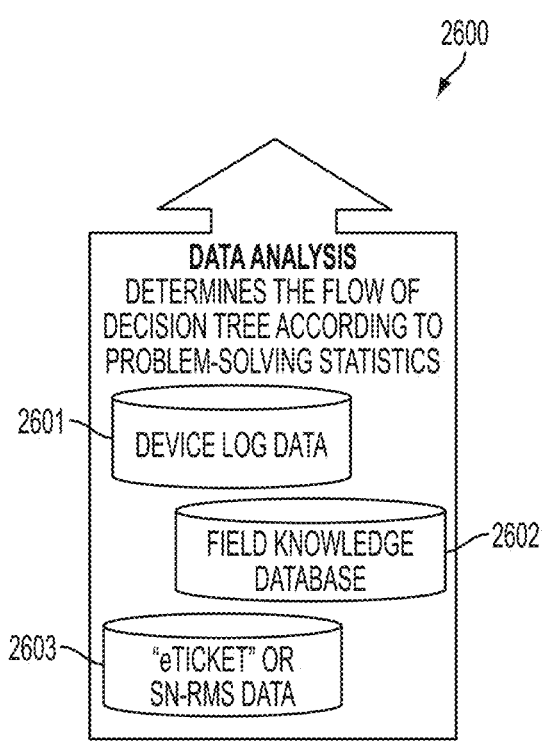
FIG. 26 shows an overview of the data flow as it is analyzed.

FIG. 26 shows an overview of the data flow 2600 as it is analyzed. The initial "eTicket" data 2603 (electronic Ticket or error report) is analyzed in the device 2401a or 2401b respectively by some local software. If that software cannot determine the nature of the problem, the investigation is escalated to the field knowledge database 2602. If that examination does not yield a clear conclusion, the device log data 2601 is pulled into the main diagnostic server 2406 and further analyzed there.

Figure 27:
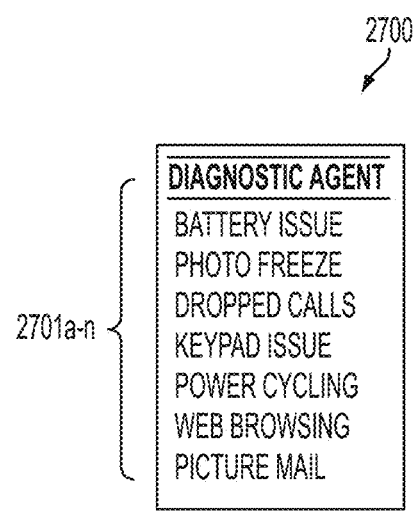
FIG. 27 shows an overview of an exemplary screenshot according to one aspect of the system and method disclosed herein.

FIG. 27 shows an overview of an exemplary typical screenshot 2700, according to one aspect of the system and method disclosed herein, which screen would appear in response to a user request for troubleshooting assistance or in response to a data analysis software conclusion that a problem exists. Screenshot 2700 offers the user a selection of options 2701a-n for investigation. For example, if the user selects option 2701a, the battery issue, another screen opens, as shown in FIG. 28.

Figure 28:
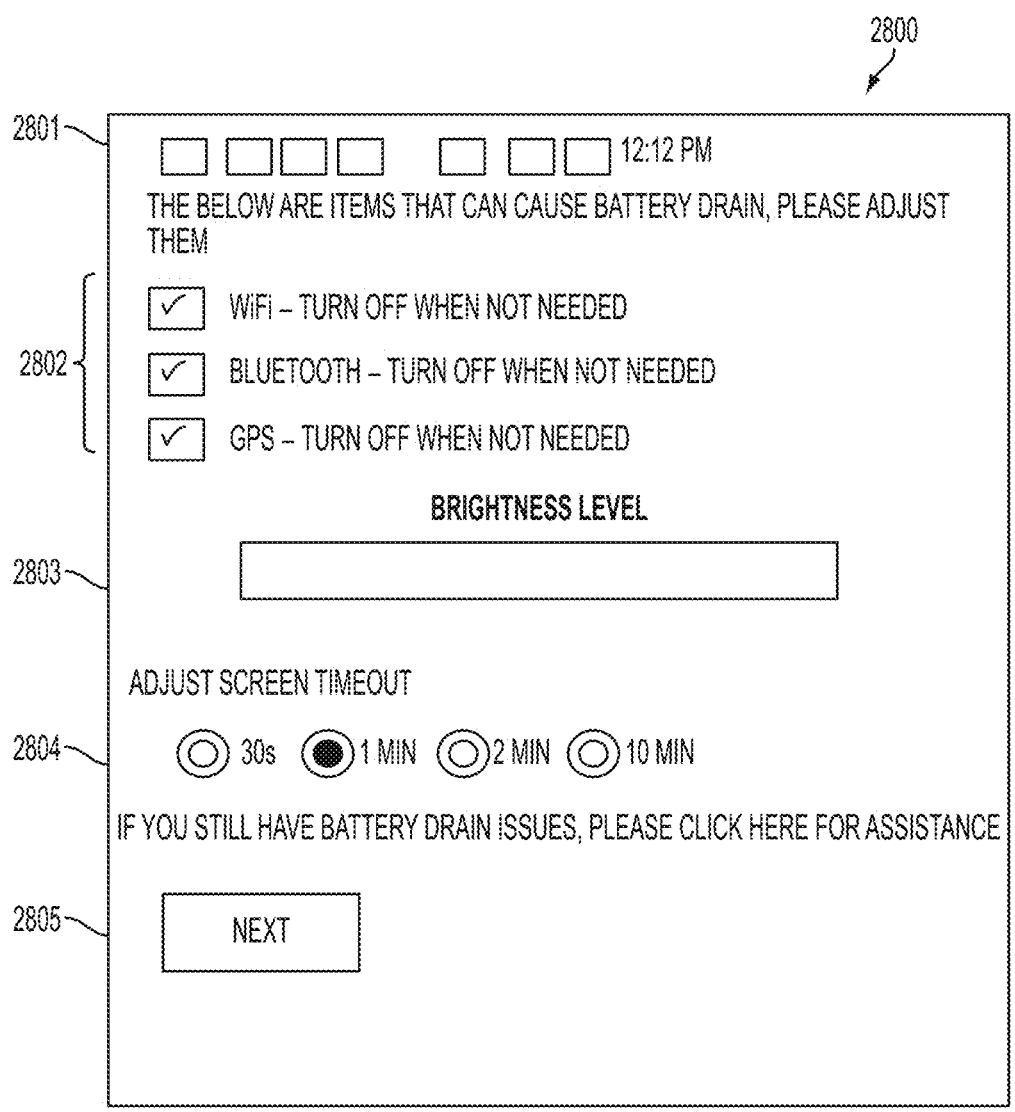
FIG. 28 shows an overview of an exemplary screenshot according to one aspect of the system and method disclosed herein.

FIG. 28 shows an overview of an exemplary typical screenshot 2800, according to one aspect of the system and method disclosed herein. At the top of the screen is an array 2801 of basic information about the device and its functions, such as, for example, its network and its battery. A list 2802 of functions that use battery power and that may be enabled or disabled is presented. Also shown is an option to control brightness level in bar 2803. Screen timeout selections 2804 let the user select the duration of screen illumination after any activity. One or more button(s) 2805 let the user move to the next step in the process. Additional buttons (not shown) may let the user test new settings or selection other options.

Figure 29:
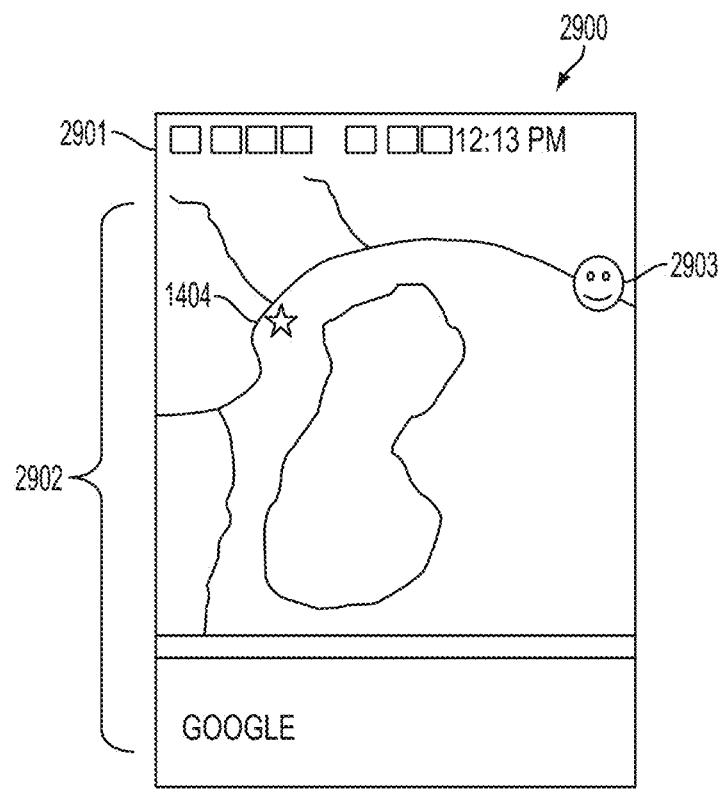
FIG. 29 shows an overview of an exemplary screenshot according to one aspect of the system and method disclosed herein.

FIG. 29 shows an overview of an exemplary typical screenshot 2900, according to one aspect of the system and method disclosed herein, which may open if the user selects a GPS option. Screenshot 2900 shows a map of a selected area. Again, array 2901 shows basic information about the device and about this particular function. Map 2902 shows the selected map, with face icon 2903 representing the user's location and star 2904, the desired destination, typically in this use, the nearest available service location.

Figure 30:
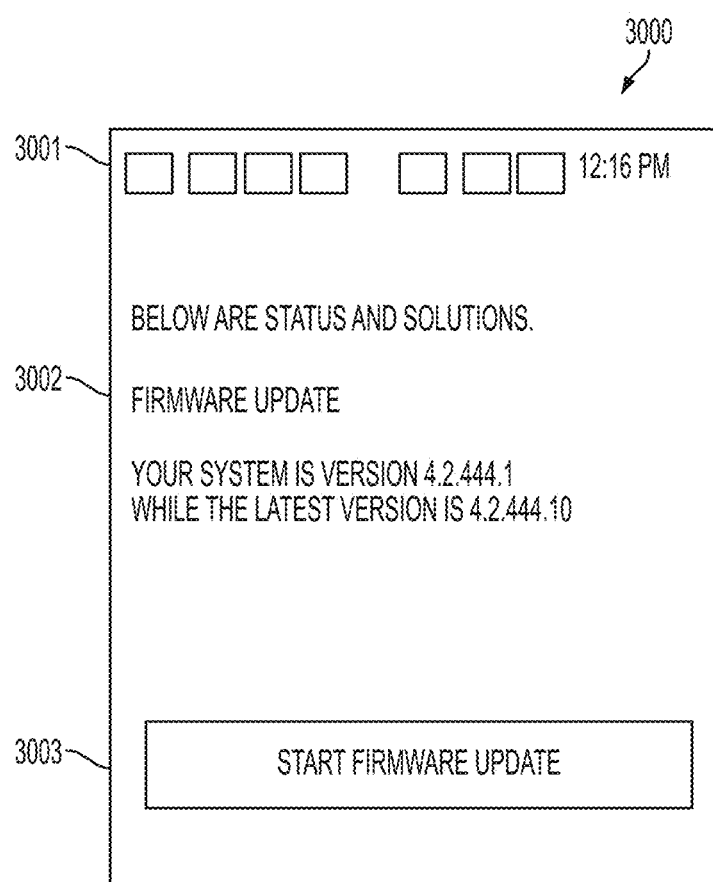
FIG. 30 shows an overview of an exemplary screenshot according to one aspect of the system and method disclosed herein.

FIG. 30 shows an overview of an exemplary typical screenshot 3000, according to one aspect of the system and method disclosed herein, which shows the user that the diagnostic program recommends a firmware upgrade. Again, array 3001 shows basic information about the device and about this particular function. Message 3002 informs the user of the recommended action and give some of the findings of the diagnostic software, and button 3003 prompts the user to start the recommended action. Starting a firmware upgrade may include such system actions as checking that reception quality is adequate, that the user is not driving or flying, that battery level is adequate to complete the task without crashing during the process, and that there is enough space in the device's flash storage to ensure that user information is not overwritten. In some cases, the system may back up user information over the network before beginning the upgrade.

Figure 31:
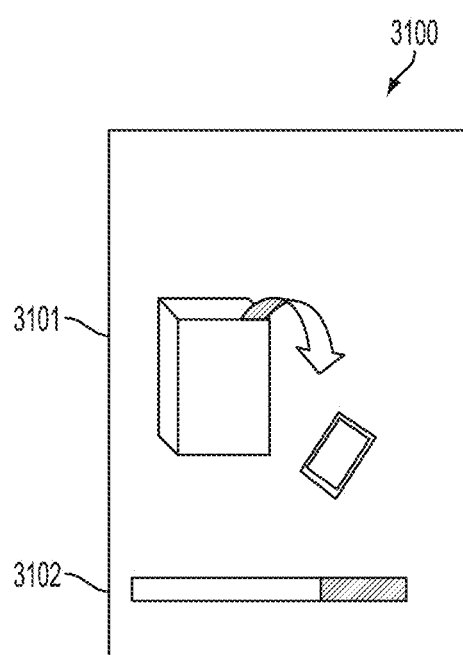
FIG. 31 shows an overview of an exemplary screenshot according to one aspect of the system and method disclosed herein.

FIG. 31 shows an overview of an exemplary typical screenshot 3100, according to one aspect of the system and method disclosed herein, of the type that the system may display to the user on the device during the firmware upgrade. Graphic 3101 indicates that new firmware is moving onto the device, while progress bar 3102 shows the user the progress of the operation.

Figure 32:
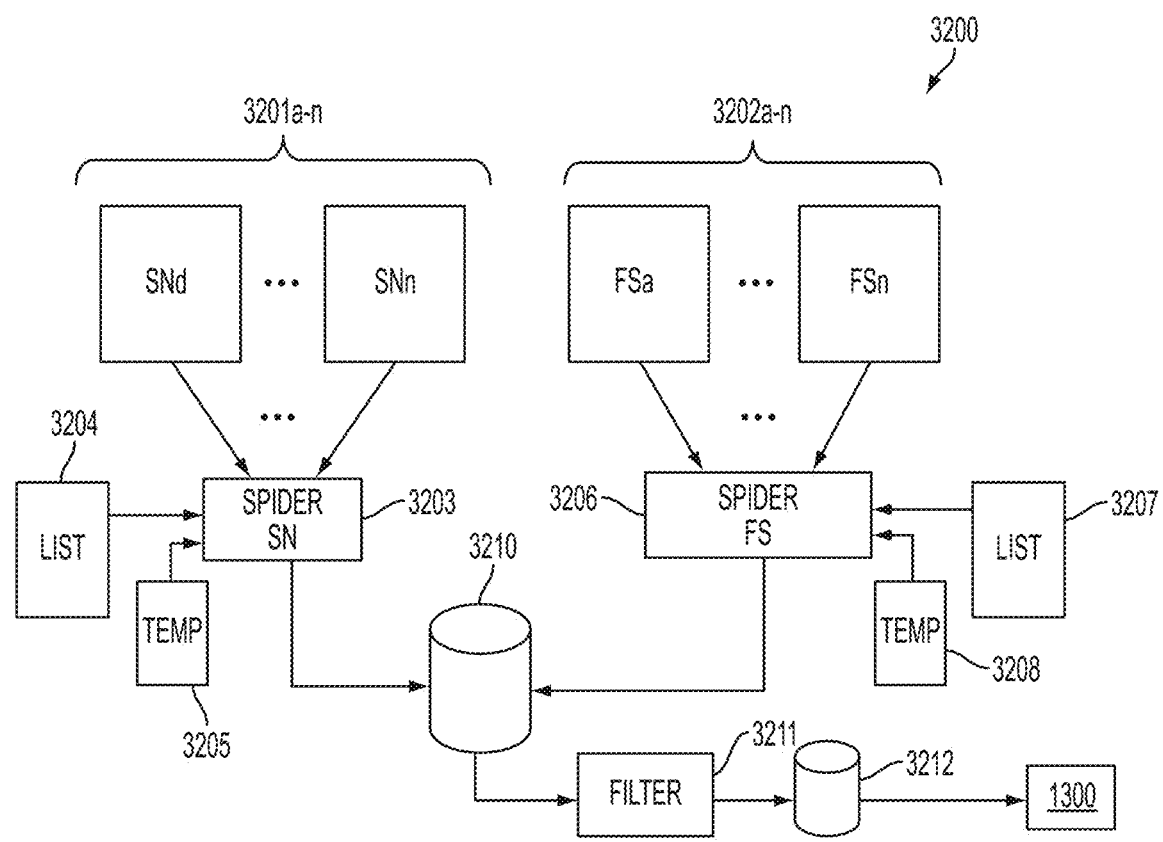
FIG. 32 shows an overview of a system for identifying software-created problems and operational disruptions in smart phone computing devices and other mobile computing devices with cellular connections.

FIG. 32 shows an overview of a system 3200 for identifying software-created problems and operational disruptions in smart phone computing devices and other mobile computing devices with cellular connections, such as, for example, tablets, etc., according to one aspect of the system and method disclosed herein. However, mobile devices with any type of data connection (cellular, WiFi, bluetooth or other wireless communications) should be considered possible devices upon which to use the systems and methods described herein.

The system comprises social networking sites SNa-SNn 3201a-n and technical forum sites FSa-FSn 3202a-n, all of which sites may be searched by a type of web-site scanning software known in the art as a "spider." In this example, two different spiders SN 3203 and FN 3206 search the two types of sites 3201a-n and 3202a-n, respectively, because each spider has been optimized to search its respective type of site. Thus spider 3203 is optimized to search social networking sites 3201a-n, which sites may include, but are not limited to, such social networking sites as Facebook, Twitter, Myspace, LinkedIn, etc. Similarly, spider 3206 is optimized to search technical forum sites. Spider 3203 has a list 3204 of sites to visit and a list of templates 3205, each template being designed for a particular site or site subset to optimize the extraction of data from each site. Extracted data is then stored in data store 3210. Similarly, spiders 3206 and 3209, which may be copies of essentially the same software running in different specialized configurations, or may be completely different versions, use site list 3207 and template set 3208, respectively. Both the list and the template set may be amended as needed over time, typically manually, although automatic amending of their data in whole or in part is contemplated within the scope of this invention. When data is collected in data store 3210, the system applies a filter 3211, which filter removes irrelevant data and organizes the relevant data by such criteria as phone make, model number, etc., creating a list of harmful combinations of model IDs, OS versions, and other device characteristics that in conjunction with one or more programs negatively impact the user experience. The organized data is then stored in data store 3212. In an embodiment, the system then can sort the data into types of faults and problems and try to identify software that users blame for operating faults and unsafe operations.

Figure 33:
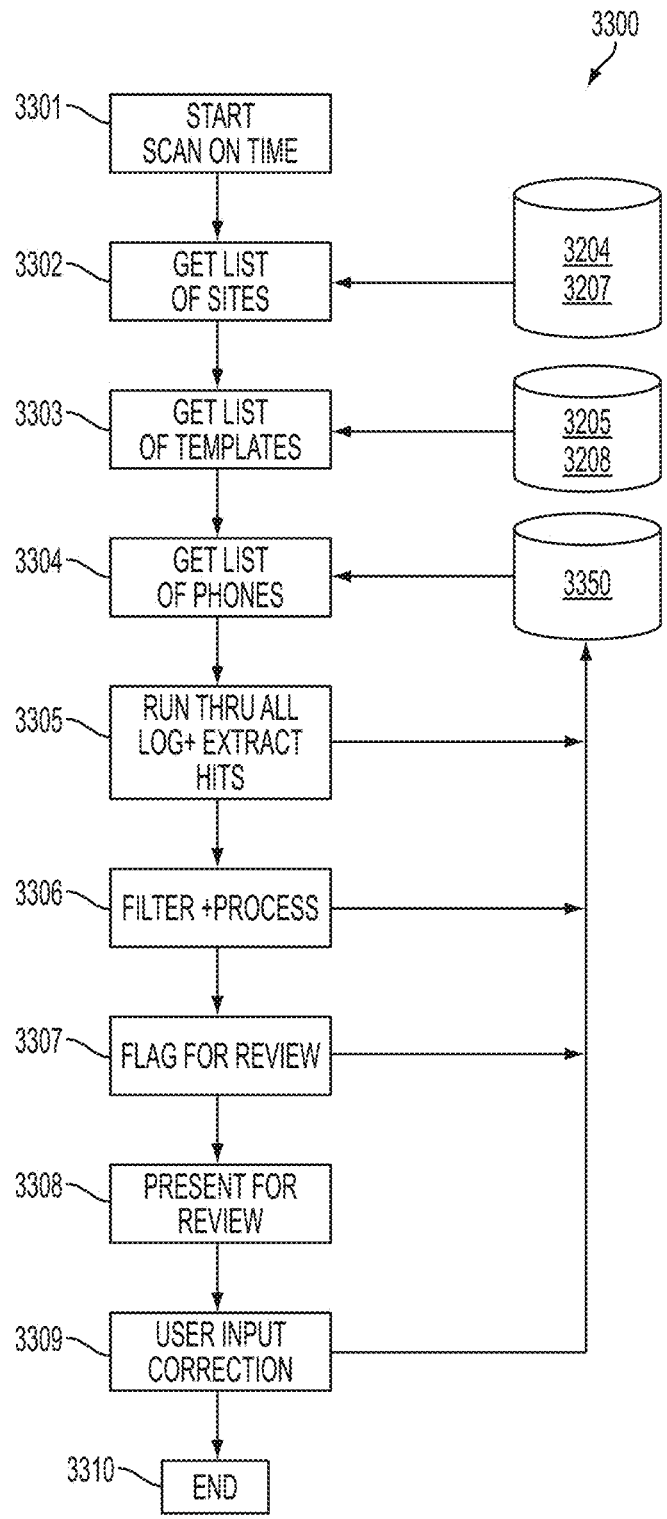
FIG. 33 shows an exemplary process for data retrieval and analysis by system software running on a computer or server.

FIG. 33 shows an exemplary process 3300 for data retrieval and analysis by system software running on a computer or server, as described above and throughout, according to one aspect of the system and method disclosed herein. In step 3301 the system starts the scanning at a specified time. In some cases, the system may continually be scanning web sites; in other cases, the system may scan at preset intervals such as, for example, once a day, once a week, at particular times, or upon the occurrence of a particular event. Some web sites have rules about the specific number, size, and/or frequency of visits or downloads allowed to site scanning software or so-called robots, and these are typically specified in a robots.txt file at the root directory of a site or subsection. Such site-specific rules are recorded in templates 3205 and 3208. In step 3302, the system retrieves its lists 3204 and/or 3207 of sites to scan, and in step 3303 it applies the templates 3205 and/or 3208 to the listed sites.

With continued reference to FIG. 33, in step 3304, the system retrieves from data store 3350 a list of phones for which it should particularly look on the object sites. In an embodiment, this list is user-generated or based on error reports found at a scanning site, where incoming suspect devices are scanned for trouble. Further, in some cases, the list may be manually extended based on inquiries from field support, for example in stores, as well from reports in call centers, etc. The list may be updated whenever required automatically as reports about phones that are not yet listed as having problems reach a certain level or frequency, or manually when suggestions to add certain phones are made to the system operators. In step 3305 the system reads all the scan logs and extracts all the hits. In step 3306 the system applies filters, such as filter 3311. Various types of filtering criteria may apply; for example, responses that don't identify the problem phone specifically enough or snide comments and other inappropriate language may be removed. In step 3307 the system flags elements of interest for review. If the issue is clearly of interest (above a certain relevancy level) the system may book it directly. If the relevancy level is not high enough, but above a predetermined relevancy level so as to be of potential interest, in step 3308 the system presents the issue to a technician or other suitable person for manual review. In step 3309 the system operators review and resolve the presented issues, and in the 3310 the process ends, to begin again either immediately or as scheduled.

Figure 34:
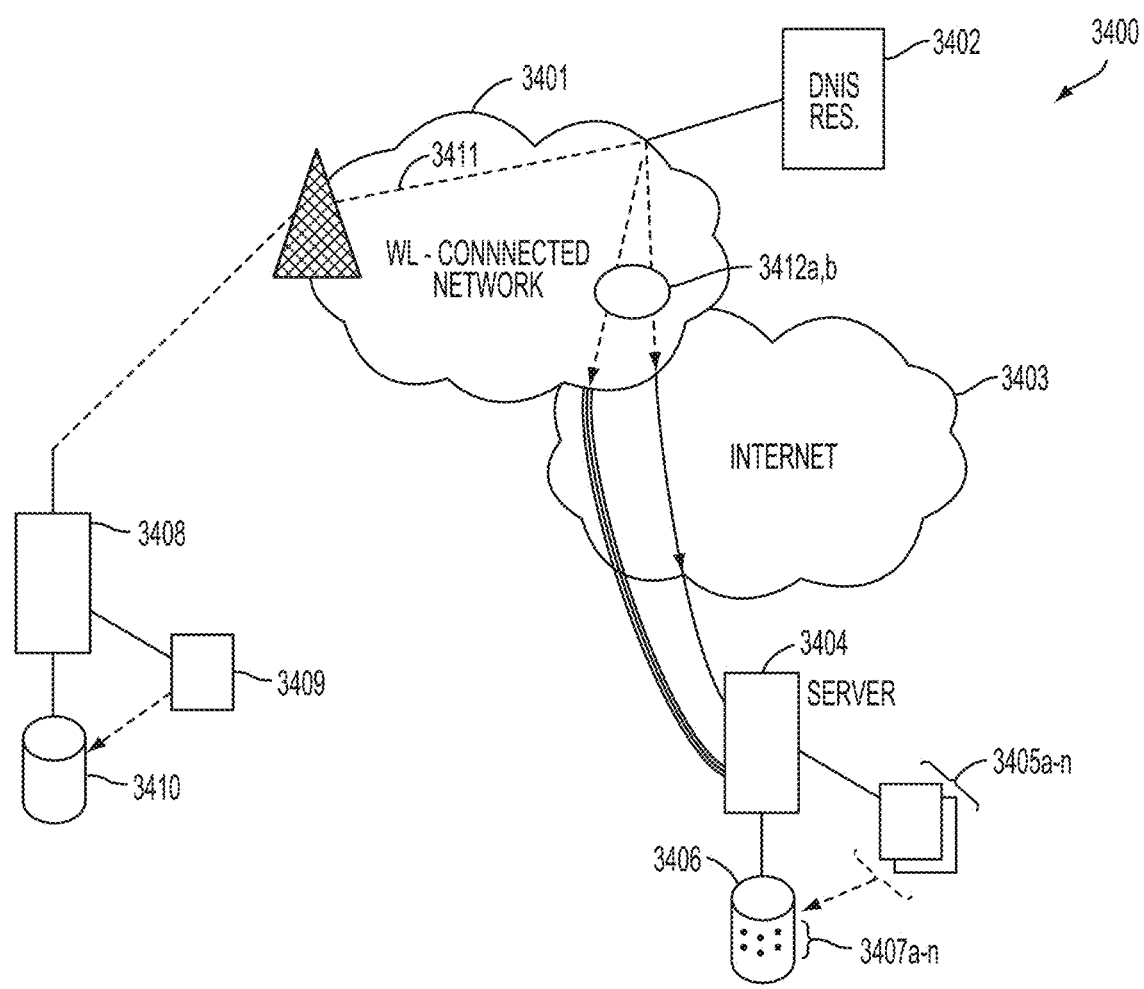
FIG. 34 shows an overview of an exemplary system for reprogramming phones.

FIG. 34 shows an overview of a system 3400 for reprogramming phones according to one aspect of the system and method disclosed herein. A mobile computing device or smartphone 3408 initially contains standard code 3409 and a storage 3410, such as, for example, a micro SD card. Device 3408 is connected to a network 3401 of a carrier. Typically, the phones can be activated by users by dialing a USSD (unstructured supplementary services data) number (or sequence) and entering some codes accordingly. Typically, a single USSD number connects to the carrier's activation number, and then once the connection is established, the USSD essentially establishes a two-way data connection, similar to a USB connection, over the air, enabling the phone to be reprogrammed under control of a server. Because the USSD number is entered like a number, it often is redirected by a DNIS (Dialed Number Identification Service) server, which resolves the destination number, for instance, server 3402, and then redirected to the USSD server. By using a specially for the purpose described herein setup, nonstandard USSD number or a nonstandard phone number, the initial dialed call or connection can be redirected to an external server such as 3404. That server contains multiple software applications, including an operating system, such as 3405a-n, and other programs as described herein. Further, storage 3406 also contains objects 3407a-n, where the objects are pieces and complete assemblies for over-the-air (OTA) programming of phones, as discussed throughout and later.

Figure 35:
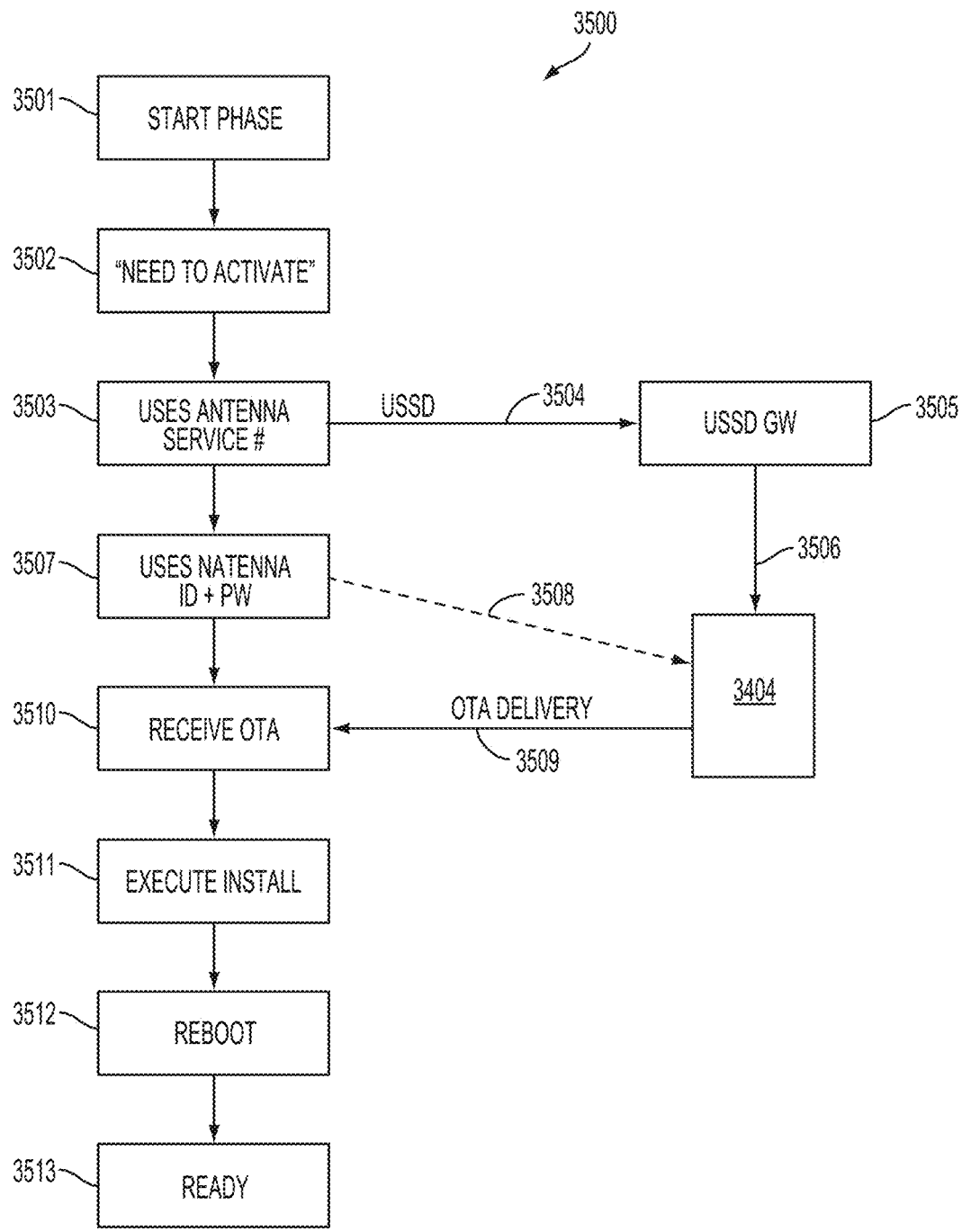
FIG. 35 shows an exemplary process for programming any one of multiple phones.

FIG. 35 shows an exemplary process 3500 for programming any one of multiple phones, according to one aspect of the system and method disclosed herein. In step 3501, a phone is turned on, and in step 3502, a "need to activate" message appears on the phone display. In step 3503 a user, who may be a technician or even an end user to whom a particular phone is or was assigned, further discussed herein, enters the special service number, which number may be, for example, a USSD number or a special phone number for activating the phone. By calling the number, an activation request is sent via transmission 3504 to USSD gateway 3505 for treatment. USSD gateway 3505 typically may be part of the cellular network DNIS server, such as server 3402 (not shown here). In some cases, USSD gateway 3505 may be a separate server, depending on the configuration of the carrier. The transferred request is then redirected via transmission 3506 to server 3404, which contains the OTA images, further discussed herein. In step 3507, the system prompts the user to enter an ID that contains the enterprise customer ID, the user ID, and/or the password. This data is sent via connection 3508, where the connection is typically as USSD type of connection, to server 3404. Server 3404 then delivers, via transmission 3509, the OTA image or package. In step 3510, the phone receives the OTA package (also referred to as a software module), where the package or module is typically a standard part of the basic phone setup. In step 3511, the package installation is executed. The type of installation may vary: it may be a simple overwrite of the ROM programming, or it may be a multi-step process that requires more than one reboot of the phone software. In one embodiment, this process continues largely unattended because the package may be put into the storage device of the phone (such as an SD card or other storage device commonly used in such phones), so that the phone may reboot several times without requiring user interaction. In step 3512, the phone is finally reprogrammed, having rebooted as many times as required, and in step 3513, the phone is ready for use. It is now programmed for its user, with password, account, etc., all preconfigured. The account may include setups for email, control, internal extensions and other customer phone book entries, and other, similar account data.

Figure 36:
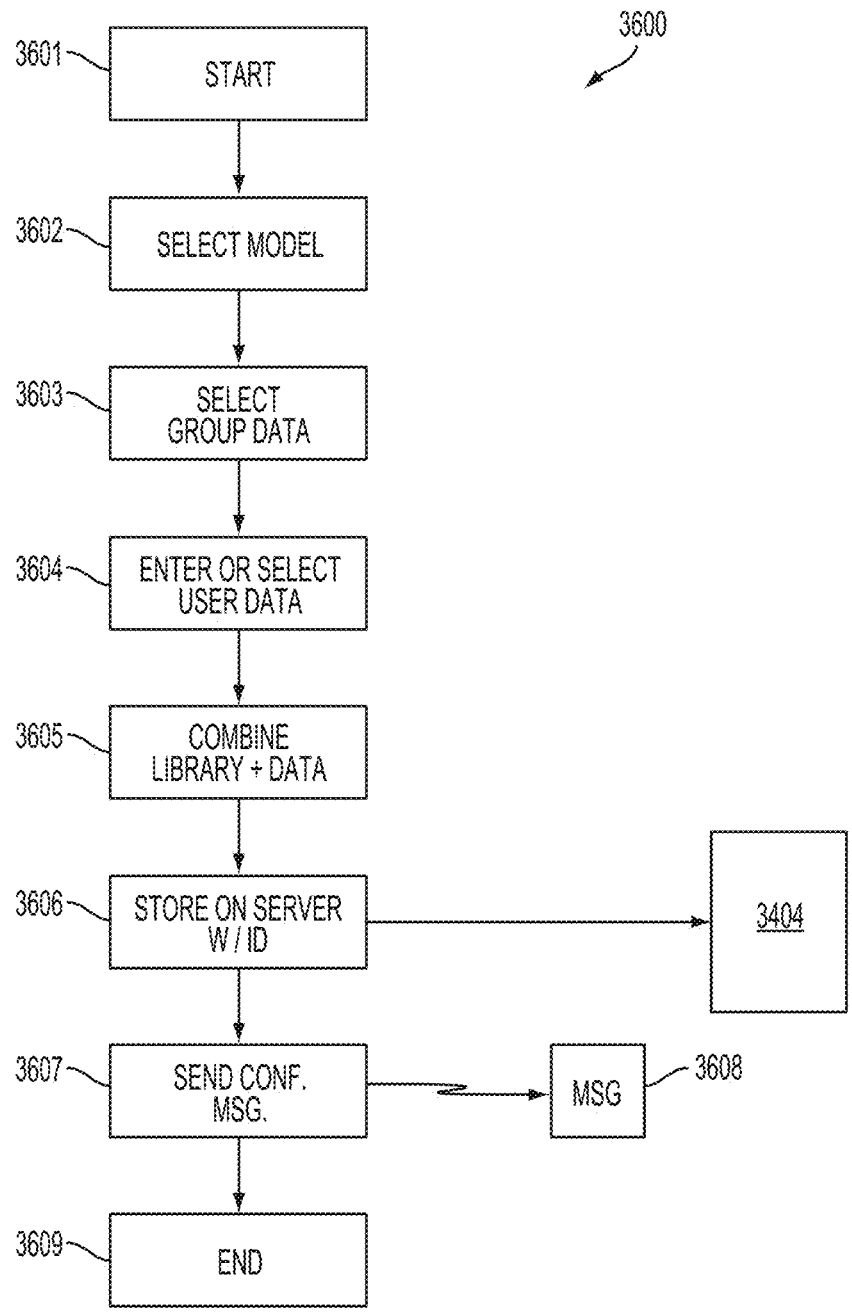
FIG. 36 shows an exemplary process for creating a phone reprogramming package.

FIG. 36 shows an exemplary process 3600 for creating an OTA phone reprogramming package, according to one aspect of the system and method disclosed herein. Process 3600 may be applied to a single phone, multiple phones in one enterprise, or even multiple phones of multiple enterprises. In step 3601, the system is started. In step 3602, a user or technician selects a phone model. In step 3603, the programmer selects group data, which may include any data to be programmed on all the target phones of a group. Typically, such data, for an enterprise customer, could include an IP PBX extension for the enterprise, so the phone is an extension of the IP PBX. Such programming may require installation of additional software, as well as certificates or other credentials to access the particular phone switch. In step 3604, user data is either entered or selected. Individual user data could, for example, be provided by the technician to that package, often in a table or spreadsheet format that is automatically processed and then applied to the data on a one-package-at-a-time basis for the whole list or table. In step 3605, for each phone, a combination package is created, where the package contains one or more of the group data, the individual user data, the carrier data, and any other libraries or additional information needed or desired. In step 3606, that package is stored, with its credentials, in the storage unit of server 3404. This data in the tables or spreadsheets and thus the package with credentials now includes the ID and password described previously in the description of step 3507 of FIG. 35. The ID and password are used to identify and to secure access to the package. In step 3607, one or multiple messages, such as, for example, message 3608, are sent to a technician who is charged with delivering or setting up the phones. The technician or phone user would then execute the process described in the discussion of FIG. 35, above. After delivery of the message, the process ends in step 3609. Both the package describe above, in the discussion of FIG. 36, and part of the program likewise described previously in the discussion of FIG. 35 are stored on server 3404 as part of the software mentioned in the discussion of FIG. 34, as programs 3505-*x*1 through 3505-*x*2, within the range a-n.

Figure 37:
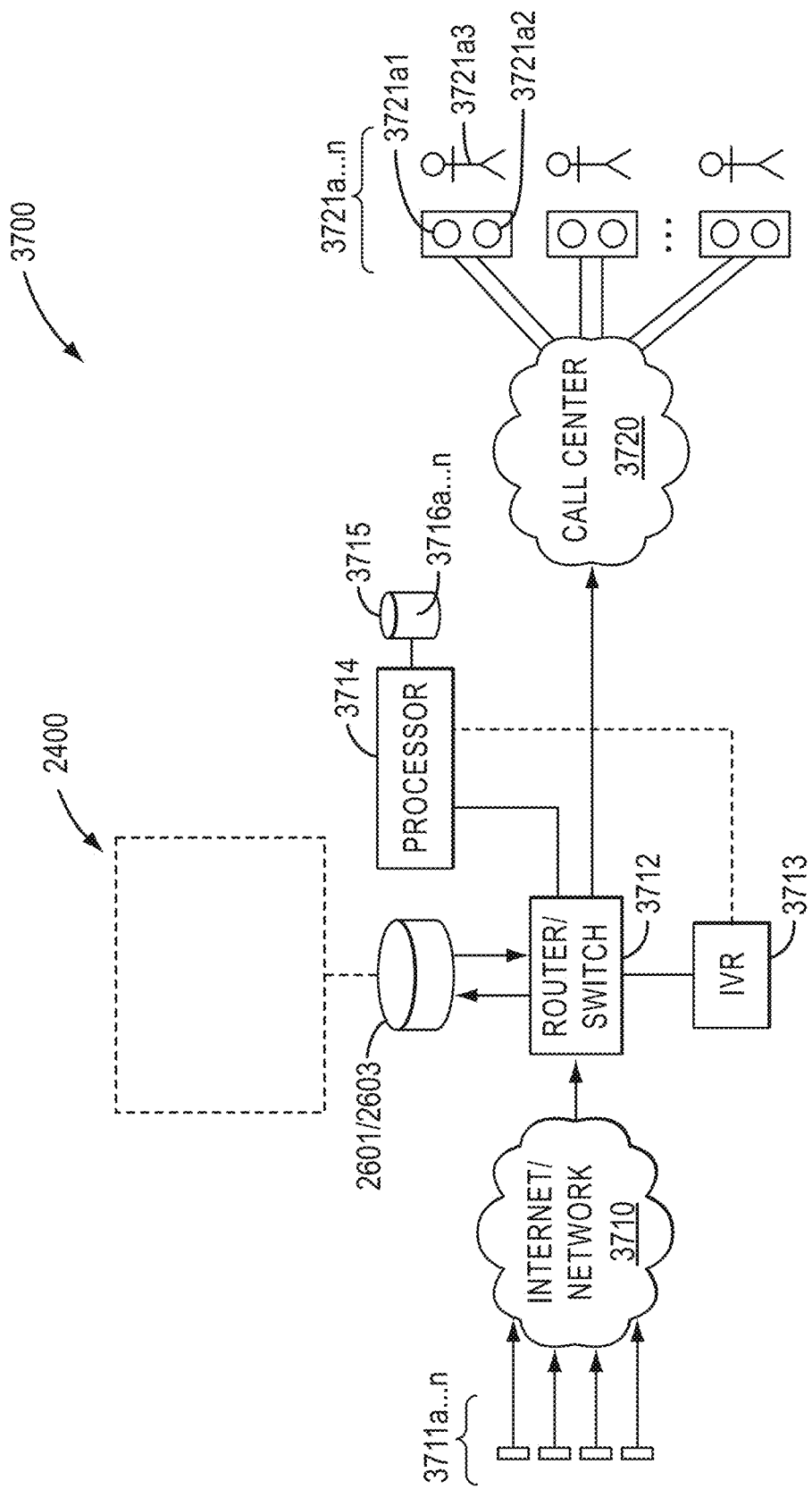
FIG. 37 shows an exemplary overview of a system for routing calls according to one embodiment.

FIG. 37 shows an exemplary overview of a system 3700 for routing calls according to the system and method discloses herein, based on an automatic diagnosis performed as described earlier. Diagnostic system 2400 was discussed in great detail earlier, in and around the description of FIG. 24 and in other related parts, and databases 2601 and 2603 contain the results of the data collected by system 2400. Now if a user calls, for example, from any of devices 3711*a-n* through an Internet and/or phone network connection 3710, such as a standard telephone network, the user ends up getting connected with router/switch 3712 that can route all sorts of phone calls and combinations of phone calls, such as, for example, analog phone calls, wireless phone calls, IP phone calls, and other, similar phone calls. Router/switch 3712 is controlled by processor 3714, which has storage 3715 and programs 3716*a-n*, some of which are discussed further below. Also present, but not shown for reasons of clarity and simplicity, are a variety of interfaces to couple said router to all networks required to perform its tasks, memory to execute code for programs, operating system, etc., as well as input and output devices, etc. Programs 3716*a-n* may include such software instances as an operating system, drivers, etc., as may be necessary to control the router/switch. Interactive voice response (IVR) software 3713 may be controlled directly by processor 3714 or through router/switch 3713. When calls arrive they are processed and then routed to call center 3720. There are many different call center topologies, but for purposes of clarity and simplicity in this discussion, any and all call center types are shown here only as exemplary cloud 3720. Call center stations 3712*a-n* each typically have a workstation with communication and data display devices 3721*a*1 and 3721*a*2, and an agent 3721*a*3.

Figure 38:
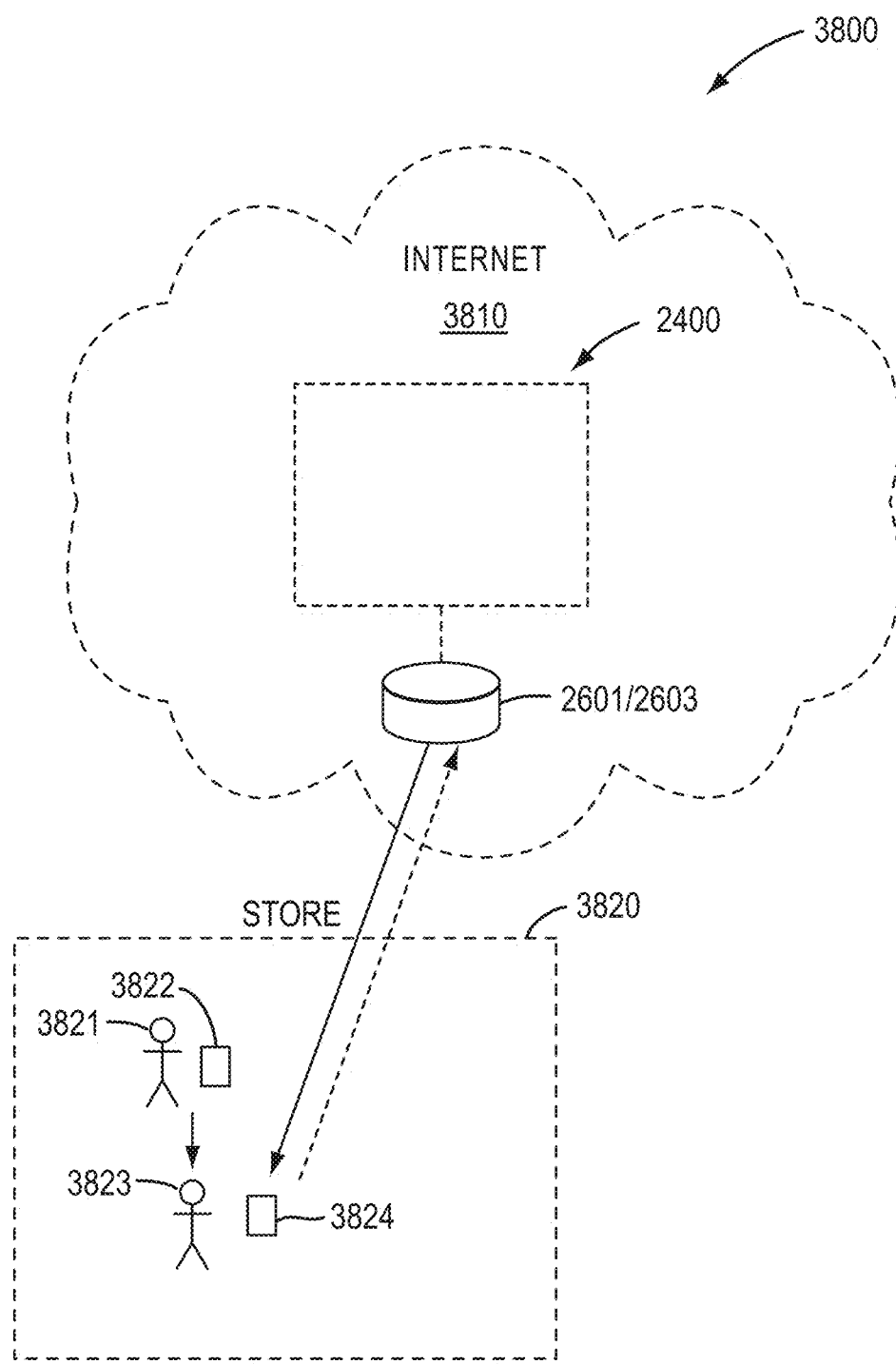
FIG. 38 shows an overview as an example of use of the system and method disclosed herein according to one embodiment, wherein a customer with a device goes to a customer service location.

FIG. 38 shows an exemplary overview 3800 as an example of use of the system and method discloses herein, wherein a customer 3821 with a device 3822 goes to a customer service location 3820, such as, for example, a store. Said customer may speak to a store agent 3823, who may use a station 3824, which station may be any of a great variety of devices, such as, for example, a kiosk, a pad, a workstation, or any other such device. Alternatively, station 3824 may be designed so that the customer can use the station by himself, without help from any agent 3823, in a manner similar to self-service at, for example, an airport self-check-in station or a grocery self-service check stand. Such an approach may enable one agent 3823 to assist multiple customers, for example, five or even ten customers, at any one time. Station 3824 could typically be a complete computer with its own processor, local storage, memory, input/output subsystem, communication interfaces, etc., said interfaces coupled to a network, so station 3824 can access diagnostic system 2400 and access information stored on databases 2601 and 2603, looking up information for the customer's device 3822 and then delivering remedies.

Figure 39:
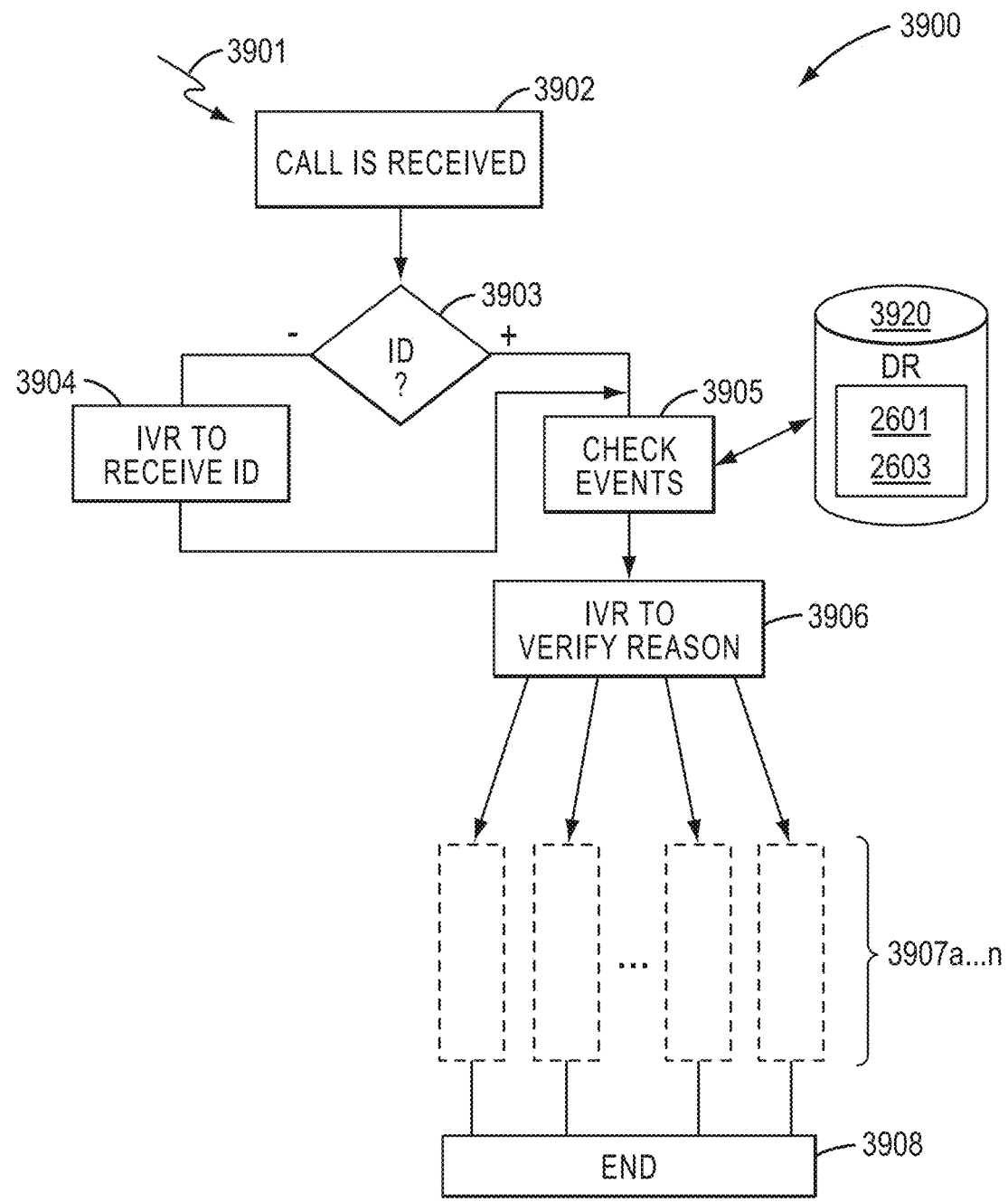
FIG. 39 shows an exemplary process for diagnostic services at a call center, according to one embodiment.

FIG. 39 shows an exemplary process 3900 for diagnostic services at a call center, according to one aspect of the system and method disclosed herein. Incoming call 3901 is received in step 3902. In step 3903 the system checks for some customer identification. If the system does not detect any ID (−), the call is routed in step 3904 to the IVR system 3713, which queries the customer or the device itself for some identification, such as a phone number, an account number, etc. Upon receiving some ID in step 3904, or if the system receives an ID (+) in step 3903, the process moves to step 3905, where the system checks with main data repository 3920, or it may also pull from repositories 2601 and 2603, the event history of the device. In step 3906 the IVR offers any solution or solutions, based on information about the problem found and identified in the data repositories, or it may connect the caller to a specialist to help resolve the issue. Because each and all problems may have many different possible solutions or outcomes, they are all exemplarily shown as sections 3907*a-n*, each of which may have multiple steps. At the end of all steps 3907*a-n*, the call ends in step 3908. Step 8908 may also include a quality and satisfaction survey offered to the caller at the end of the call.

Figure 40:
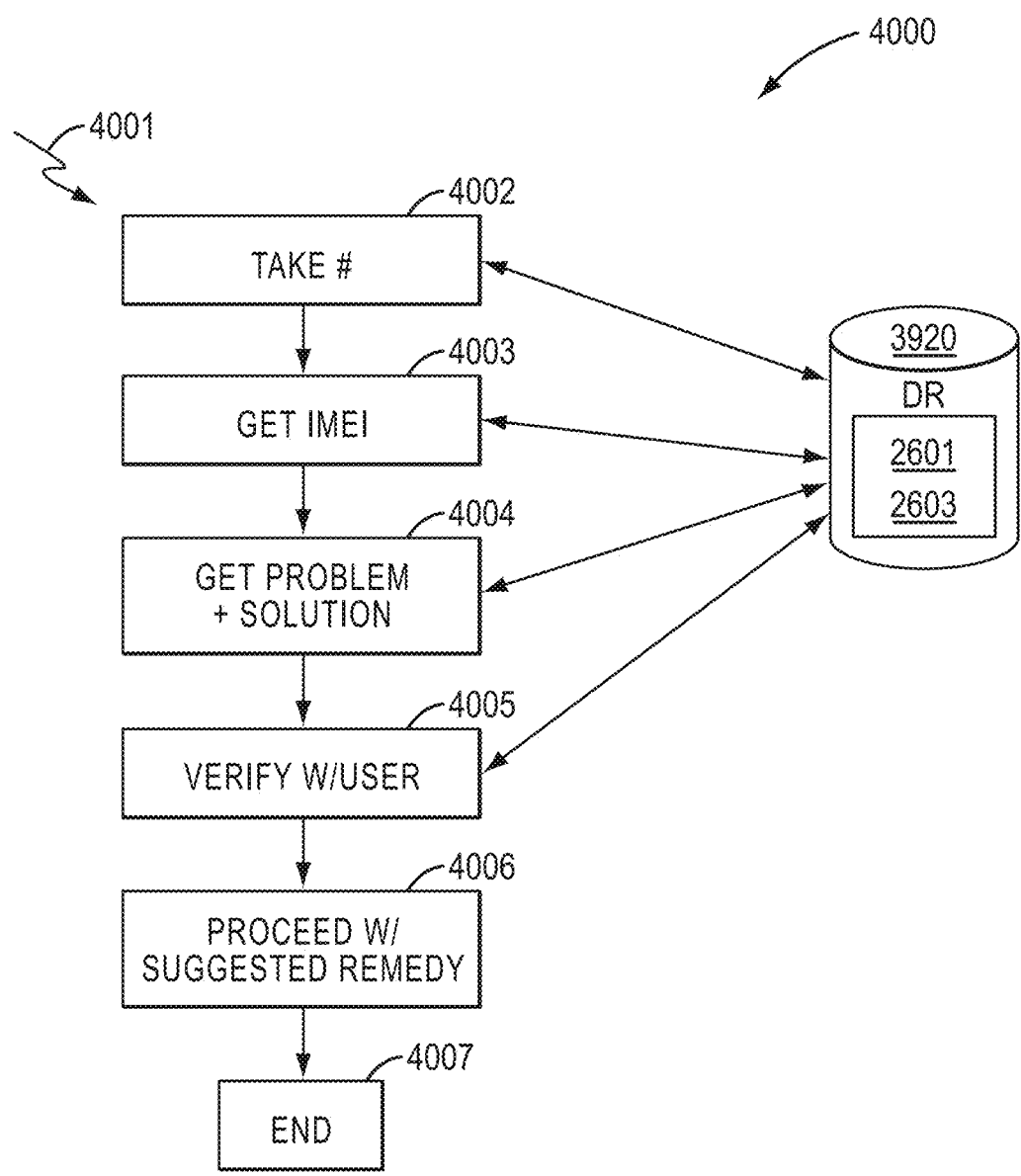
FIG. 40 shows an exemplary process for customer service at a telephone diagnostic location, according to one embodiment.

FIG. 40 shows an exemplary process 4000 for customer service at a telephone diagnostic location, according to one aspect of the system and method disclosed herein. Customer 4001 enters the location, and in step 4002, customer identity is determined, typically by his phone number, either by a service agent or technician 3823, or by the customer entering information at a self-service station 3824, as described above in the discussion of FIG. 38. The phone number is transmitted to data repository 3920 and/or databases 2601 and 2603. In step 4003, the phone number is used to retrieve the international mobile equipment identity (IMEI) of the phone. In step 4004, the IMEI number is used to retrieve problem solutions, based on known problems of identical or very similar phones. In step 4005, the system verifies with the user that the problem retrieved from the database is indeed the problem the user identifies. In step 4006, the system instructs the user to implement the solution(s) for the identified problem or calls a an agent for help, in cases such as, for example, where the device needs to be exchanged. Step 4006 may involve one or more of many various solutions, based on the verified problem. In step 4007, the process ends.

For problem-solving, a server may receive a code from a phone over a wireless connection before the user activates the phone. In response, the server may guide customer requests for service to an appropriate resource. If the customer requests help from a specialist, the customer may be transferred directly to a specialist group. Or the customer may be directed to a self-help resource where he can address the problem by himself. In some cases, the customer may go to a service location, where his phone number may be used to direct him to a local resource. At the service location, a local network may identify the customer, display a greeting on a video output device, and direct the customer to a local resource. The local resource may be a kiosk device connecting to the customer's phone either by wire or wirelessly, or it may be a queue for a local or remote specialist.

What is needed is a system and method by which sufficiently large currents can charge a large number of dead deices concurrently, thus enabling efficient mass processing of such devices in, for example, such situations as described above. Because even high-power hubs and computer boards typically limit the current to 2 A to 5 A total for all ports shared, an additional power source is needed. Further, a smart switch needs to be added, connecting the power leads of a connected device, commonly referred to as a device under test (DUT), to an external source, until the charge level has been reached for sufficient functionality to begin the test or use of said DUT.

Figure 41:
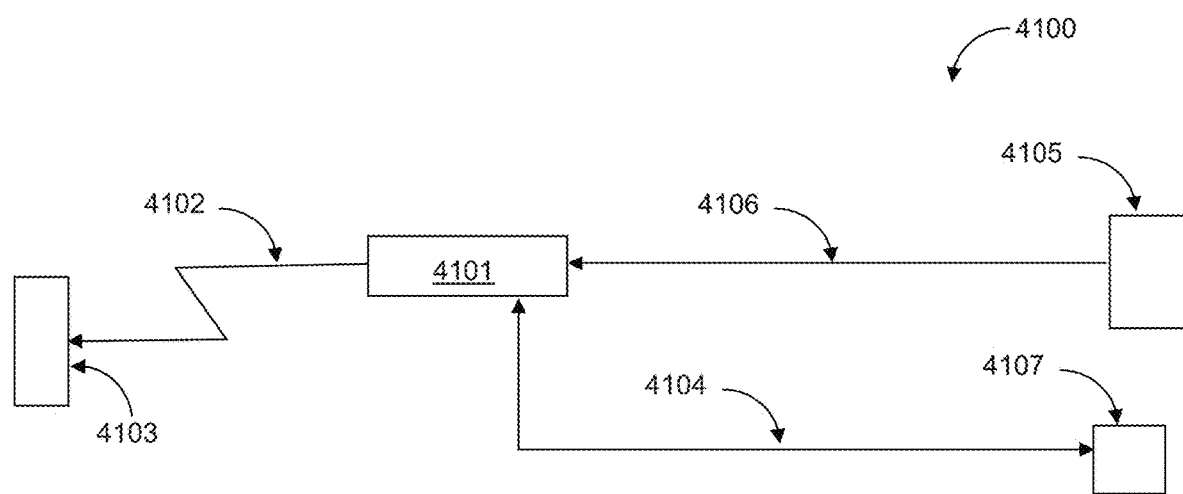
FIG. 41 shows an overview of an exemplary system according to one embodiment.

FIG. 41 shows an overview of an exemplary system 4100 according to one aspect of the system and method disclosed herein. A smart communication device (DUT) 4105 needs to undergo diagnosis by software on computer 4103, which may be a standard PC or any other, similar suitable computing device. The system has three modes of operations.

In the first mode, when battery capacity of DUT 4105 is below the power-on threshold, that is, when the user is unable to turn on the device by activating the power switch, a technician first plugs DUT 4105 into iRT (information reading tool) and charger 4101 via cable 4106, which is typically the standard charger cable for the DUT and has a connector at one end that is compatible with the power charging connector on DUT 4105 and at the other end a standard USB connector for connection to iRT charger 4101. Charger 4101 performs a fast charge on the DUT (typically using one of the analog USB charge protocols), drawing power via power cable 4104 from a standard ac power adapter 4107, which adapter 4107 is able to supply a fast charge to the DUT 4105. After DUT 4105 is able to power on and boot its operating system, iRT charger 4101 connects device 4105 to PC 4103 (or some other suitable device, including a possible intermediate USB switch, not shown for clarity) via standard USB cable 4102.

In the second operating mode, DUT 4105 is simply in a power-off state, with the battery above the power-on threshold. In this mode, the technician plugs the device into the charger as described above and waits for the device to turn on and boot its operating system. Then iRT charger 4101 connects device 4105 to PC 4103 via standard USB cables 4102 and 4106 and iRT charger 4101 stands by.

In the third operating mode, DUT 4106 is already powered on. In this mode, the technician plugs device 4105 into iRT charger 4101. The charger then connects the device to the PC as described above.

Figure 42:
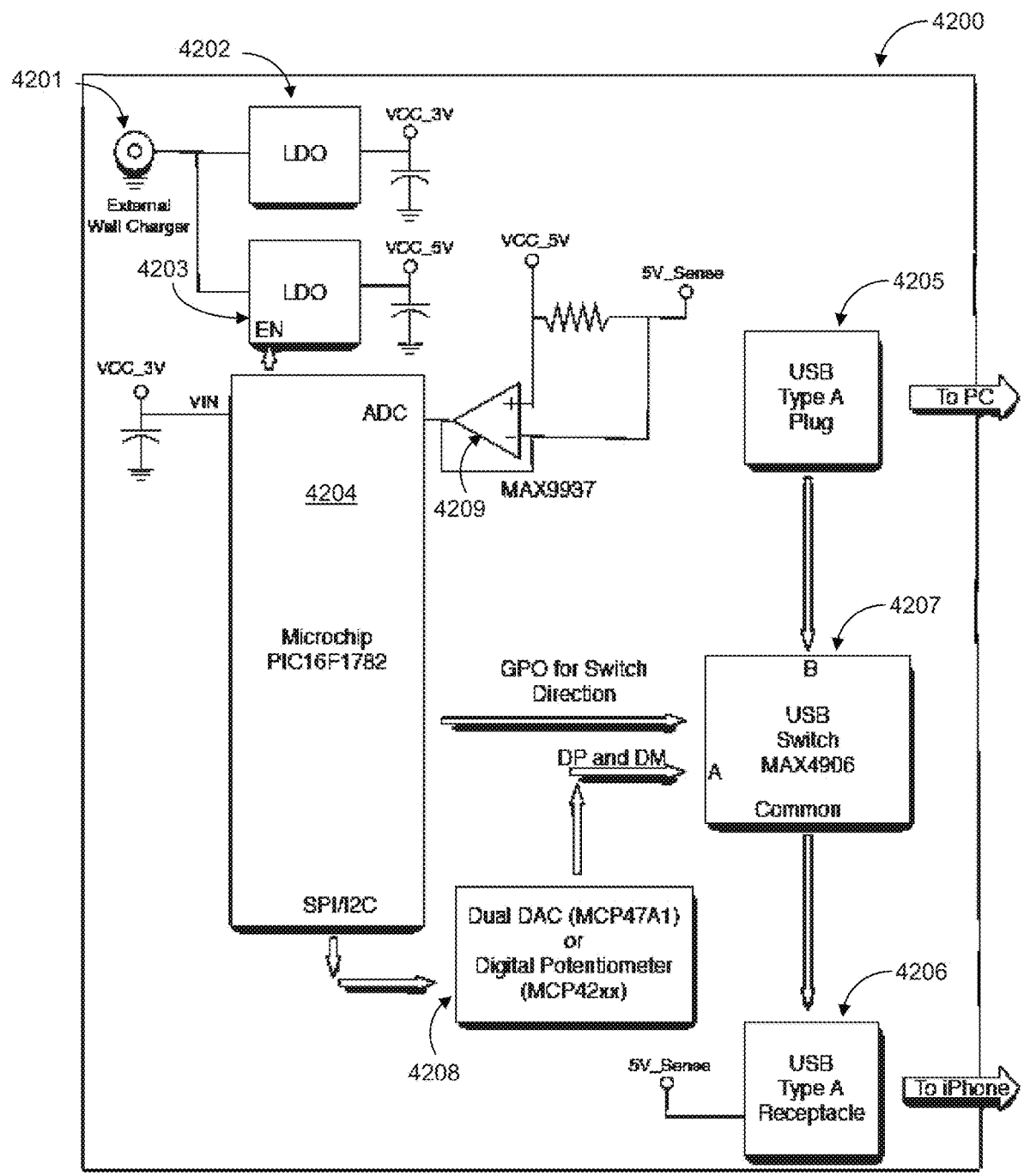
FIG. 42 shows a simplified view of the interface board of a charger according to one embodiment.

FIG. 42 shows a simplified view of the interface board 4200 of charger 4101. Outlet 4201 connects to an external wall charger. It has two low dropout (LDO) regulators 4202 and 4203 to create internal supply voltages of, respectively, 3 volts and 5 volts. Typically the voltage of LDO 4202 may be 3.3V, but in some cases it may be 3V. Microchip 4204, such as, for example, PIC16F1782, may be used as a system controller. USB Type A plug 4205 connects to PC 4103, and USB Type A receptacle 4206 connects to DUT 4105. A USB switch 4207, such as, for example, MAX4906, connects the two USB outlets 2405 and 4206. Signals from microcontroller 4204 control switch 4207. Also connected to switch 4207 are a digital potentiometer and a digital-to-analog converter (DAC) in Integrated Circuit (IC) 4208, enabling detection of and response to analog charging signals on the USB channel from the DUT plugged into receptacle 4206. The signals are sent to the processor, where software is used to control this charging process, etc. as described below in greater detail. Voltage controller 4208, which may be a dual DAC MCP47A1 or digital potentiometer MCP42xx, can be used to create a controlled voltage and finely adjust the voltage. In some cases, microchip 4204 may be a type that contains an integrated DAC and/or the comparator 4209, etc.

Figure 43:
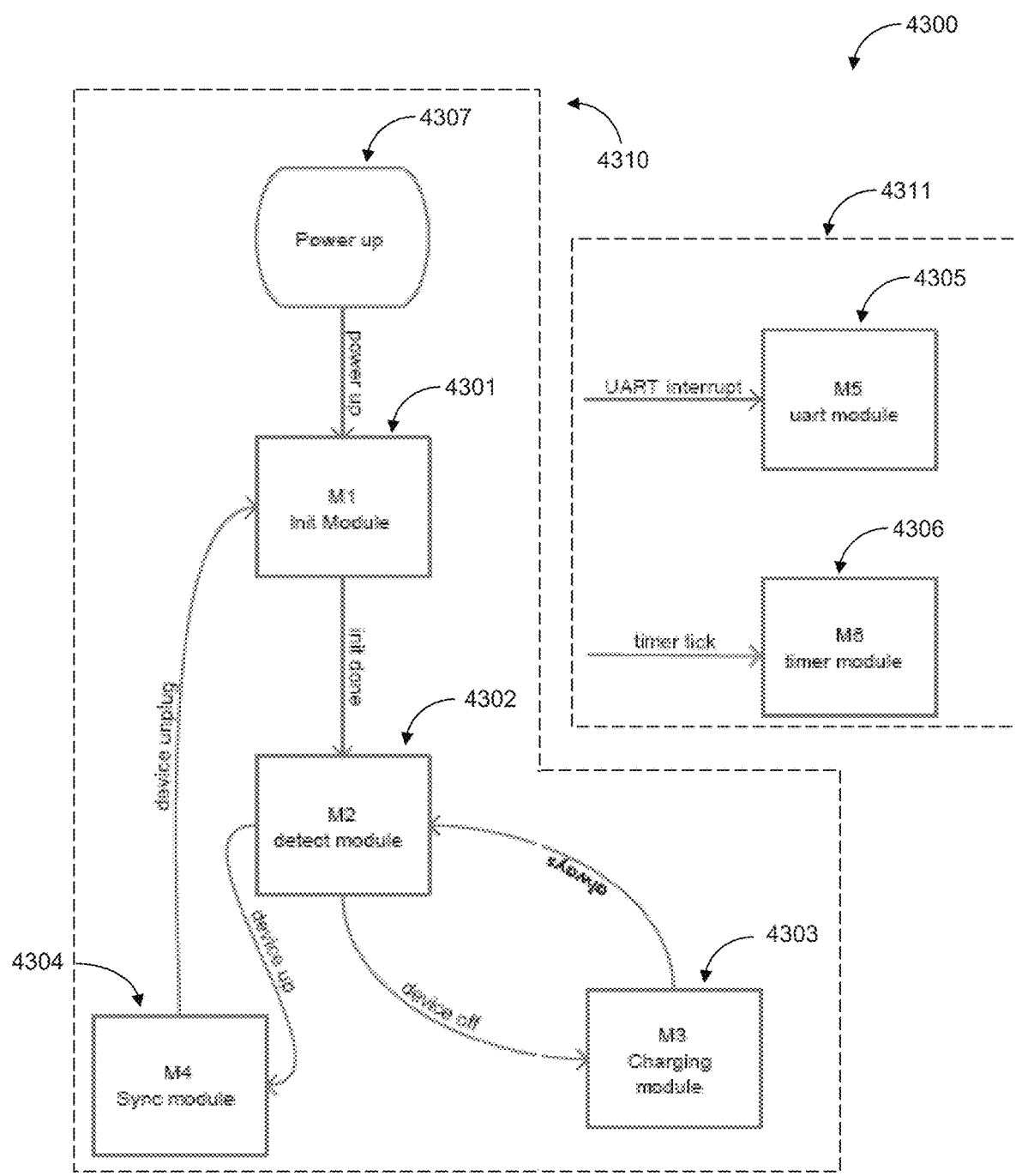
FIG. 43 shows an exemplary overview of the subroutines in a microprocessor, according to one embodiment.

FIG. 43 shows an exemplary overview 4300 of the subroutines in microprocessor 4204, according to one aspect of the system and method disclosed herein. In subroutine group 4310, after the power-up housekeeping process 4307, in process 4301 module M1 is initialized. Then in process 4302, module M2 detects the DUT status, that is, whether the DUT is on, off, without battery power, etc. Module M2 then interacts in process 4303 with charging module M3 to charge the DUT, if charging is required. When the device no longer requires charging and is powered up, in process 4304 module M4 attempts to synchronize with the DUT. Group 4310 remains in process 4304 until the DUT is unplugged, when it then returns to process 4301. Group 4311 contains process 4305, a UART interrupt module M5 for interaction with processes 4301 through 4304, to move the processes from one to the next. Also in group 4311 is process 4306, wherein module M6 supplies a timer tick in case of a timer that needs to be serviced, for example, to look at the time-out in certain USB protocols, etc.

Figure 44:
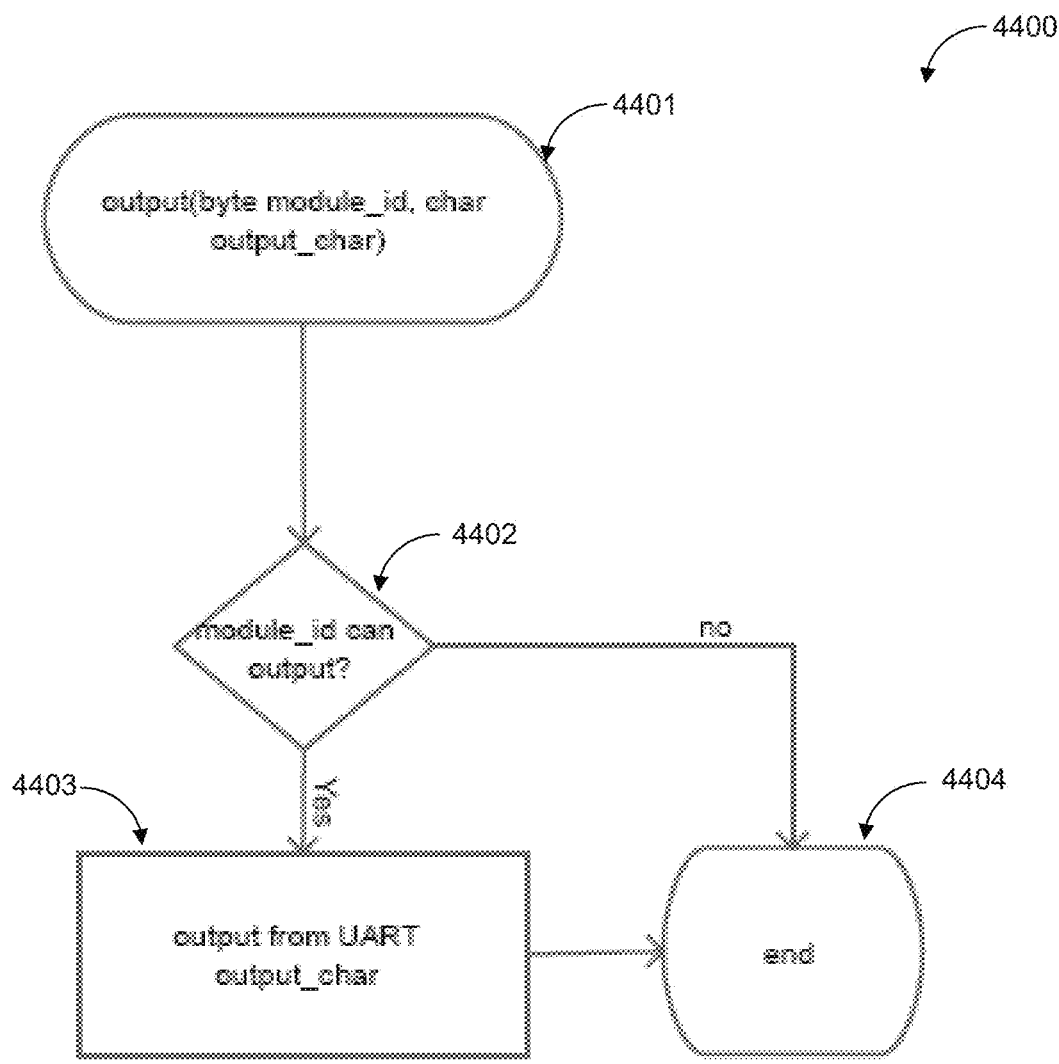
FIG. 44 shows an exemplary process in an INIT module as it relates to a UART module, according to one embodiment.

FIG. 44 shows an exemplary process 4400 in module M1 as it relates to process 4305 in module M5, according to one aspect of the system and method disclosed herein In step 4401 the system attempts to send a character output. The characters are sent on the USB channel to communicate with the DUT when it starts up. In step 4402 the system checks to verify that the character output can be sent. If Yes, then in step 4403 the system starts with outputting a character from the UART and then ends the process in step 4404. If NO, the process moves directly to step 4404, where is ends.

Figure 45:
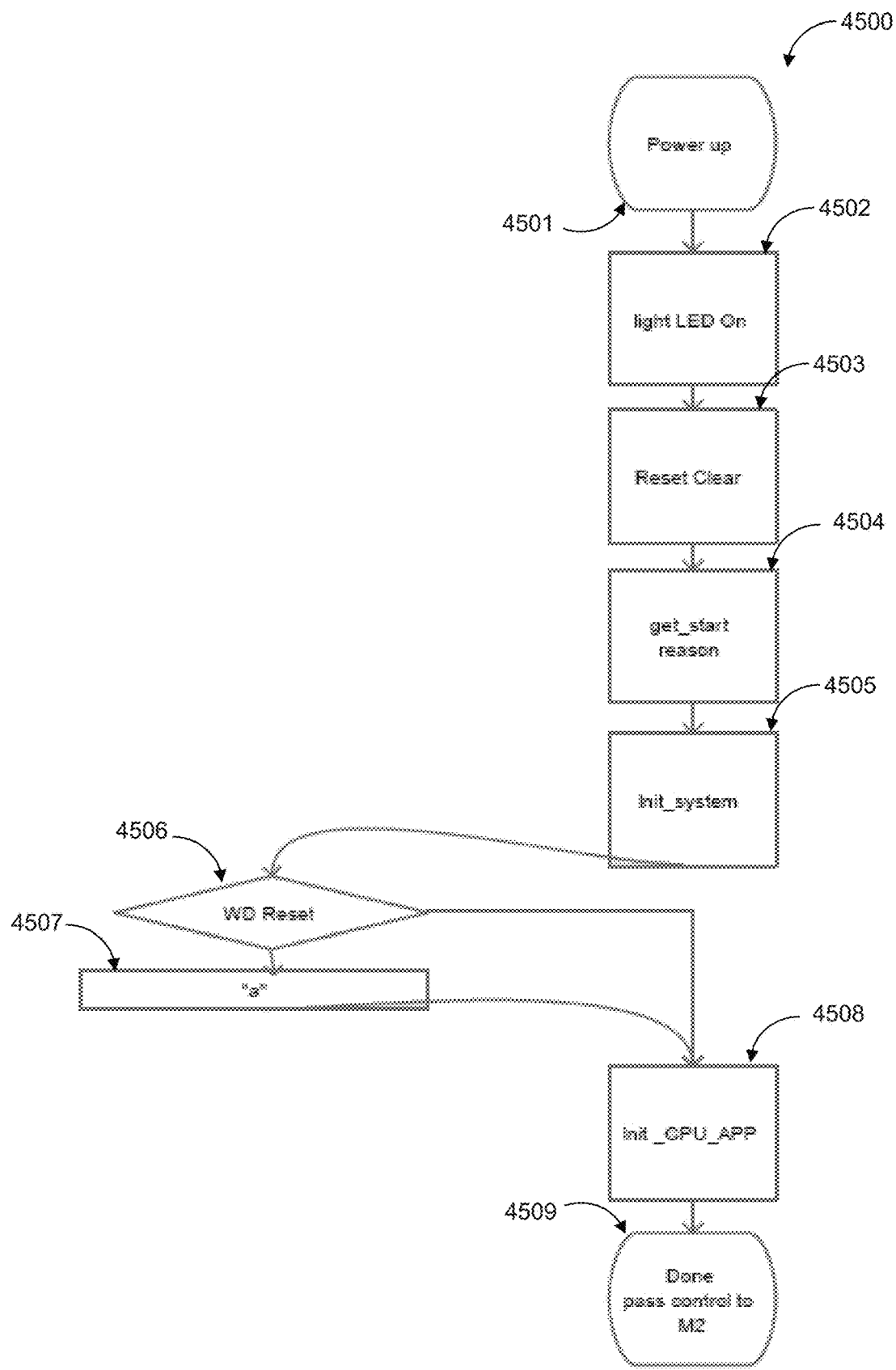
FIG. 45 shows an INIT module, according to one embodiment.

FIG. 45 shows an exemplary process 4500, detailing the steps of process 4301 in module M1, according to one aspect of the system and method disclosed herein. Upon the power-up step 4501, the LED is turned on in step 4502. Then in step 4503 the system executes a reset clear to ensure that all the memory is in a set position and all the outputs except the LED are off. In step 4504, the system checks the start reason to determine if this is a normal start, and which peripherals are connected or not. Then in step 4505 the system is initialized by setting all the parameters in accordance with the findings of step 4504. In step 4506 the WD (watch dog) is reset. If the WD reset occurs, an "a" is sent in step 4507 just as a check to indicate whether the command went through, and then the process moves to step 4508, where the CPU app is started. If the WD reset does not occur, the process moves immediately to step 4508, where the CPU app is started. In step 4509 the system passes control to module M2.

Figure 46:
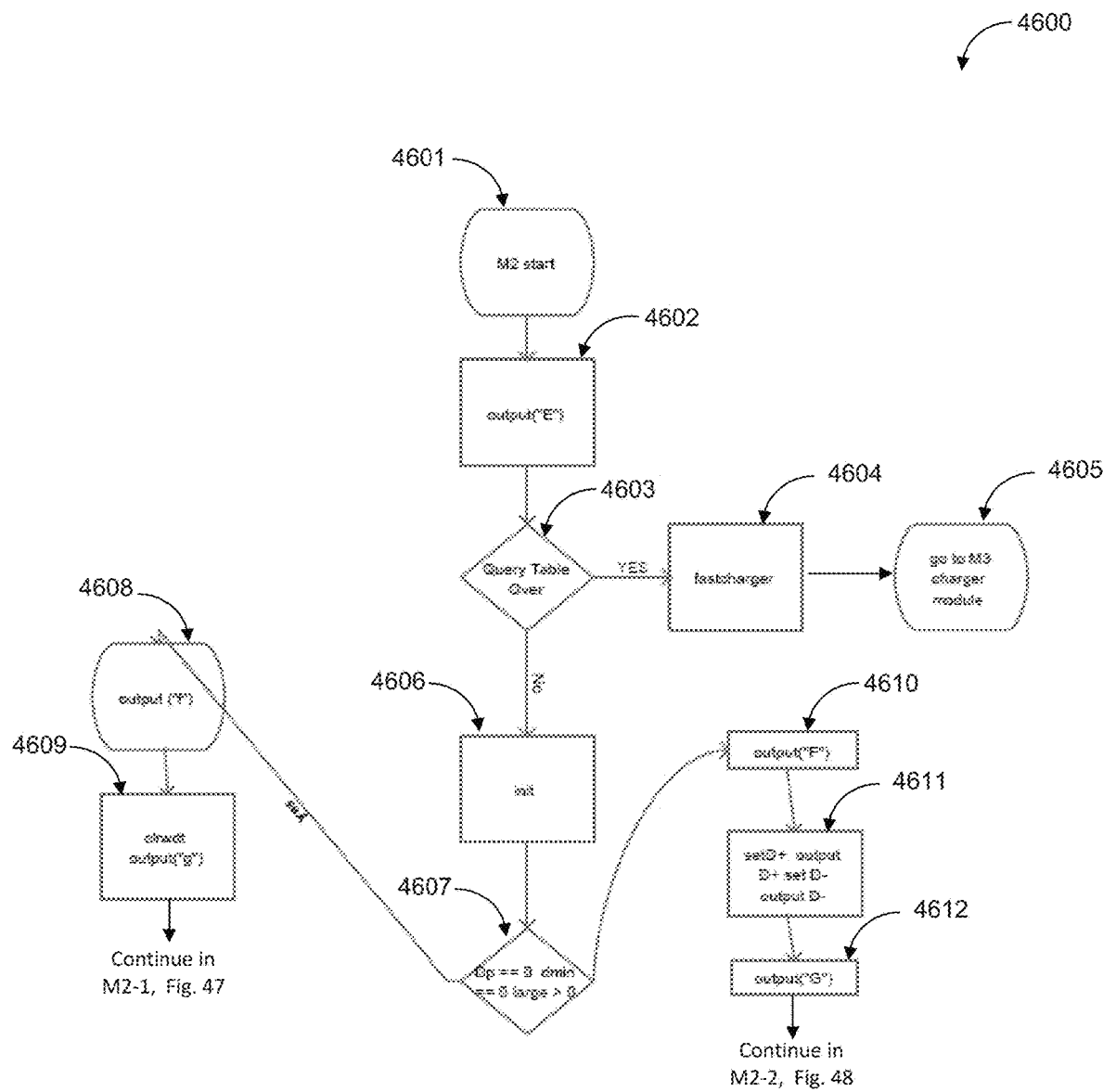
FIG. 46 shows a DETECT module, according to one embodiment.

FIG. 46 shows an exemplary process 4600, detailing the steps of process 4302 in module M2, according to one aspect of the system and method disclosed herein. In step 4601 the process starts, and in step 4602 an E character is output, just as a check to indicate whether the command went through. In step 4603, the system checks to determine whether the query table is over. If Yes, the process enters fast-charge mode 4604 and then enters charge mode M3 in step 4605. If No, in step 4606 the system attempts to initialize the DUT, and in step 4607 the system checks to determine whether the DUT has reached minimum charge Dp. If Yes, the process moves to step 4608 where it outputs an F character. Then in step 4609 it waits for the response, a g character. If no, the process moves to step 4610, where the system outputs an F character and then in step 4611 sets the USB to a specific setting for an analog charge. Then in step 4612 the system outputs a G character. At the end of the process 4605, the system moves to charger module M3.

Figure 47:
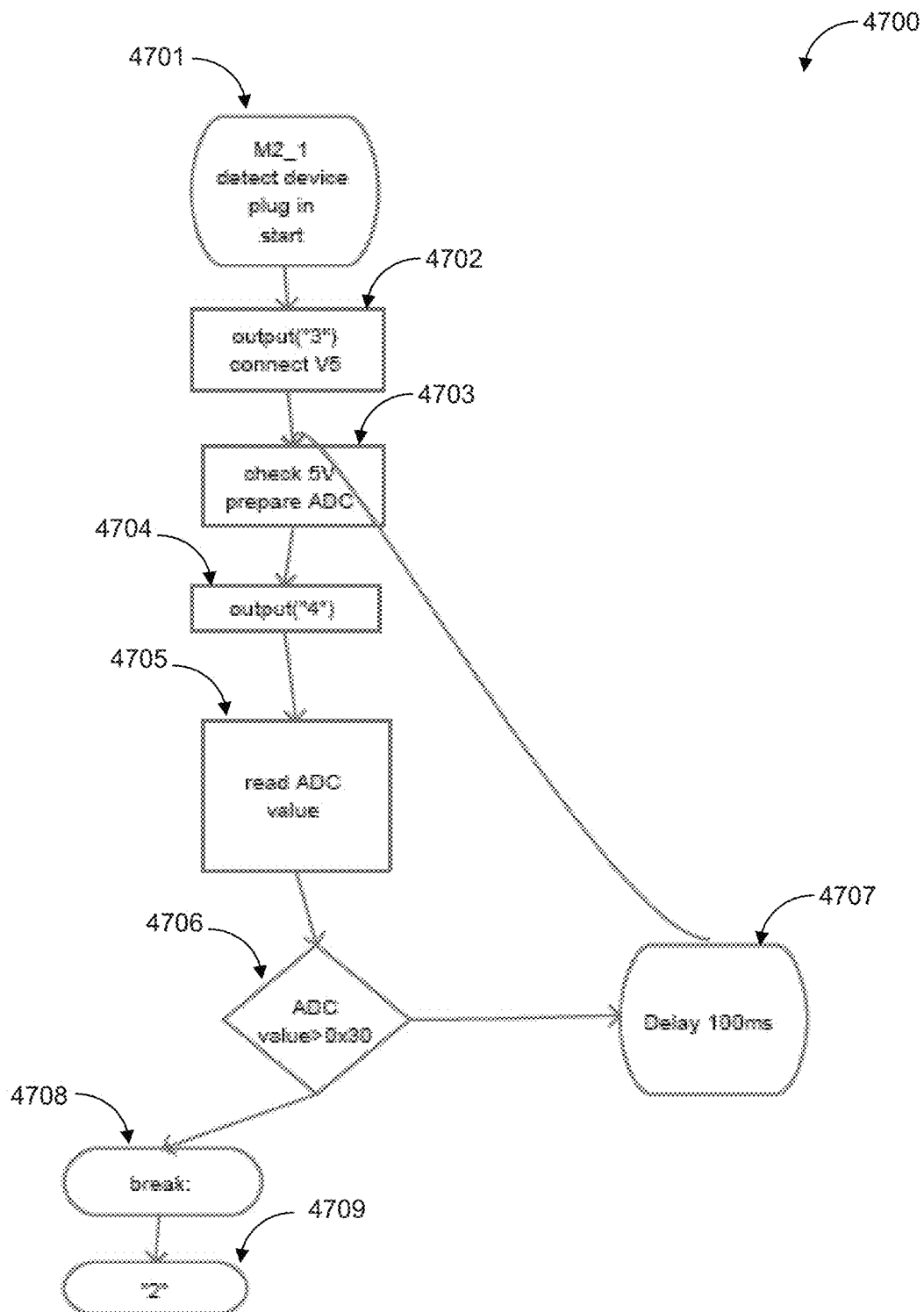
FIG. 47 shows a branch of the DETECT module.

FIG. 47 shows an exemplary process 4700 for the subsection M2-1, which is a branch of the original module M2, discussed above. Process 4700 attempts to determine whether a DUT is connected. It executes continuous loops, with delays, in seeking to make a connection. In step 4701 the system tries to detect a DUT is connected. Upon detection, in step 4702 the system outputs a 3 character and connects to the 5V power source. In step 4703 the system checks the 5V connection and prepares the analog-to-digital converter (ADC). In step 4704 the system sends a 4 character and continues to seek a response. In step 4705 it reads the ADC value to see the load. In 4706 it checks the load value to see a clear voltage drop, which indicates a load. If there is no drop, it branches to step 4707, starts a delay and retries to connect to a device. If it sees a drop, it goes to break 4708 and then continues to M2_2, starting in FIG. 48.

Figure 48:
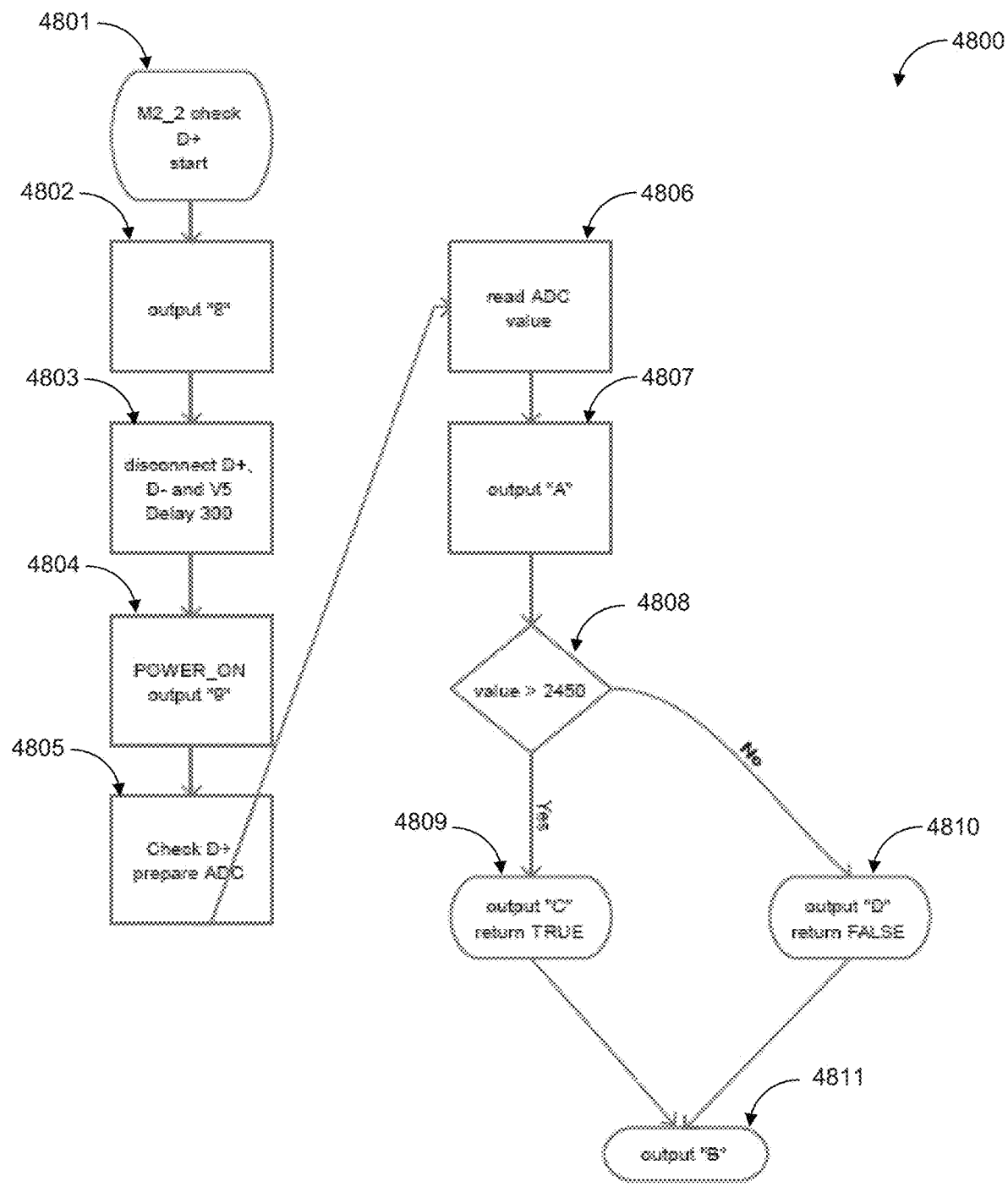
FIG. 48 shows another branch of the DETECT module.

FIG. 48 shows exemplary process 4800 for subsection M2-2, which is a branch of the original module M2, discussed above. (M2-1 and M2-2 both belong to M2.)

At step 4801 the system starts the D+ signal for data transmission on the USB port, and then in step 4802 it outputs an 8 character onto the USB channel. In step 4803 the system disconnects the D+ and D− signals and the 5V line and starts a 300 millisecond (ms) delay. In step 4804 the system powers on again and then outputs a 9 character. In step 4805 the system checks the D+ signal and prepares the ADC. In step 4806 it reads the ADC value, and it outputs an A character in step 4807. In step 4808 the system determines whether the ADC value is greater than 2450, that is, 2.4 A of charge current (ADC value for mode switch). If the charge current is not greater than 2450, the process moves to step 4810, where the system outputs a D character and returns a FALSE value, meaning the DUT is not connected. If the charge current is greater than 2450, in step 4809 the system outputs a C character and returns a TRUE value, meaning a device is connected. After either step, 4809 or 4810, the process moves to step 4811, where a B character is output. Characters are output to a debugging log via UART port.

Figure 49:
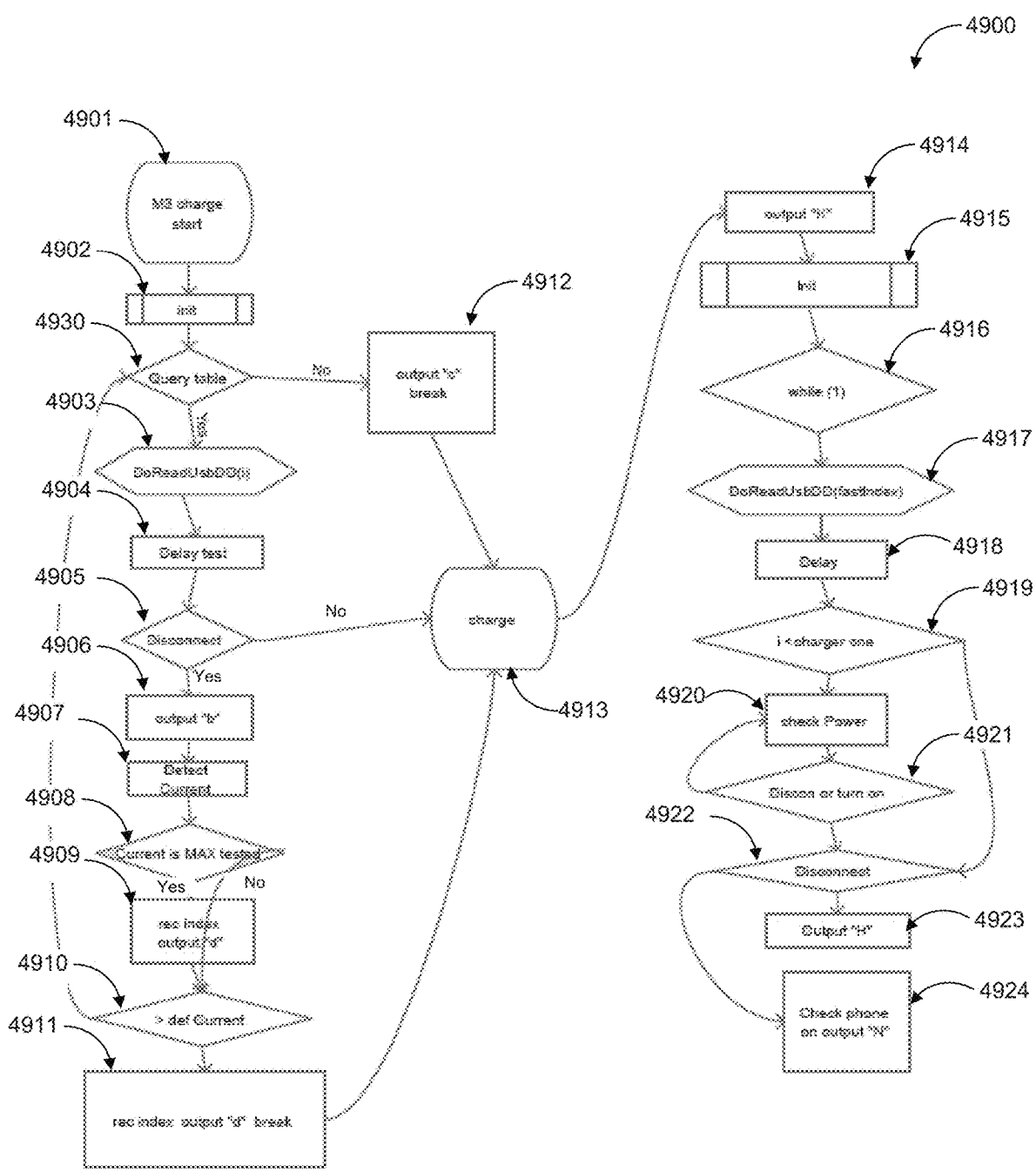
FIG. 49 shows a SYNC module, according to one embodiment.

FIG. 49 shows an exemplary process 4900, detailing the steps of process 4303 in module M3, according to one aspect of the system and method disclosed herein. In step 4901 module M3, the charging module, starts. In step 4902 the subroutine initializes. In step 4930, the system seeks a query table. If no query table is found, the process moves to step 4912, where it outputs a zero and executes a break. After the break, it moves to step 4913 where it charges the DUT. If, in step 4930, a query table is found, it continues to step 4903 to read the USB value. In step 4904, the test may be delayed. In step 4905, it checks to see if the DUT is disconnected. If yes, it moves to step 4913, where it charges the DUT. If there is no disconnect, in step 4906 a b character is output, and in step 4907 the system detects current. In step 4908 it checks to determine if the current is maximum tested. In step 4910 the system checks to see whether the DUT current is greater than the defined current Then in step 4911 if the DUT current exceeds the defined current, the process loops back to step 4930; while if the DUT current does not exceed the defined current, it moves to step 4911, where the index is received and a "d" is sent back. Once the charge in 4913 is finished, the system will in step 4914 to output a "K" then on top initialize the device in step 4915. In steps 4916 and 17 it will continuously red the fastIndex, then with a delay 4918 it will go on to a loop consisting of 4919, 4920, 4921 and 4922, where after checking the outcome of the charging it will disconnect the device in 4922. If it was successful, it will proceed to 4923 and output an "H", if not it will proceed to 4924 and output an "N". In both cases the charging is now terminated.

Figure 50:
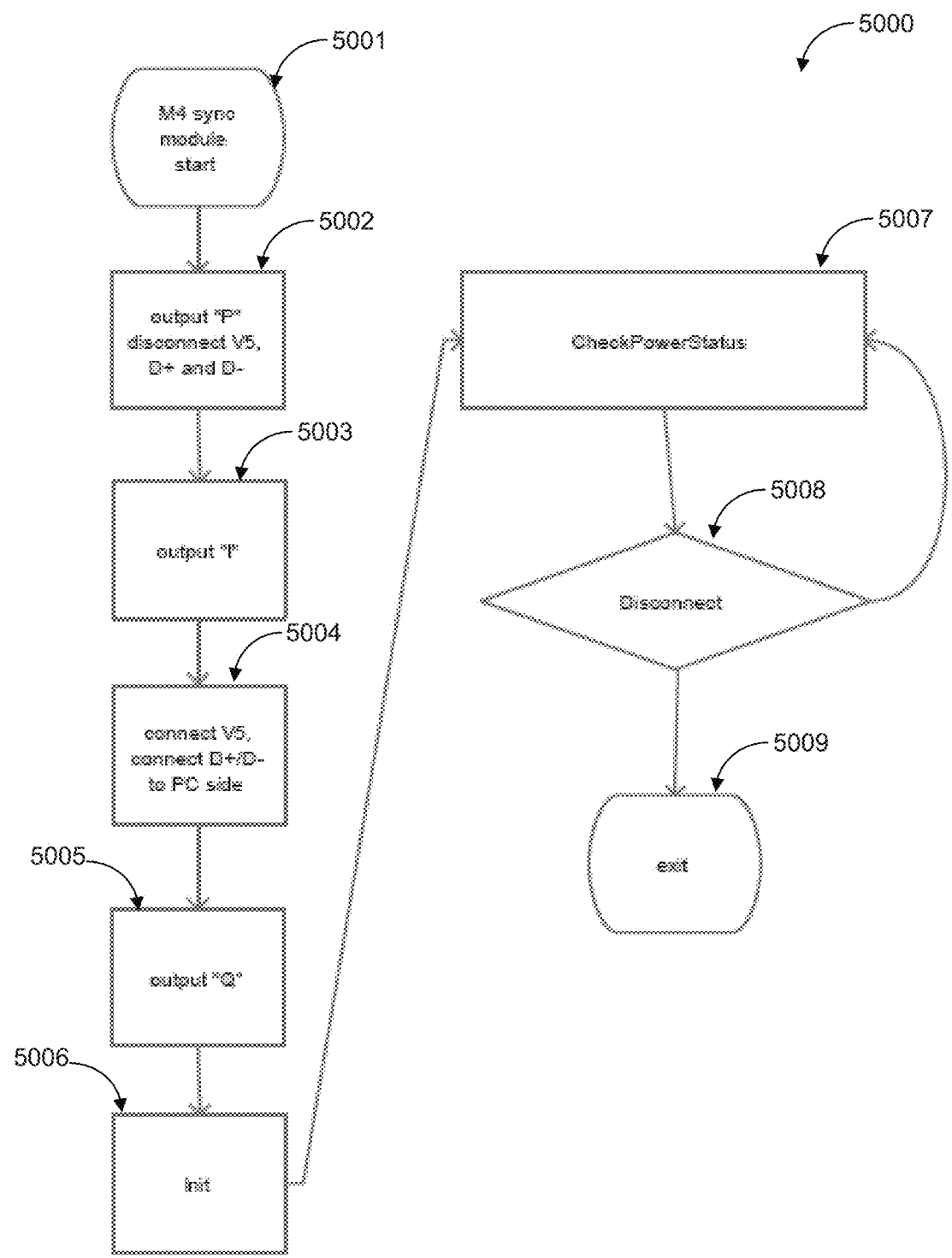
FIG. 50 shows a CHARGING module M4, according to one embodiment.

FIG. 50 shows an exemplary process 5000, detailing the steps of process 4304 in module M4, according to one aspect of the system and method disclosed herein. In step 5001 module M4, the sync module, starts. In step 5002 the system outputs a P character and disconnects the D+ and D− signals and the 5V current. In step 5003, an I character is output, and in step 5004 the system connects the D+ and D− signals and the 5V current to computing device 4103. In step 5005 a Q character is output, and in step 5006 the device connected will be initialized. In step 5007 the power status of the DUT is checked. In step 5008, the system disconnects if the charging of the DUT has not ended and the process loops back to step 5007 to again check the power status. When the system determines, in step 5008, that the DUT has completed, the process moves to step 5009, where it ends.

Figure 51:
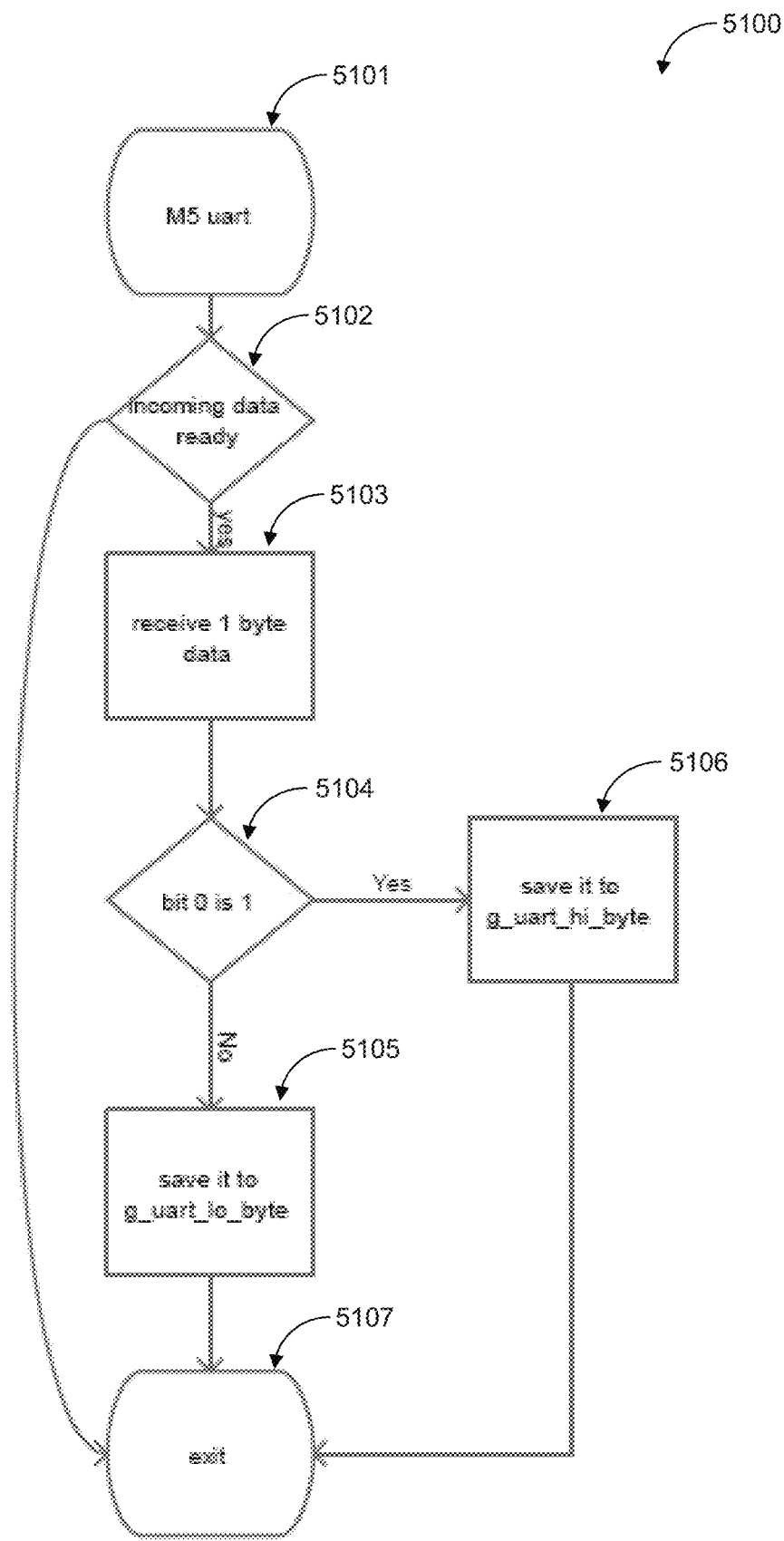
FIG. 51 shows a UART module, according to one embodiment.

FIG. 51 shows an exemplary process 5100, detailing the steps of process 4305 in module M5, according to one aspect of the system and method disclosed herein. In step 5101 module M5, the UART module, starts. In step 5102 the system determines whether incoming data is ready. If No, the process moves directly to step 5107, where it ends. If Yes, the process continues to step 5104, where the system checks to see if bit 0 is a 1. If Yes, it moves to step 5106, where the bit 0 value is saved to g_uart_hi_byte. If the bit 0 value is not 1 (No), in step 5105 the value is saved to g_uart_lo_byte. In either case, after the bit value is saved, the process ends in step 5107.

Figure 52:
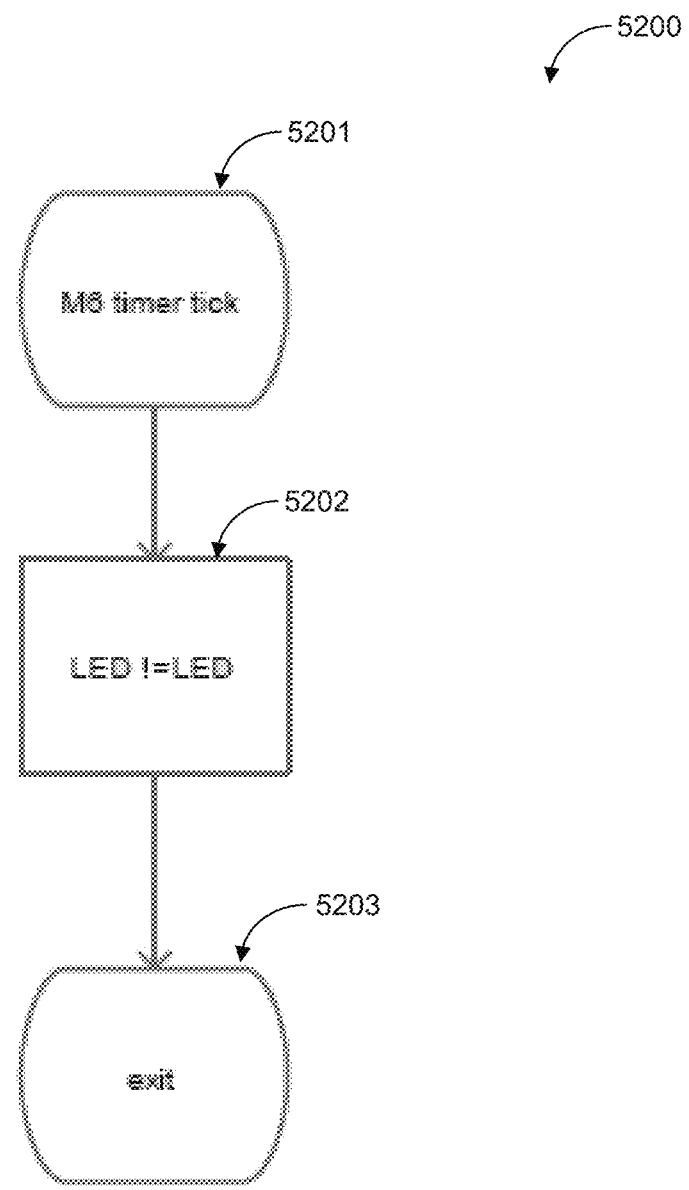
FIG. 52 shows a TIMER module M6, according to one embodiment.

FIG. 52 shows an exemplary process 5200, detailing the steps of process 4306 in module M6, according to one aspect of the system and method disclosed herein. In step 5201 module M6, the timer module, starts. In step 5202 the LED status is updated. In step 5203, the process ends.

Figure 53:
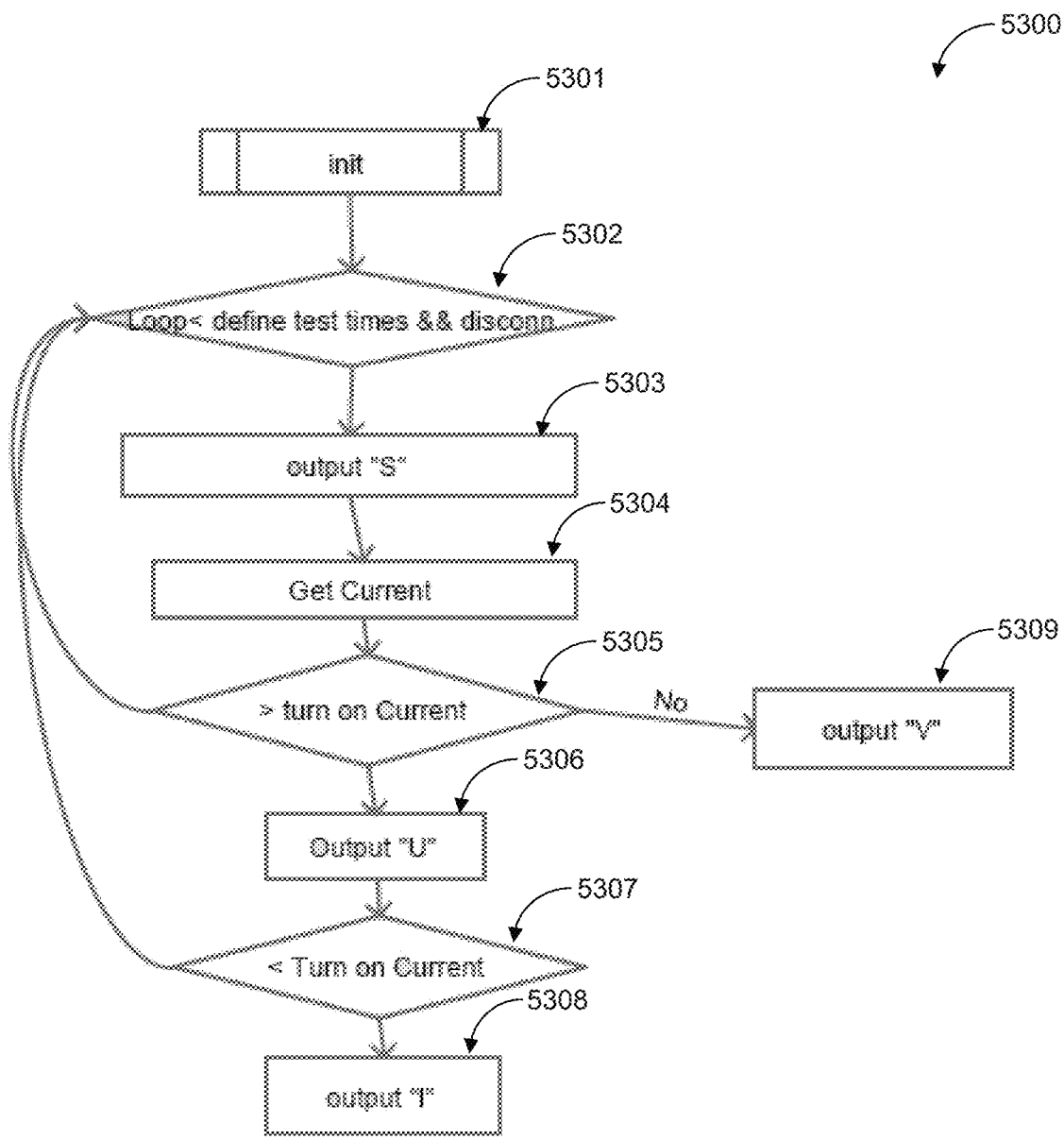
FIG. 53 shows an initialization procedure according to one embodiment.

FIG. 53 shows an exemplary process 5300, for use as initialization procedure according to one aspect of the system and method disclosed herein, as shown as second part in module M1 4301. This procedure, composed of steps 5301 thru 5309, initializes testing and communication parameters.

A system for testing and reprogramming mobile communication devices, such as, for example, cellular phone, tablets, etc., enables parallel connection of a large number of devices via, typically, USB cable, to connectors in the system box, with indicator lights for communicating to an operator the device status and readiness. Further, in such a system only one step is required to charge the device to an operational state, without operator interaction.

In addition, the system uses different sequences to test, verify, securely delete content, and reprogram devices. The system can then analyze problems such as, for example, bricked devices, dead batteries, and unprogrammable and unstable devices, and collect information about the quality of devices based on their different sources. In addition, the system can collect data about the efficiency of the operators connecting and removing devices at any one system box, or about operators at multiple systems in one testing facility. The system can then communicate its collected data to a central server.

Figure 54:
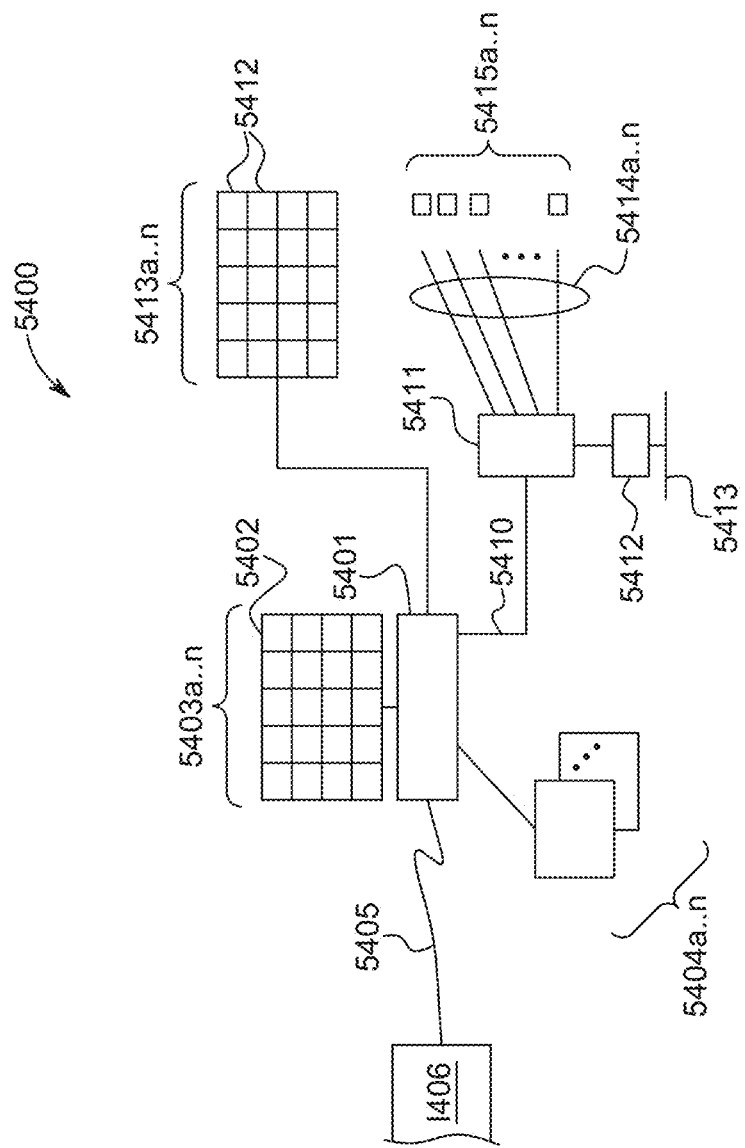
FIG. 54 shows an overview of an exemplary test system, according to one embodiment.

FIG. 54 shows an overview of an exemplary test system 5400, according to one aspect of the system and method disclosed herein. A computer 5401 is, typically, dedicated to a test bench. Screen 5402 shows status tiles 5403a-n. Computer 5401 may be connected to network 5406, as indicated by connection 5405. Computer 5401 also is running software and applications 5404a-n, as discussed throughout. USB link 5410 connects hub 5411 to computer 5401. USB cables 5414a-n connect hub 5411 to devices 5414a-n, which devices are being reprogrammed, tested, etc. Power supply 5412 connects to power source line 5413. It is clear that computer 5401 also has access to power. Also, in some cases, when computer 5401 is serving two 21-port hubs and/or two work platforms (using the optional second monitor) simultaneously, a second monitor 5422 is connected to computer 5401 to display additional statuses 5423a-n.

Figure 55:
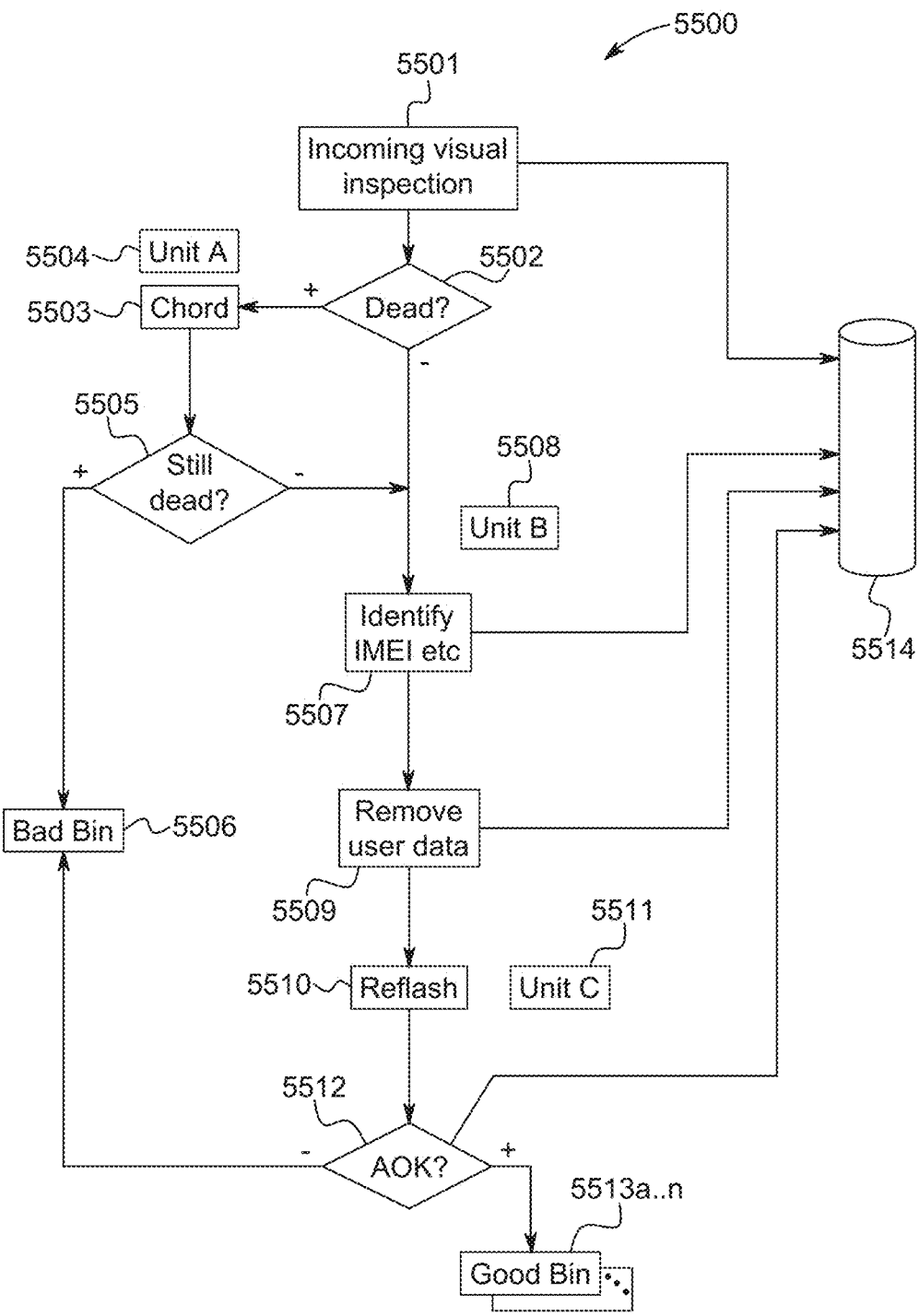
FIG. 55 shows an exemplary process of a typical workflow, according to one embodiment.

FIG. 55 shows an exemplary process 5500 of a typical workflow, according to one aspect of the system and method disclosed herein. As each device enters a testing and repair facility in step 5501, it typically undergoes a visual inspection and is recorded in data repository 5514. In step 5502 the system tests the device to determine whether it is dead. If yes (+), it goes to a charging station 5503, where the device is charged at a charging station Unit A 5504. When the device reaches a certain charge level, it moves (or is moved by an operator) to step 5505, where its charge status is determined. If the device is still not charged (+), it goes to the "bad" bin 5506. If the device is charged sufficiently to operate (−), it moves to step 5507, where the system records the identification and other specifications, such as, for example, memory size and type, of the device now connected to information reader Unit B 5508. That Unit B then sends this information to data repository 5514. In step 5509 the device is connected to Unit C 5511, which removes user data and all user installed apps from the device. Depending on the customer's security measures and the nature of the data, removing the data may require multiple overwrites to ensure that no data remains, as well as logging the process on data base 5514 for documentation purposes and certifications. In those cases a simple "delete" does not suffice. In step 5510 the device is reflashed. In some cases parts of the operating system are then updated; and in yet other cases, other programs on the device may be replaced or updated. In step 5512 the system does a final quick check of the functionality of the device and, if the system determines that the device is good (+), the system sends the device status to data repository 5514 and the device is deposited into and instance of "good" bin 5513a-n. If the device does not pass the check of step 5512, it moves to bad bin 5506.

Figure 56:
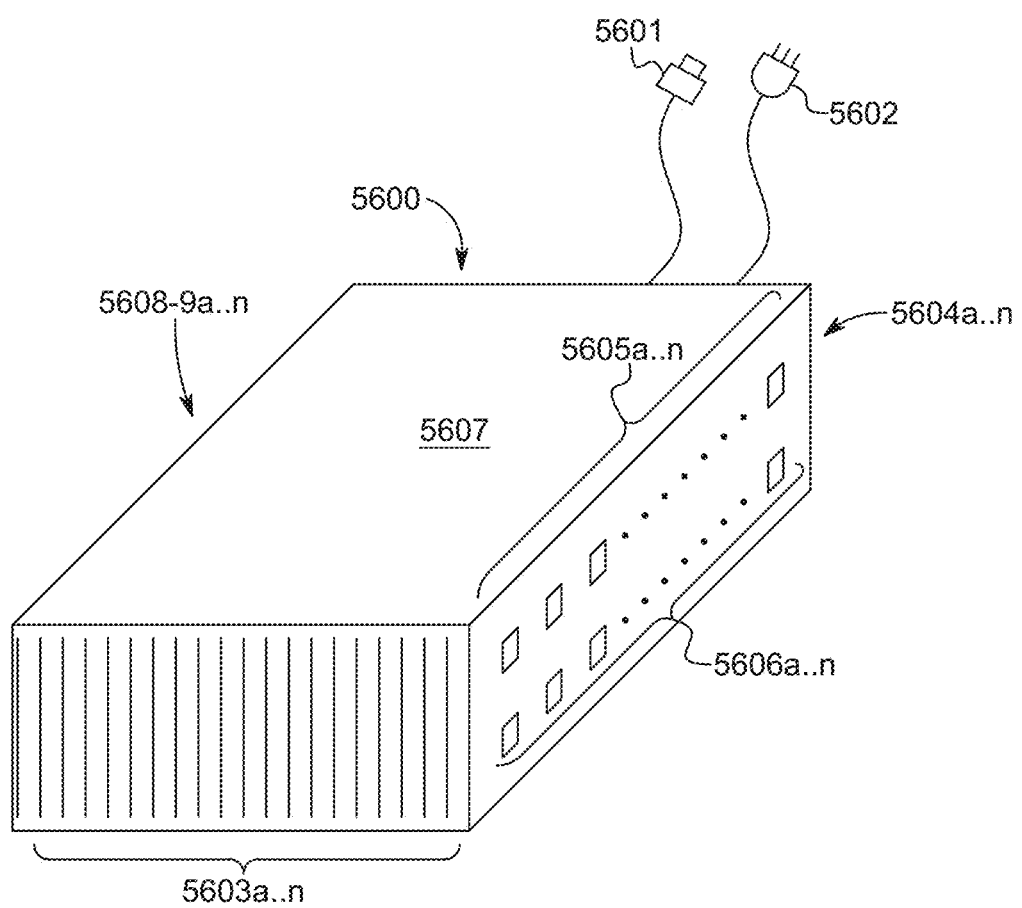
FIG. 56 shows a lateral view of an exemplary new testing, charging, and reprogramming unit, according to one embodiment.

FIG. 56 shows a lateral view of an exemplary new testing, charging, and reprogramming unit 5600, according to one aspect of the system and method disclosed herein. The intention is to be able to perform all steps on one unit rather than on three, as is typical today, and thus simplify the workflow. Use of unit 6500 also reduces the number of manual interactions, thus improving workforce efficiency. The novel unit 5600 has a smooth top 5607 on which devices or trays of devices may be placed, which will be discussed later. On both ends are venting features 5603a-n and 5604a-n (not shown) that enable cross flow of air from front to back or back to front, as desired. On one side are connectors and indicators 5605a-n and 5606a-n; in some cases more connectors and indicators 5608a-n and 5609a-n are on the other side (not shown). In some cases connectors are on top and indicators on the bottom row, while in other cases this order is inverted. Also present but not shown are power and network connections as needed for connecting the unit to the rest of the system, including, but not limited to, data repository 5514. Since all the data is collected and made available to an MIS system (not shown), many measurements can be obtained, such as, for example the average time for a device to clear the system, which data may be organized by its source, thus enabling determination of quality differences. Also, percentage of dead devices, operator performance, etc., can be obtained by proper analysis of the data collected. By omitting intermediate manual steps, human error can be drastically reduced. Typically unit 5600 contains multiple hubs that can distribute USB connections for, typically, up to 42 devices per unit. In some cases unit 5600 may have a USB cable going to an industrial computer feeding the unit, similar to previous approaches; in other cases, a motherboard may be integrated separately, or the USB ports may be integrated onto the motherboard or a secondary board, inside the unit. In those later cases, often a hard drive or other suitable non volatile data storage unit may also be integrated to store all the data and programs, including the operating system, needed for operation.

Figure 57:
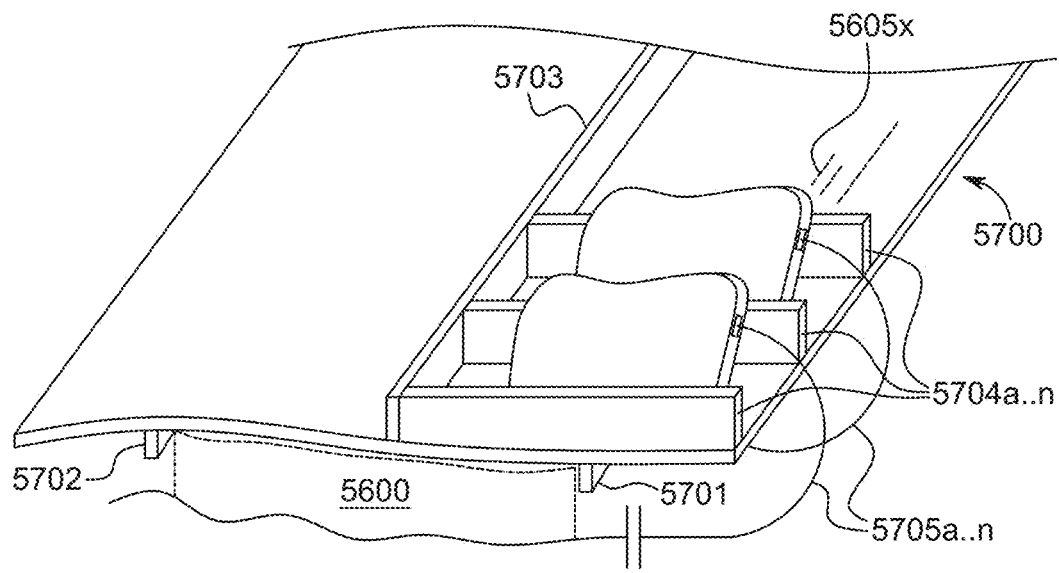
FIG. 57 shows a side view of an exemplary new testing, charging, and reprogramming unit, according to one embodiment.

FIG. 57 shows a side view of unit 5600. On the surface is exemplary tray 5700, according to one aspect of the system and method disclosed herein. Two small guides 5701 and 5702 secure tray 5700 in a saddle on top of unit 5600. Tray 5700 may have partitions, such as, for example, 5703 and 5704a-n. In this example the partitioning provides for half side on each side and may have different sizes of slots and short cables 5705a-n going to connectors on the side of unit 5600. Under the cables are typically LED indicators, so, in addition to a screen that may or may not be connected, each port has a small LED indicator showing the status of the device attached to that port. Typically red and green LEDs may be used separately or in combination to produce yellow or black, to indicate four different states. Additional information may be indicated by blinks or varying blink speeds of the LEDs. States communicated by the indicators may include, for example, successful (steady green LED), failed (steady red), in process (yellow), starting or shutting down (blinking yellow), etc. Spacing of the partitions must match to some degree the spacing of the connectors below each partition, to limit cable entanglement, and also, there must be enough room for each device to stand up, typically on its side. Typical spacing would be approximately one inch (including partitions), to accommodate a standard smart phone. In some cases, nonstandard layouts may be offered, to be discussed below.

Figure 58:
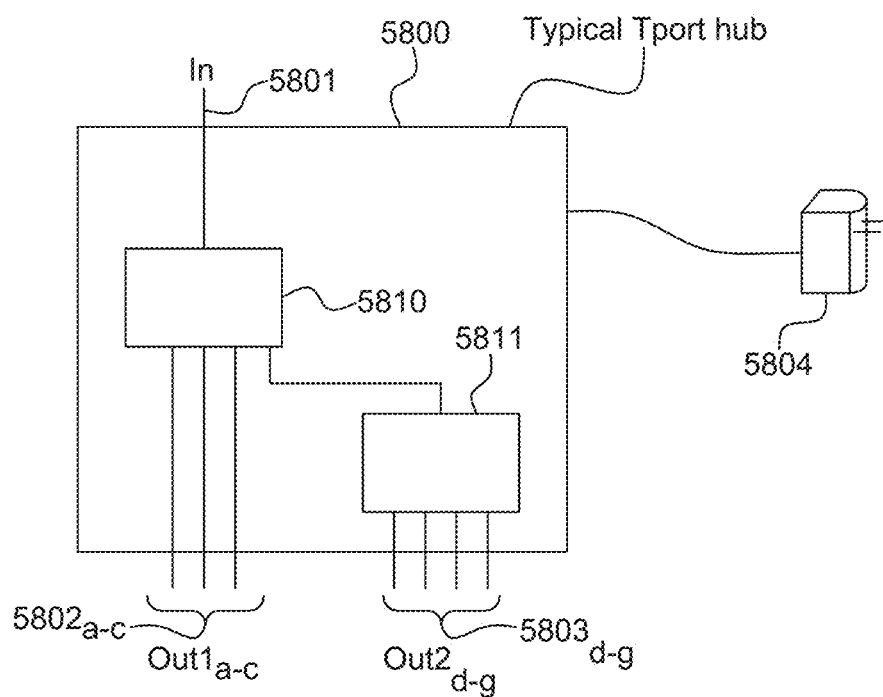
FIG. 58 shows a schematic view of a typical seven-port USB hub.

FIG. 58 shows a schematic view of typical seven-port USB hub 5800. Hub chips 5810 and 5811 are, typically, daisy chained. Thus with two chips, each of which have four ports, the hub can offer seven external ports, with chip 5810 using one port to connect to chip 5811. External connectors include Input 5801 and the seven external USB ports 5802a-c and 5803d-g. Power supply 5804 may be, typically, a plug-in or a central type PSU.

Figure 59:
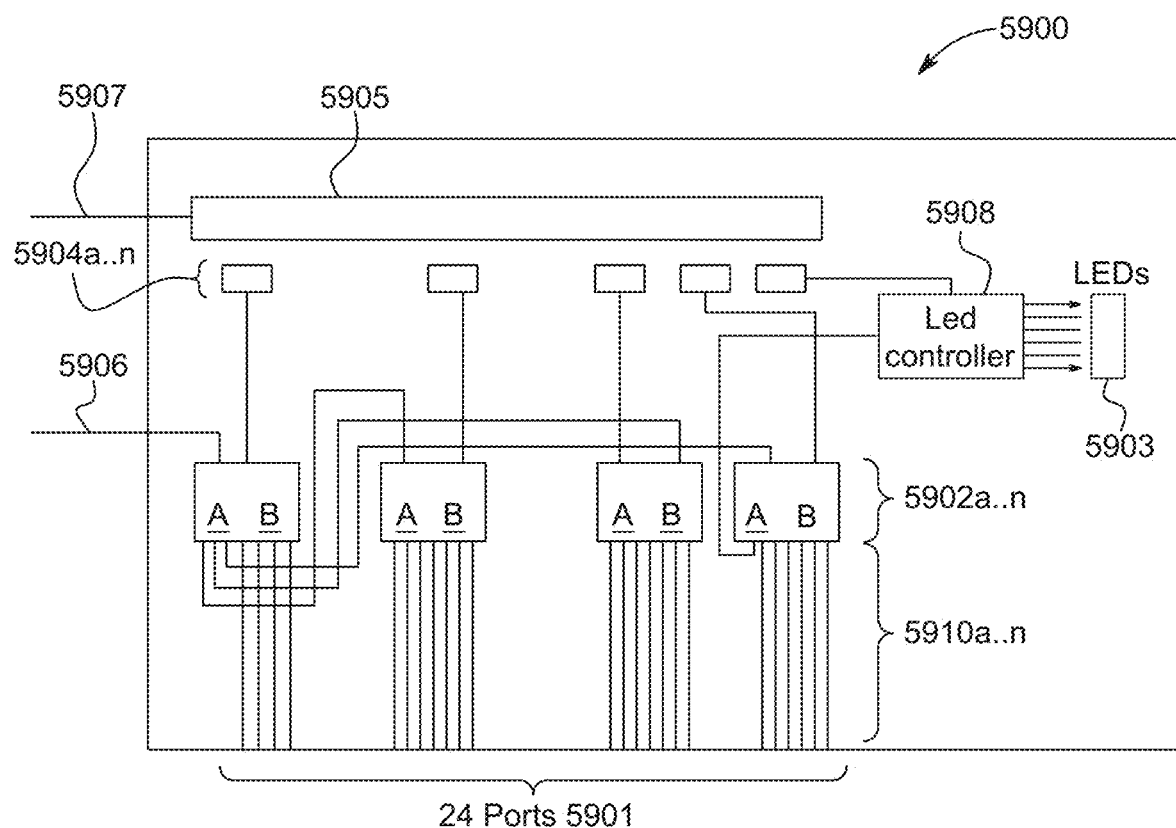
FIG. 59 shows a schematic view of an exemplary hub system, according to one embodiment.

FIG. 59 shows a schematic view of an exemplary hub system 5900, according to one aspect of the system and method disclosed herein. Hub system 5900 is composed of existing, off-the-shelf secondary hubs. Secondary hubs 5902b, c, and d are connected to the primary ports of hub 5902a. This approach reduces the number of levels of the whole system, an important design consideration due to the fact that many types of software do not operate more than three or four levels deep within a system. Adding the root hub in the system and adding the fact that many current smart phones present themselves as internal hubs for various modes and data access types, the number of levels in the system is a concern. In this example, wall plugs 5904a-n of hubs 5902a-n plug into power strip 5905. LED controller 5908 also plugs into power strip 5905. Controller 5908 controls LEDs 5903 that are mounted above or below the ports on the side of unit 5600 (not shown here). The software in the main system coordinates the transactions and the statuses displayed by the indicators. Essentially, the LEDs mirror the information shown on screen 5402 for the various ports, making it easier for an operator to correlate information, instead of having to count, look up port IDs, etc. The 24 ports 5901 on one side may, for a double-sided unit, be duplicated on the other side, with two connections going to a motherboard in a server. In some cases, rather than using standard hubs, a special board can be made, eliminating the need for the short jump cables 5910*a-n* that connect the hubs to the ports 5901.

Figure 60:
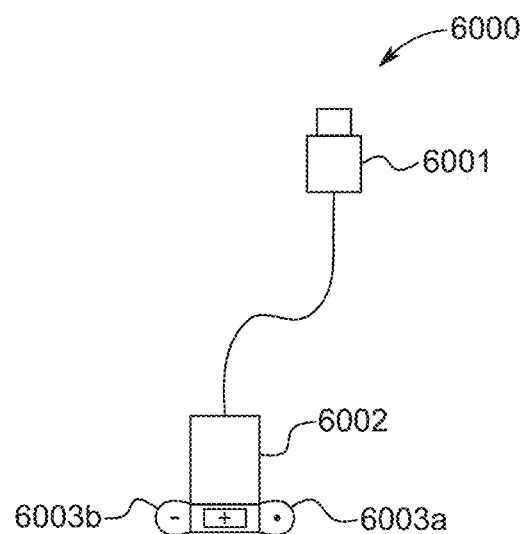
FIG. 60 is a view of an exemplary USB cable unit.

FIG. 60 is a view of an exemplary USB cable unit 6000, showing a typical design of cables 5910*a-n*. Unit 6000 has a USB connector 6001, a female port 6002, and latches or loops 6003*a* and 6003*b*, for attaching connector 6002 to the interior of unit 5600. This design simplifies removing and replacing worn or defective cables as required, on an individual basis.

Figure 61:
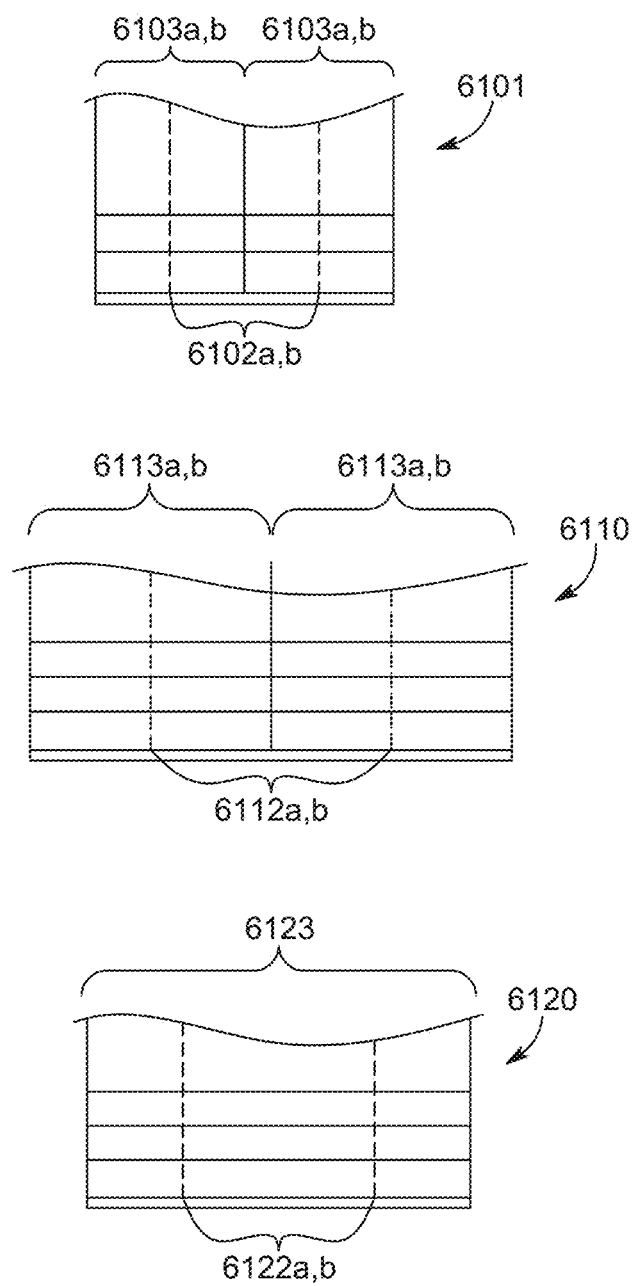
FIG. 61 shows three alternative configurations of an exemplary tray.

FIG. 61 shows three alternative configurations of tray 5700. Configuration 6101 has two tracks 6103*a, b*. Dotted lines 6102*a, b* indicate the alignment rails that are used to secure the tray on top of unit 5600. Configuration 6110 has extra-wide overlapped wings 6113*a, b* to accommodate larger devices (5 to 8 inches) such as, for example, a small tablet or a large phone. Configuration 6120 has just one set of tracks 6123 across the tray for even larger devices such as, for example, tablets in the 8-inch to 15-inch range.

Figure 62:
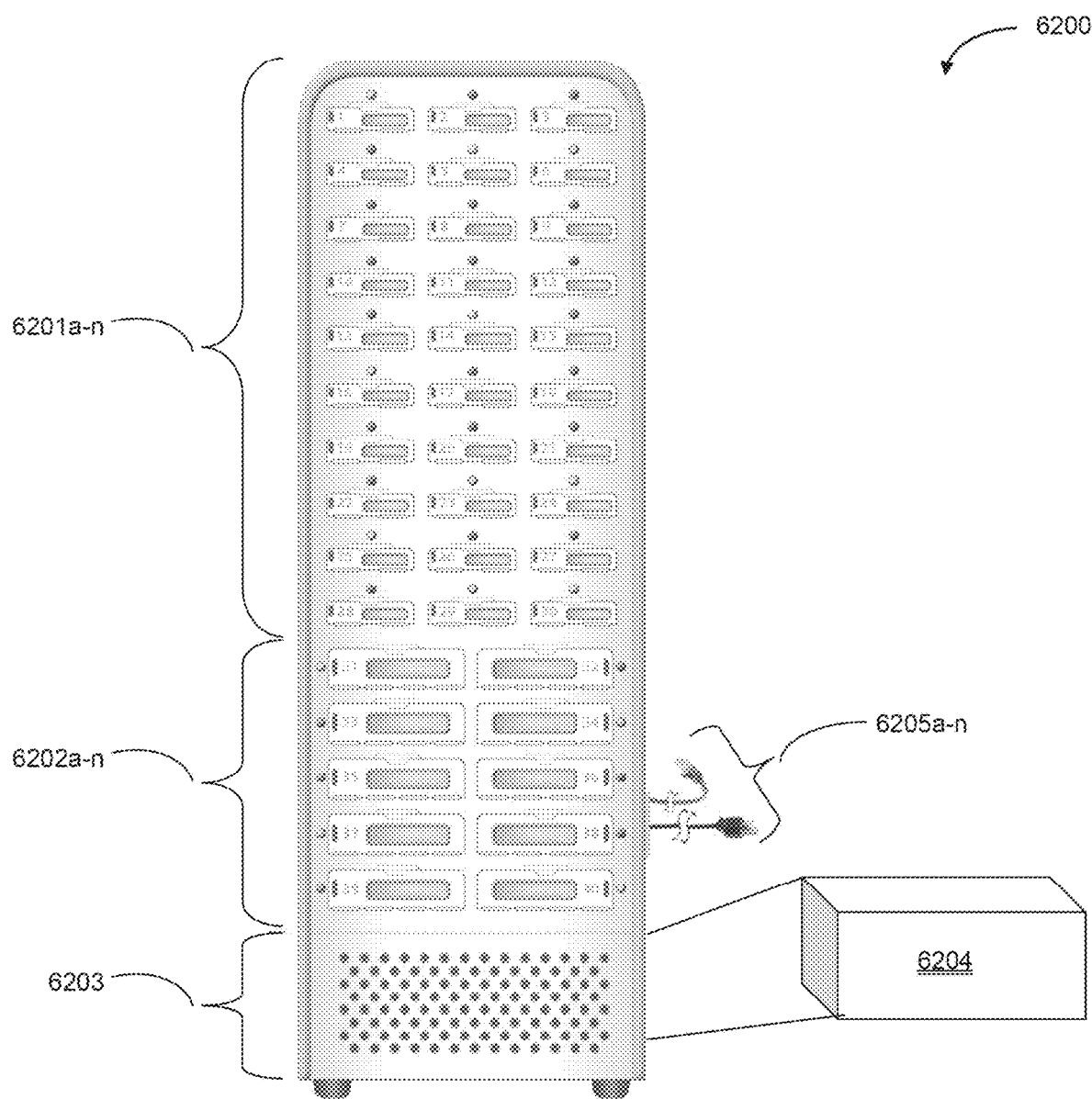
FIG. 62 shows an overview of an exemplary multi-device tower, according to one embodiment.

FIG. 62 shows an overview of an exemplary multi-device tower 6200, according to one aspect of the system and method disclosed herein. Drawers 6201*a-n* accommodate small devices such as, for example, smartphones; small "phablets," which are mobile devices that combine or straddle a smartphone and tablet.(http://en.wikipedia.org/wiki/Phablet); and tablets. Drawers 6202*a-n* accommodate larger devices such as, for example, larger phablets and tablets. Computer storage area 6203 holds computer 6204, in addition to a label printer and cabling, not shown, all of which devices are discussed in detail in the description of FIG. 64, below. Cables 6205*a-n* connect to a standard ac power source and a high-speed network, typically an Ethernet connection for a local area network (LAN) with a router/modem connecting to the Internet. In some cases, rather than using a LAN cable, the system may be connected via a Wi-Fi connection (not shown) or any other, similar suitable connection.

Figure 63:
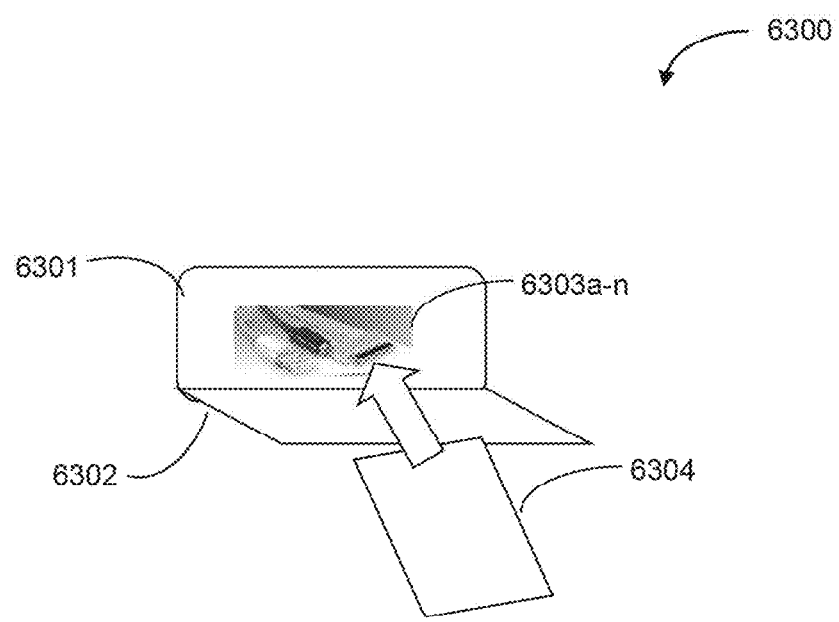
FIG. 63 shows a detailed image of an exemplary device drawer, according to one embodiment.

FIG. 63 shows a detailed image of an exemplary device drawer 6300, according to one aspect of the system and method disclosed herein. Although called a drawer, it may be a simple compartment with a door, similar to a post office box, or in some cases, there may be a slide out tray or box (not shown). For most situations, all designs should be considered functionally the same, but offering different levels of convenience in different aspects, such as ease of insertion, ease of cleaning, etc. For simplicity this compartment is herein referred to as a drawer, but all variations should be considered interchangeable. A device 6304 may be inserted into drawer 6301, plugging into one of connection options 6303*a-n*, which may include, for example, Apple Lightning cable, micro USB, and Apple 32-pin cable. Internal wiring enables cables 6303*a-n* to connect to one or more USB ports (not shown) inside the drawer, and said USB ports are all wired or coupled internally (also not shown) to processor 6404, discussed further below. After the device is inserted and connected, the attendant closes front cover 6302. Also, the number of drawers and their distribution may vary in different cases, without impacting the system services performed.

Figure 64:
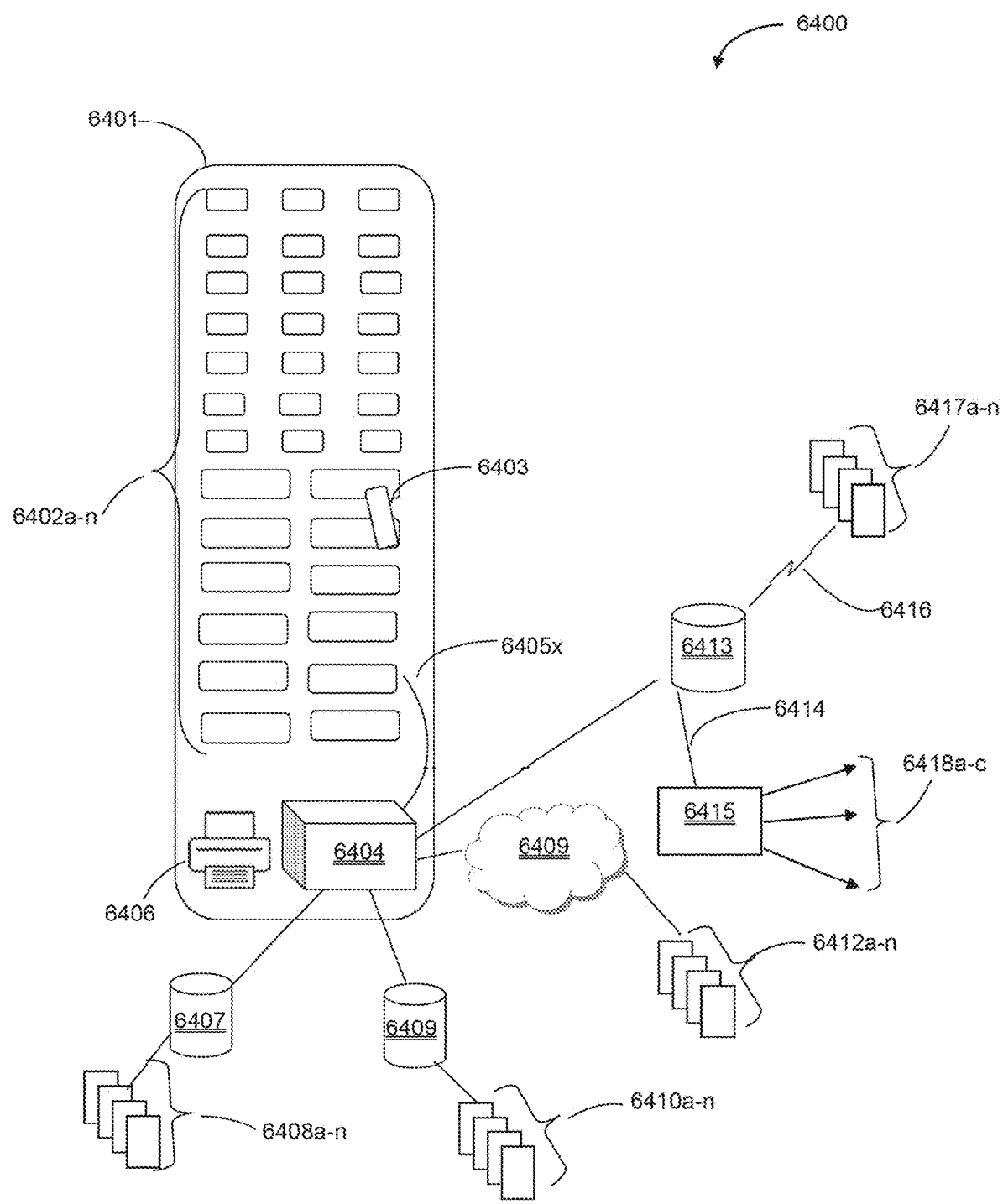
FIG. 64 shows a simplified drawing of exemplary system architecture, according to one embodiment.

FIG. 64 shows a simplified drawing of exemplary system architecture 6400, according to one aspect of the system and method disclosed herein. Multi-device tower 6401 houses the device processing hardware and software, although in other cases, the computer and/or storage unit may be separate form the drawer unit, connected by one or more cables. Device drawers 6402*a-n* are described in detail in the discussion of FIG. 63, above. Also shown is exemplary device 6403, as described in the discussion of FIG. 62. Computer 6404 is essentially an expanded version of test system 5400, described above in the discussion of FIG. 54 and throughout, with all the software and additional features, such as, for example, USB hubs, etc. In this case, it has additional software for additional features, such as, for example a system that lets it determine whether a handset is registered as lost or stolen, and hence can not legally be re-activated, etc. More of these additional features are described herein. Depending on the jurisdiction, the OEM, and the carrier(s) involved, one or more such databases (not shown) need to be queried to determine whether a device was reported lost or stolen. In some cases a printer 6406 may be coupled or attached to computer 6406, for printing labels for devices, including in some cases shipping labels for destinations for processed devices. Exemplary connection 6405*x* is one of multiple connections (only one connection shown here, for reasons of clarity and simplicity) from computer 6404 to all drawers 6402*a-n*. RAID storage unit 6407 is extended intermediate secure, redundant storage for user data that may take a longer time to transfer into one or more of the respective cloud accounts of said user. The content of each device 6408*a-n* is stored in an encrypted temporary location in said storage unit 6407, from which it may be sent to the designated cloud service of the customer. Storage 6409 contains software support services 6410*a-n*, which may comprise, for example, system vendor support, lost or stolen device identification, device information retrieval system (to determine such things as original issuing carrier), whether device is carrier locked, amount of memory and other model characteristics, retrieval of user data into local and cloud storage (including, but not limited to, address book(s), messages, mail and mail accounts, pictures, videos, music, voice recordings and any other media) as well as secure removal of user data and a new image/PRL programming, etc. to be installed on the phone based on its re-use after the digital cleanup. Also contained are, in some cases, software to interact with carrier logistics and destination management 6413, and in some cases with shipping carriers 6417*a-n*, etc. In yet other cases, a lost or stolen check may be included as well. Further, in some cases, one additional software can obtain market pricing for a particular handset and its quality status (for example, rated A, B or C based on mechanical appearance and battery health), enabling, in near real-time, determination of market value for making buy-back offers to owners at the point of collection. Through Internet 6411 the system can access external cloud storage 6412*a-n* such as, for example, the Apple iCloud, Google G-Drive, OEM cloud network (OCN) such as Samsung cloud HTC, or carrier cloud network (CCN) such as Verizon cloud storage. Carrier logistics and destination management 6413 determines which destinations need which device models. Also shown is exemplary carrier desk 6415, which has skilled logistics workers and/or algorithms (at carrier, not shown) to most efficiently dispose of refurbished handsets based on the quality ratings and current market pricing, needs internally etc. Connection 6414 connects carrier desk 6515 to carrier logistics and destination management 6413, and wi-fi connection 6416

*a-n* connects destination management 6413 to shipping carriers 6417*a-n*, such as, for example, USP, FedEx, OnTrac, etc Arrows 6418*a-n* show how devices are sorted into high-grade devices, which are in pristine conditions, ready to kit and ship; medium-grade devices, in good condition, but need some cosmetic improvements; and low-grade devices, in poor condition, but have salvageable parts. In some cases, kitting may happen at allocation, in others, a mobile service vehicle may be used to service multiple locations in a region, reducing labor costs to the store.

Figure 65:
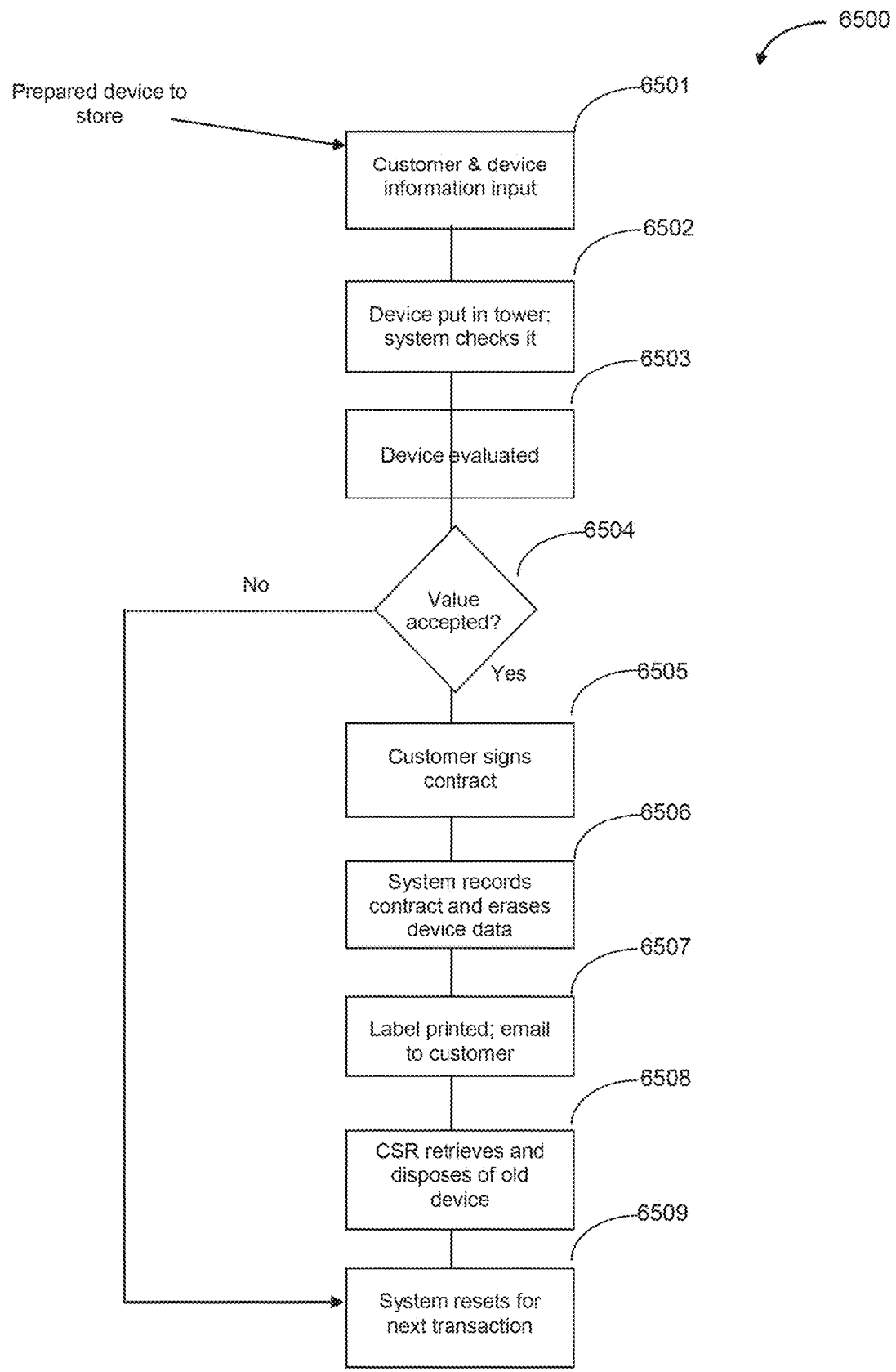
FIG. 65 shows an exemplary process for implementation of the system when a user brings in an old device with content already backed up, according to one embodiment.

FIG. 65 shows an exemplary process 6500 for implementation of the system when a user brings in an old device with content already backed up, according to one aspect of the system and method disclosed herein. This process assumes that passcodes are all unlocked; debugging mode, such as, for example, Android Debug Bridge mode, is already turned on; the Kill switch is already turned off; and the customer desires to trade in the device for cash or credit. In step 6501, the customer service representative (CSR) greets the customer, launches the system app on his tablet, and inputs customer ticket information, including the customer's email for notifications and receipts. The CSR or the system then designates a device drawer number. In step 6502, the CSR places the device into the tower drawer and connects it. The system checks the device for its lost/stolen status and activation readiness. In step 6503, the CSR leaves the tower to up-sell a new device to the customer. The system transmits the device valuation to the CSR's tablet to discuss with the customer. In step 6504 the customer, on the CSR's tablet, indicates agreement or disagreement with the device valuation. If the customer disagrees (No), in step 6509 the CSR opens the device drawer and returns the device to the customer, and the process ends at step 6510. If, in step 6504, the customer agrees with device valuation (Yes), then in step 6505 the customer uses the CSR's tablet to sign an agreement with terms and conditions about content transfer and content erasure liability. In step 6506, the system sends an agreement notification from the CSR's tablet to the tower. The system then proceeds with device erasure operation. After the system completes device erasure, in step 6507 the CSR's tablet receives a prompt to print a device label for old device disposition. The CSR chooses the "Print Label" button on the tablet. The system also sends a content erasure confirmation receipt to the customer's email address. In step 6508 the CSR opens the tower drawer and retrieves the device. He then affixes the label printed in step 6507 to the device, and places the processed device in the store's out-box for later pickup/delivery. In step 6509, the system then automatically re-sets to the Start screen on the SCR's tablet for the next customer transaction.

Figure 66:
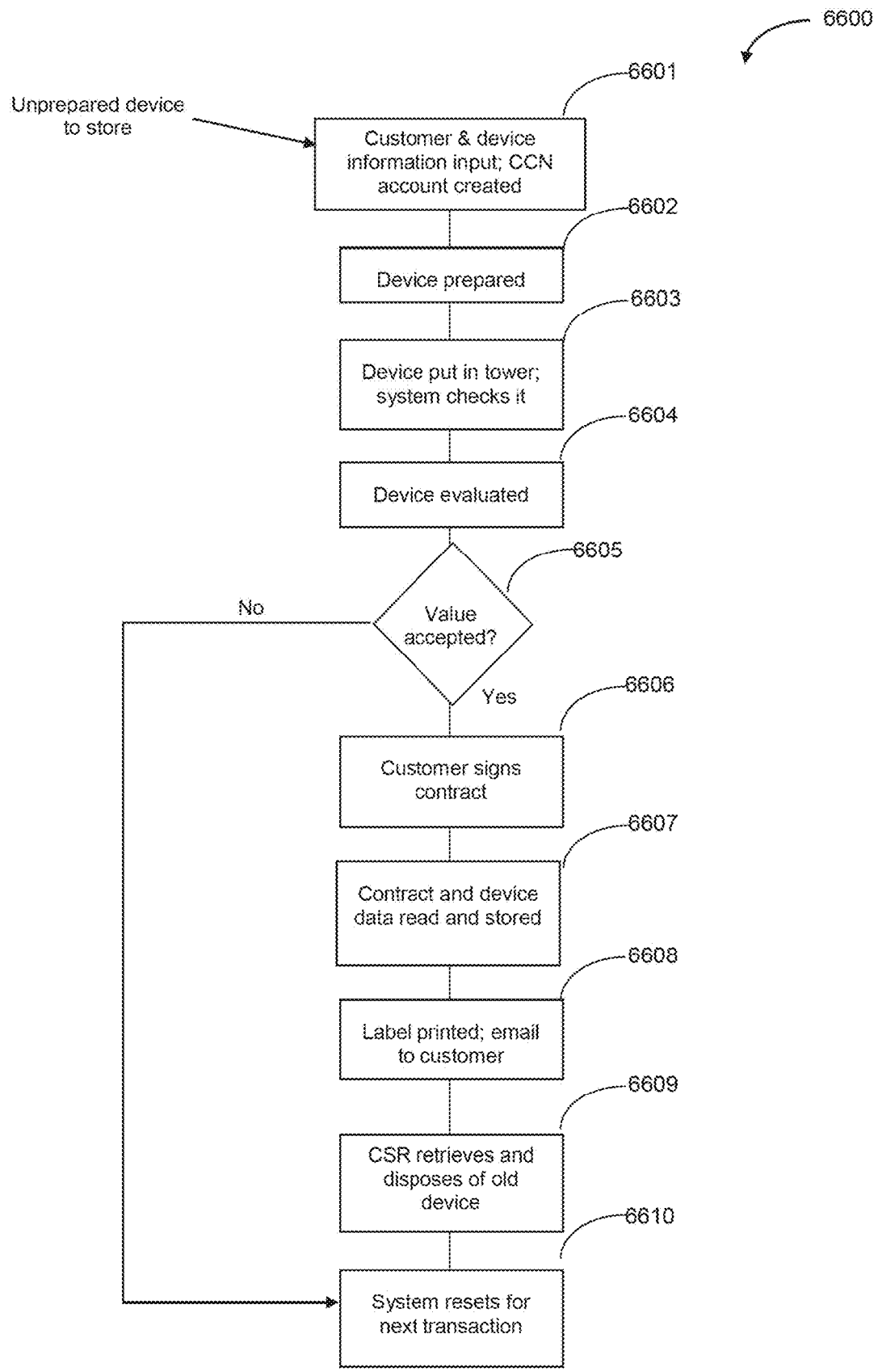
FIG. 66 shows an exemplary process for implementation of the system when a user brings in an old device with content back-up and transfer required, according to one embodiment.

FIG. 66 shows an exemplary process 6600 for implementation of the system when a user brings in an old device with content back-up and transfer required, according to one aspect of the system and method disclosed herein. This process assumes that the customer desires to trade in the device for cash or credit. In step 6601, the CSR greets the customer; launches the system app on his tablet; inputs customer ticket information, including the customer's email for notifications and receipts; and creates a temporary CCN customer account to store content. The CSR or the system then designates a device drawer number In step 6602, CSR has the customer unlock the device's passcode and turn-off the kill switch, and the CSR then turns on the debugging mode. In step 6603, the CSR places the device in the tower drawer and connects it. The system checks the device for its lost/stolen status and activation readiness. In step 6604, the CSR leaves the tower to up-sell a new device to the customer. The system transmits the device valuation to the CSR's tablet to discuss with the customer. In step 6605 the customer, on the CSR's tablet, indicates agreement or disagreement with the device valuation. If the customer disagrees (No), in step 6610 the CSR opens the device drawer and returns the device to the customer, and the process ends at step 6611. If, in step 6605, the customer agrees with device valuation (Yes), then in step 6606 the customer uses the CSR's tablet to sign an agreement with terms and conditions about content transfer and content erasure liability. In step 6607, the system sends an agreement notification from the CSR's tablet to the tower. The system then reads and stores the device phonebook information and all the other content into a temporary encrypted file on the tower's internal data storage unit. The system also pushes the stored content to the customer account on the CCN. In step 6608, after the system completes the processing, the CSR's tablet receives a prompt to load the stored phonebook and other information into the customer's new device (some sub steps not shown for clarity of diagram) and to print a device label for old device disposition. The CSR chooses the "Print Label" button on the tablet. The system also sends a content erasure confirmation receipt to the customer's email address, with a link to the CCN account and a receipt detailing the device erasure and content transfer operation details. In step 6609 the CSR opens the tower drawer and retrieves the device. He then affixes the label printed in step 6608 to the device, and places the processed device in the store's out-box for later pickup/delivery. In step 6610, the system then automatically re-sets to the Start screen on the CSR's tablet for the next customer transaction. Also, in some cases, for cross-carrier trade-ins, or for owner's preference, a backing up media contents can be made into a USB thumb drive (not shown).

Figure 67:
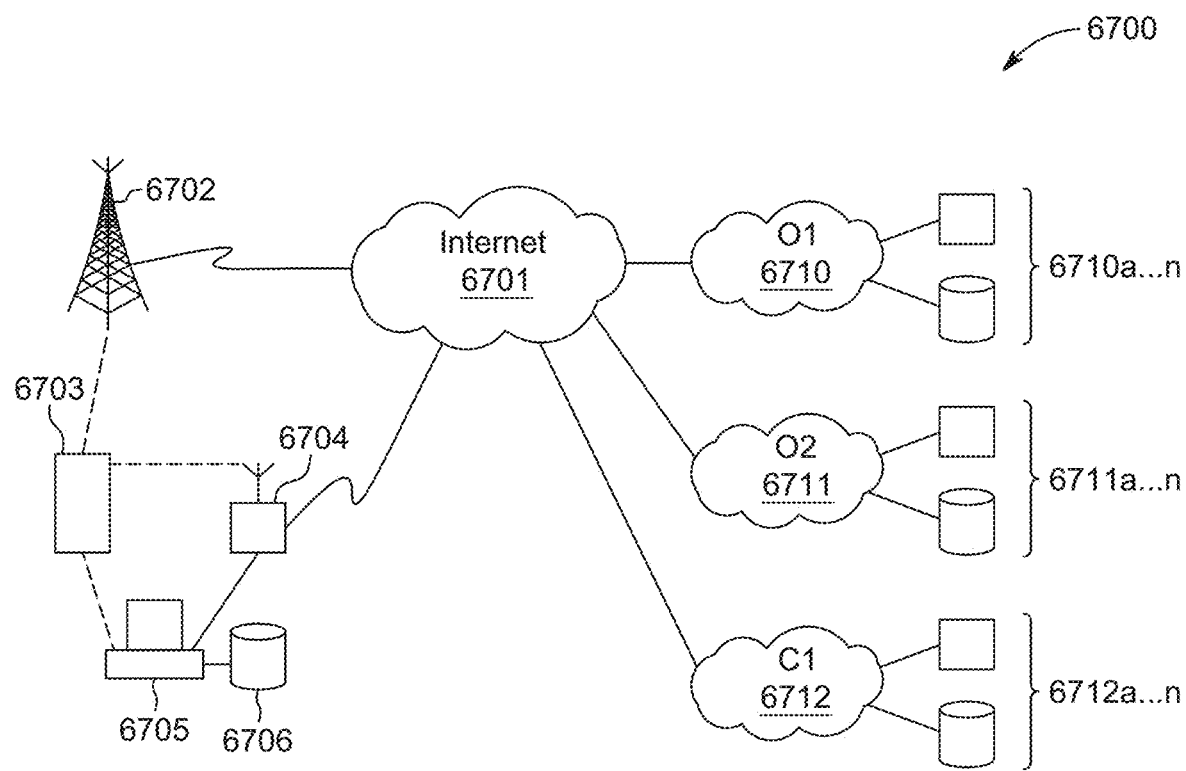
FIG. 67 shows a typical mobile phone network architecture, as may be currently in use.

FIG. 67 shows a typical mobile phone network architecture 6700, as may be currently in use. Mobile phone 6703 may be used at home or at an office; it may have access through cellular network 6702 to the Internet 6701, and from there to all kinds of cloud services 6710, 6711, and 6712, each of them potentially with servers and storage 6710*a-n*, 6711*a-n*, and 6712*a-n*. Also in some cases a computer 6705, for example, a desktop or notebook may be used. It may have additional storage 6706, where, for example, a user may store additional pictures, music, videos, applications, e-mails, messages, chats etc. For example, if phone 6703 is an iPhone it may have some data and other content synchronized into the iCloud O1 6710 with Apple, but the user may synchronize some content to the Google cloud O2 6711, for example, or to Dropbox, etc. Any services mentioned herein are exemplary only and may be exchanged with functionally equivalent services from any other companies. Also, contacts, for example, may be both in the iCloud and in the Google cloud, in some other proprietary could, and/or in the carrier cloud C1 6712. Further, most cloud providers offer tools to synchronize applications and data, such as videos and images, automatically to their clouds, since it is in their interest to increase the user's cloud storage so they can charge the user more. Thus, in current usage, content originating from a cellular phone such as, for example, phone 6703, may be distributed and stored in any or many of a wide variety of local and cloud-based storage.

Figure 68:
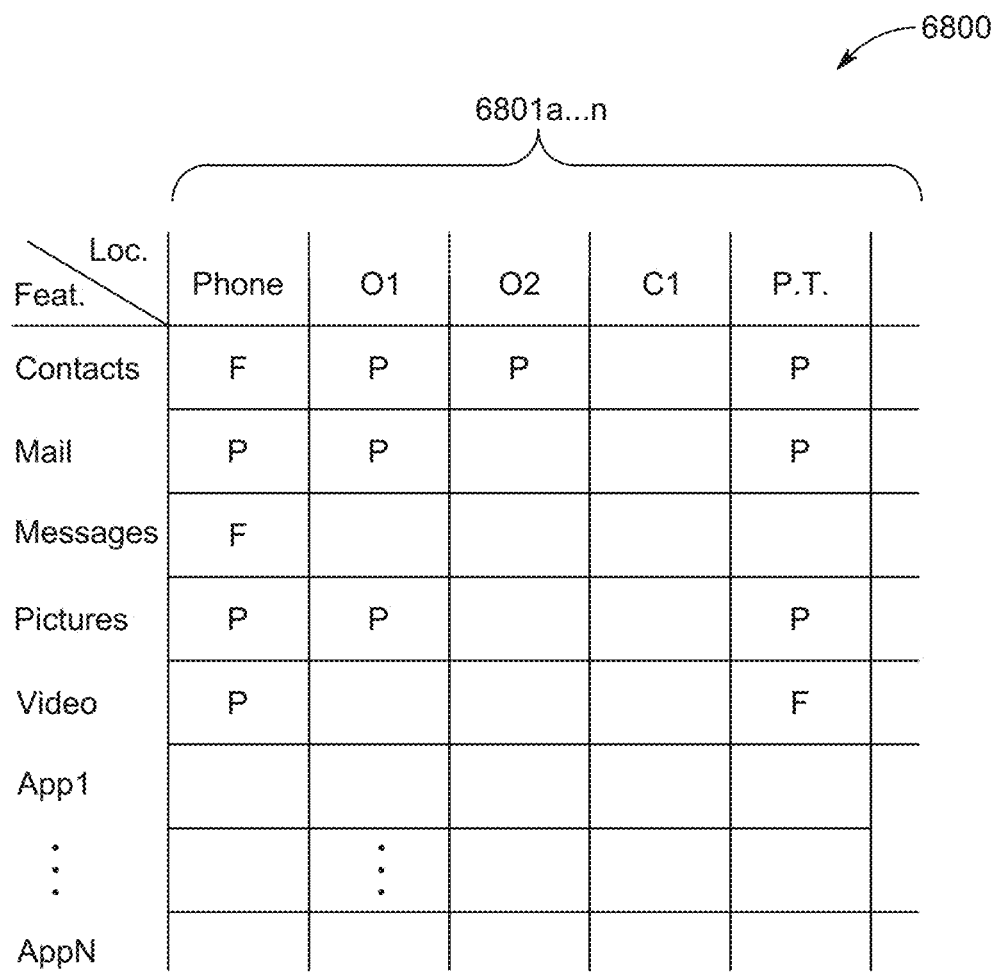
FIG. 68 shows an exemplary tabular computer content map.

FIG. 68 shows an exemplary tabular computer content map 6800, according to one aspect of the system and method disclosed herein. Map 6800 charts locations 6801*a-n* of a user's content, so the system can then deduce which content must be migrated when a user moves to a new phone. If, for example, a user is moving from an iPhone to an Android phone, any content the user has in the Apple iCloud must be moved elsewhere, because the Android phone cannot access the iCloud. Or, if the user moves from an Android phone to an iPhone, although content in the Google cloud can be accessed by an iPhone in some cases, the full features/metadata may not be available, so some content should be moved in those cases also. Thus, when notified by a user of migration to a new phone, the system creates a new map of usable and unusable storage locations for the new phone. The system then compares its map of current content locations to the new map, giving new target locations for content according to a user's wishes and within the limits of usable content locations. For example, if the user stores images in Dropbox, the system maps the new content storage so these images can continue to be stored there; but if a user is storing contacts in a carrier's cloud storage, the system maps these contacts to a new location such as, for example, the new phone carrier's cloud storage.

Figure 69:
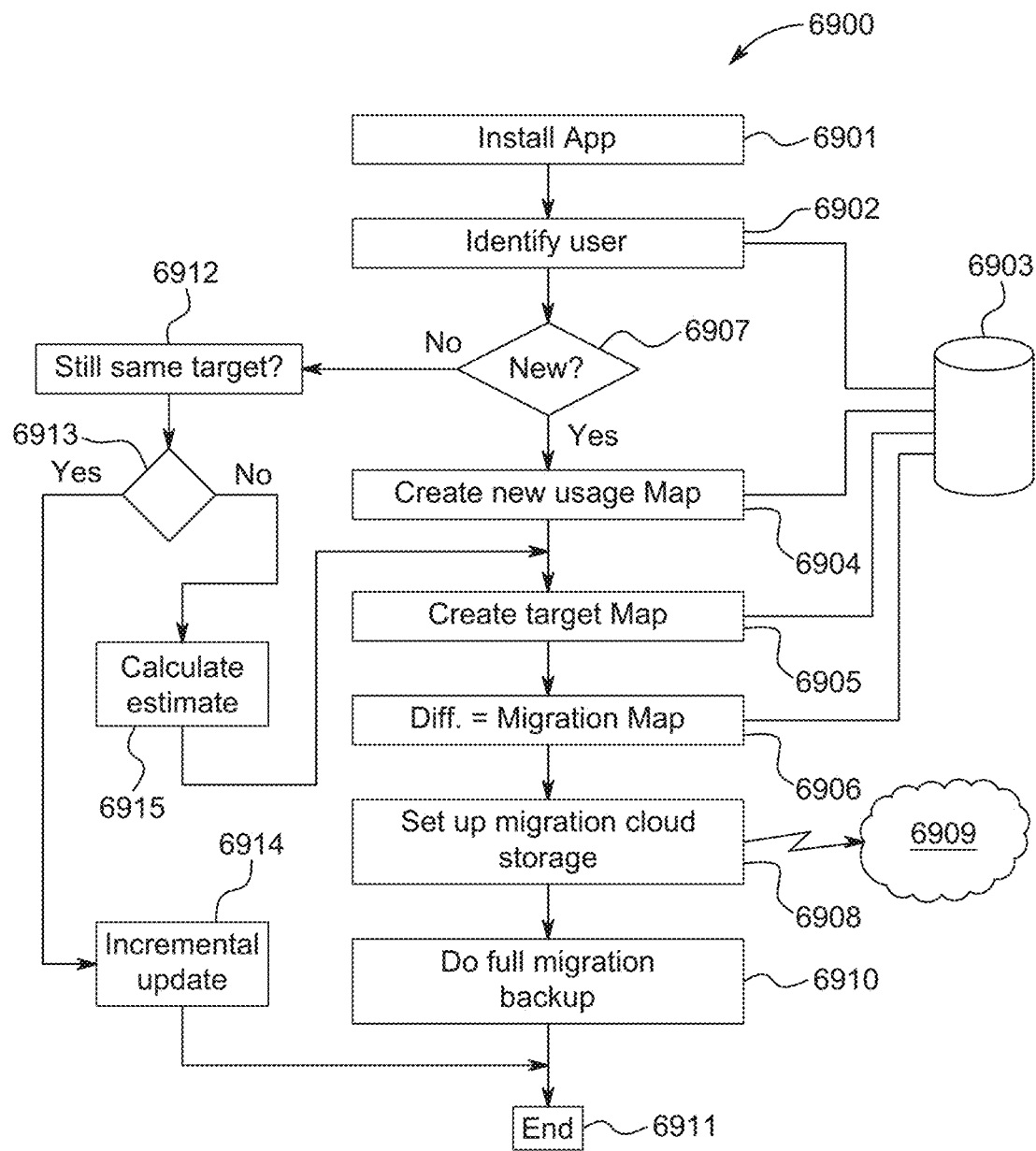
FIG. 69 shows an exemplary process for migration of computer content when a user moves to a new phone.

FIG. 69 shows an exemplary process 6900 for migration of data, applications, and other desired content when a user moves to a new phone, according to one aspect of the system and method disclosed herein. In step 6901, the user installs the system app, typically (but not always) on his current phone. The user then logs on to the system, and, if necessary, he also logs on to or provides credentials for one or multiple cloud storage services, depending on what cloud services he or she uses on what provider(s). In step 6902, the system communicates with data storage 6903 to identify the user. In step 6907, the system determines whether the user is new (y) or already an existing user (n). If a new user, in step 6904 the system creates a new account and a new map of existing content locations. All this information is stored in data storage 6903. Then, if the user has indicated that he is moving to a new phone, the system in step 6905 creates a target map of new content locations, and in step 6906 the system creates a migration map showing the differences in content locations between the old location map and the new location map. In all these steps, the system stores data in data storage 6903 and also draws stored data as needed. In step 6908, the system sets up content storage for new locations in various storage services in cloud 6909. In step 6910, the system does a full backup of all data, applications, and other content scheduled for migration and then in step 6911 the process ends. By the time the actual content migration is scheduled to occur, the user may have made changes in his storage locations, so he may log on to the system again, as in step 6902. In step 6907, if the system determines that the user is already an existing user, in step 6912 the system asks the user if all migration targets are the same. If, in step 6913, the user indicates that all migration targets are the same (Yes), in step 6914 the system incrementally updates the user information and the process ends. If, in step 6913, the user indicates that all targets are not the same (No), in step 6915 the system verifies the new targets and then the process loops back to step 6905 to create a new target map and proceed from there. When the user wants to initiate transfer of content from existing locations to new locations, typically, the app provides a means (not shown), such as, typically, a "go" or "confirm" button (or equivalent), after clicking of which the transfer starts, in some cases including creation of new accounts on target clouds.

In some cases, a system may simulate a human user touching the screen of a device, such as a cell phone or similar, that has a capacitive touch screen, with the device positioned on a touch simulator that has a matrix of individually addressable, electric structures based on an LCD display. In such a system, a camera may photograph the device screen and transmit the resulting images to a computer, where the interactions of the touch simulator and the device are recorded. Additionally, software on a computer can create scripts for future, similar interactions, using the stored images to test similar devices for functionality. Alternatively, the system may simulate human touch on the device screen through a matrix of individually addressable, XY resolved electric structures based on inflatable tubes.

Figure 70:
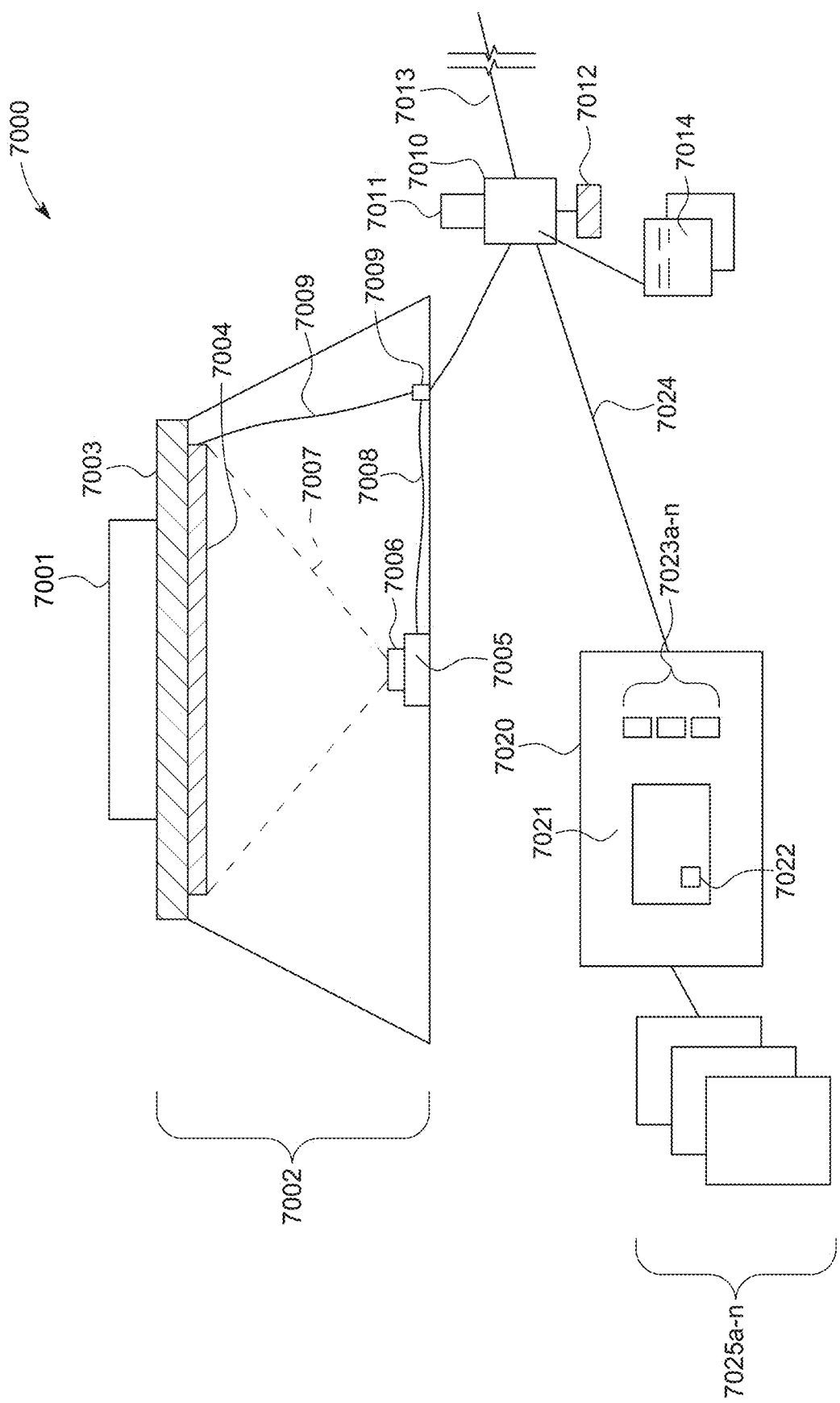
FIG. 70 shows an overview of an exemplary testing system 7000.

FIG. 70 shows an overview of an exemplary testing system 7000, according to one aspect of the system and method disclosed herein. Phone, tablet, phablet, or similar device 7001, which is under test, sits with its display screen facing down atop test fixture 7002. Fixture 7002 is topped by shield 7003, made, for example, of a transparent material such as glass or acrylic. Underneath is mounted a transparent LCD unit or similar 7004, which unit can simulate a user's finger moving on the display of device 7001. Camera 7005 has a wide-angle lens 7006 that can take in the whole display area 7004, as indicated by view angle 7007. Shield 7003 may have various different placement markings for various different devices, so an operator knows where to position each type of device so the display is in the view field of the camera. Thus camera 7005 can view and capture what is happening on the display of device 7001. Computer 7010, using software 7014a-n, can manipulate functions on display 7004 to simulate user touches on the display of device 7001. Most devices use capacitive touchscreens, such as and similar to those discussed in Wikipedia article "Capacitive sensing" (https://en.wikipedia.org/wiki/Capacitive_sensing). Therefore, it is important that shield 7003 be very thin, to allow the touchscreen to sense the activities of LCD 7004. LCD 7004 is stripped of all accessory or unnecessary features, with no polarizers or other extra features. It is just two panels in series. Even the LCD itself is not necessary; only the active thin-film transistor (TFT) part that enables changes in an electric field is used in this approach. These changes are used to simulate the touch of a human finger (or several fingers). Typically dozens of pixels are activated to represent one finger. Device 7001 is able to detect the change in the field and can be used to simulate a finger touch by moving the active area; i.e., making the display "think" it creates a visible image. However, an image (on LCD 7004) is not actually visible. Because the polarizers have been removed, the LCD simulates a finger touch. More about this approach is described in the discussion of FIG. 71, following. Computer 7010, typically, may have a display 7011, keyboard 7012, and a pointing device (not shown). It may be connected to a network 7013 and/or to tablet 7020 through a wireless connection 7024. Tablet 7020 may have software 7025a-n that displays images from camera 7005, in this case, the image of device 7001 as image or outline 7021 on the tablet display. Software 7025a-n is typically used only to set up (and record) new procedures for new software on device under test (DUT) 7001. In this example an icon on the display of device 7001 appears as icon 7022 on the tablet within outline 7021 of the DUT 7001. The operator may now choose from icons 7023a-n what functions he wants to perform on image 7021; that is, for example, he can touch icon 7022 to perform a slide, single-tap, double-tap, multi-tap, squeeze, stretch, etc. Although a tablet 7020 is shown here, the same functions maybe performed on a screen connected to computer 7010, directly or indirectly, using mouse and keyboard, or using a touchscreen or other, similar apparatus or input device. Computer 7010 records and/or stores any functions and following steps, etc. as well as transmitting them to LCD 7004, which then simulates the use of a finger function on device 7001. In this manner, an entire script of operations for a specific type and model of device with its specific software can be created on tablet 7020 and used to test every device of that type. Further, such a test script may be run at variable speeds, that is, real-time speed, faster, slower, etc. Once a set of scripts is created, any script can be recalled from the keyboard 7012, or even by the computer 7010, just by recognizing the device 7001 plugged in, and the whole sequence can be played back without any human interaction. In some cases, the camera 7005 can recognize (based on certain previously made selections during creation of scripts) that additional input is necessary, such as adding a password, etc. and typing that into the screen-based keyboard on device 7001.

Figure 71:
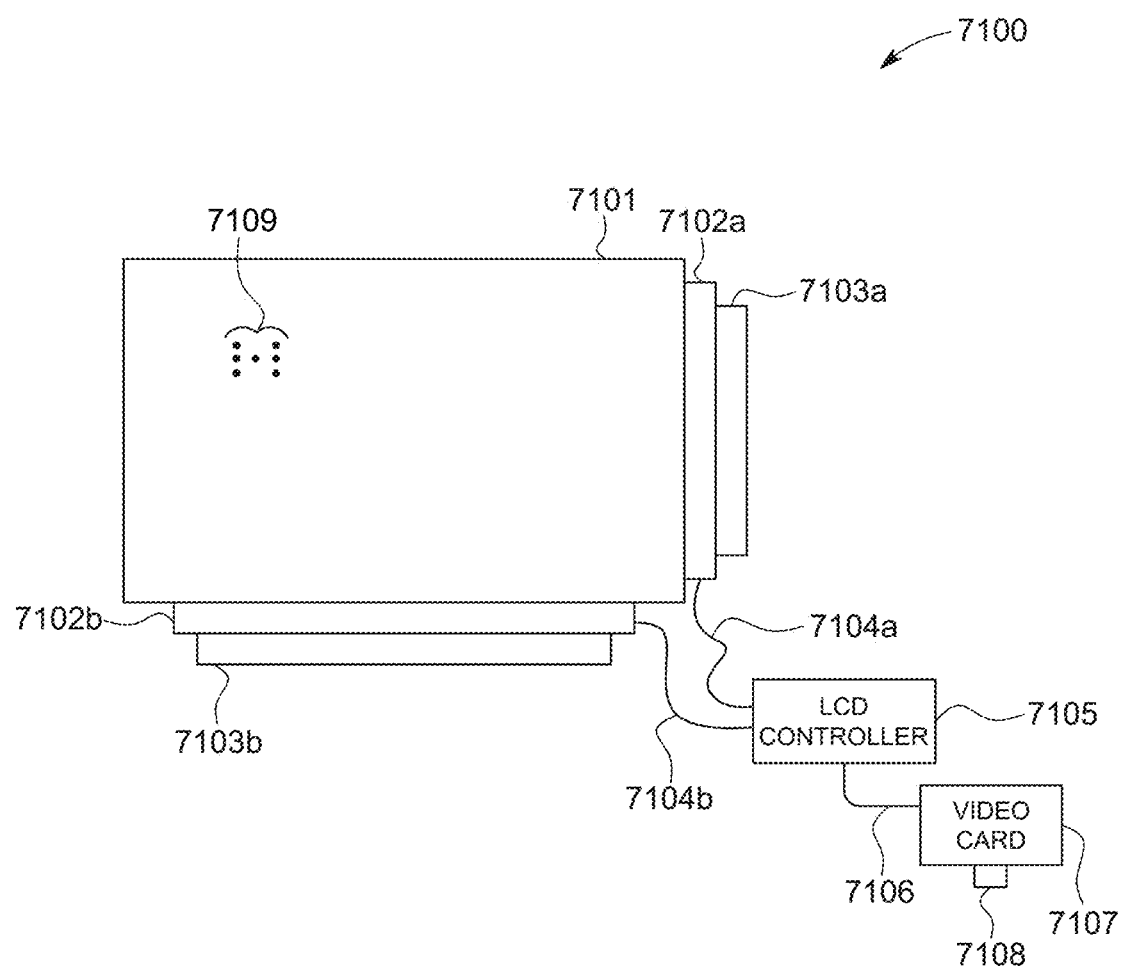
FIG. 71 shows an overview of an exemplary stripped LCD 7100, introduced in the discussion of FIG. 70 as LCD 7004.

FIG. 71 shows an overview of an exemplary stripped LCD 7100, introduced in the discussion of FIG. 70 as LCD 7004, according to one aspect of the system and method of disclosed herein. LCD 7100 has glass 7101; tabs 7102*a* and 7102*b*; driver chips 7103*a* and 7103*b*; LCD controller 7105; connections 7104*a*, 7104*b*, and 7106; video card 7107; and PCI connector 7108. PCI connector 7108 typically plugs into a computer such as a notebook or desktop, depending on the type video card and the bus in the computer. Connector 7108 may be plugged into a computer such as computer 7010, which may then drive the LCD. Active pixels 7109 are shown, for clarity, on glass 7101 as black dots, but in reality they would, in this case, be invisible because all the filters have been removed or not even applied. Pixels 7109 indicate an area of activity applied over an icon on device 7001 to activate the icon. By using LCD pixels that have similar resolution to those on the device 7001 under testing, smooth motions such as, for example, slides or multi-taps may easily be simulated and applied to the device.

Figure 72:
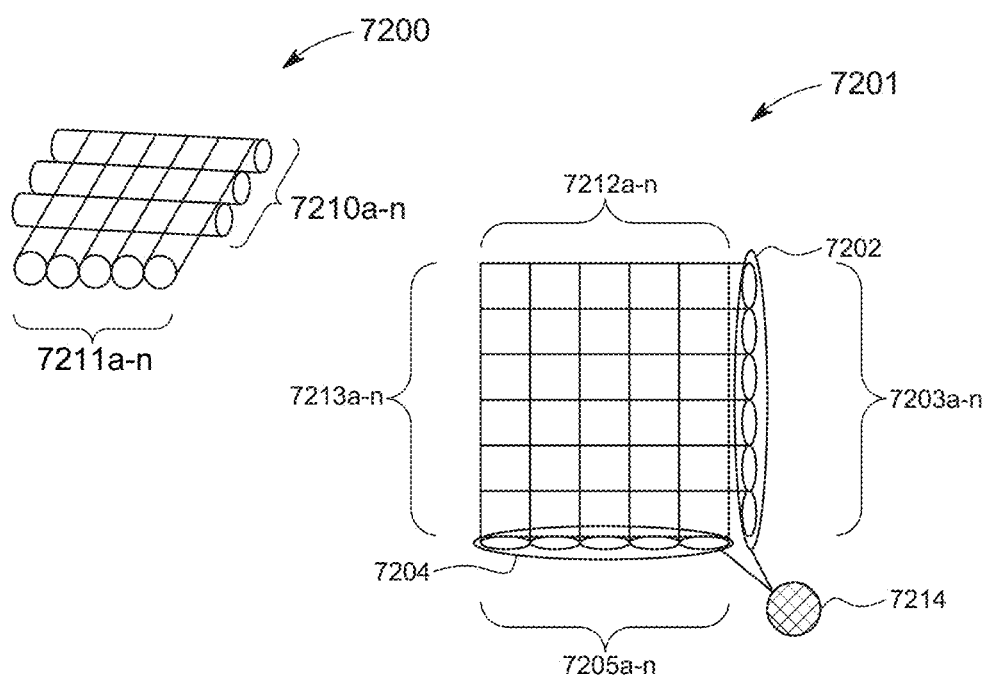
FIG. 72 shows an overview of an exemplary alternative approach 7200 for activating an icon on a device screen, using a cross-hatching of tubes.

FIG. 72 shows an overview of an exemplary alternative approach 7200 for activating an icon on a device screen, using a cross-hatching of tubes, according to one aspect of the system and method disclosed herein. In this approach, rubber tubes with a slightly conductive coating are inflated. Only when two perpendicular tubes inflate does the area at the junction of the two tubes expand enough to touch the device screen. Thus when, at the junction of two inflated tubes, the upper tube touches the screen, it simulates the touch of a user. Tubes 7210*a-n* and 7211*a-n* create matrix 7201. At the edges of matrix 7201 are inlet valves 7203*a-n* and 7205*a-n*. These valves connect to inlet chambers 7202 and 7204, respectively, which chambers are fed by fan 7214. By controlling the air feed into specific valves of inlet valves 7203*a-n* and 7205*a-n*, one or more matrix points may be inflated so the selected points expand enough to touch the screen with the slightly conductive rubber, thus simulating a user touch. Using reduced-flow bleed valves (not shown) on the opposing ends of the tubes would enable the tubes to inflate quickly, but also deflate once the inlet valve is closed. Adjusting the ratio of cross-section between inlet and bleed valves could achieve an optimum balance between speed of inflation and deflation. The problem with this approach is that it would be more difficult than the approach described in the discussion of FIG. 70 to simulate a workable sliding motion, and achieving a workable the resolution would be difficult. Also, it would be more difficult to achieve enough transparency with those tubes so the screen can be observed to see what's happening where and be responsive to software input. However, software on the computer controlling the matrix could be used to compensate for the sliding difficulties by trying a "soft transition" between matrix points and by erasing/compensating for much of the visual distortion created by the un-transparence of the matrix, thus reducing somewhat the disadvantages.

In some cases, a system for reviewing returned smartphones and other computing devices may employ a device-specific protocol for a multistep procedure, with as many of the steps as possible removed from personal judgment. A matching application on the device would support certain steps of the operator and can fill in certain responses. This system may note in a log the steps that were performed without the operator's help, but the operator may override the system with a note and acknowledgement. Further, such a system may require an operator to make a deliberate choice of various status messages when starting to evaluate such a device, starting at a neutral state and actively moving a status report to a yes or a no. In many cases, a script may perform different sets of tests for different devices based on the system owner's preferences.

Figure 73:
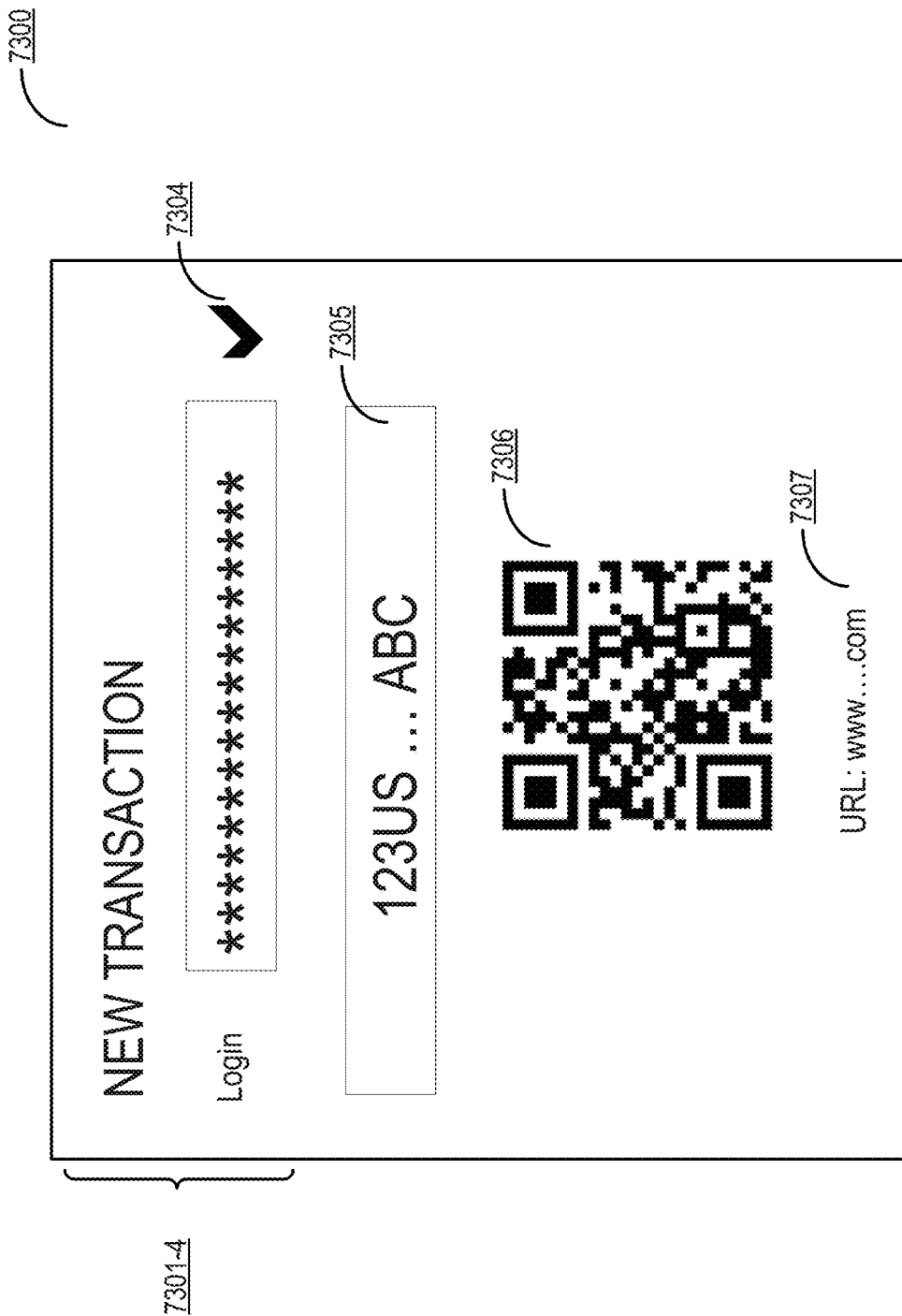
FIG. 73 shows exemplary screen 7300 on a computer running software for a system for managing transactions involving testing mobile devices.

FIG. 73 shows exemplary screen 7300 on a computer running software for a system for managing transactions involving testing mobile devices, according to one aspect of the system and method disclosed herein. Header section 7301-7304 has a login field with dots representing a login code, followed by a checkmark 7304, indicating that a system operator has checked in to the system already. Also shown are alphanumeric transaction ID 7305 and bar code 7306, which in this example is a two-dimensional bar code, such as QR code or similar type of code suitable for scanning by a smart phone, although, alternatively, in some cases, it may be a one-dimensional code. The reason there is both an alphanumeric transaction code and a bar code is because if the camera on the subject phone does not work, either due to physical damage or software malfunction, the user cannot scan the code, so then the user must manually enter the transaction code. If the user scans code 7306 with a phone or similar device, the system downloads the app into the phone. If the bar code cannot be scanned, the system also presents a URL 7307 that can be entered manually on the phone for a link to the app store. This URL can be a tiny URL that brings the user to the app store and allows him to download the app to the phone and then enter transaction ID 7305. Although there may be different variations in the process, essentially the phone ends up with an app and a transaction code, so the system an operator can then check and evaluate the phone for acquisition by the retail store.

Figure 74:
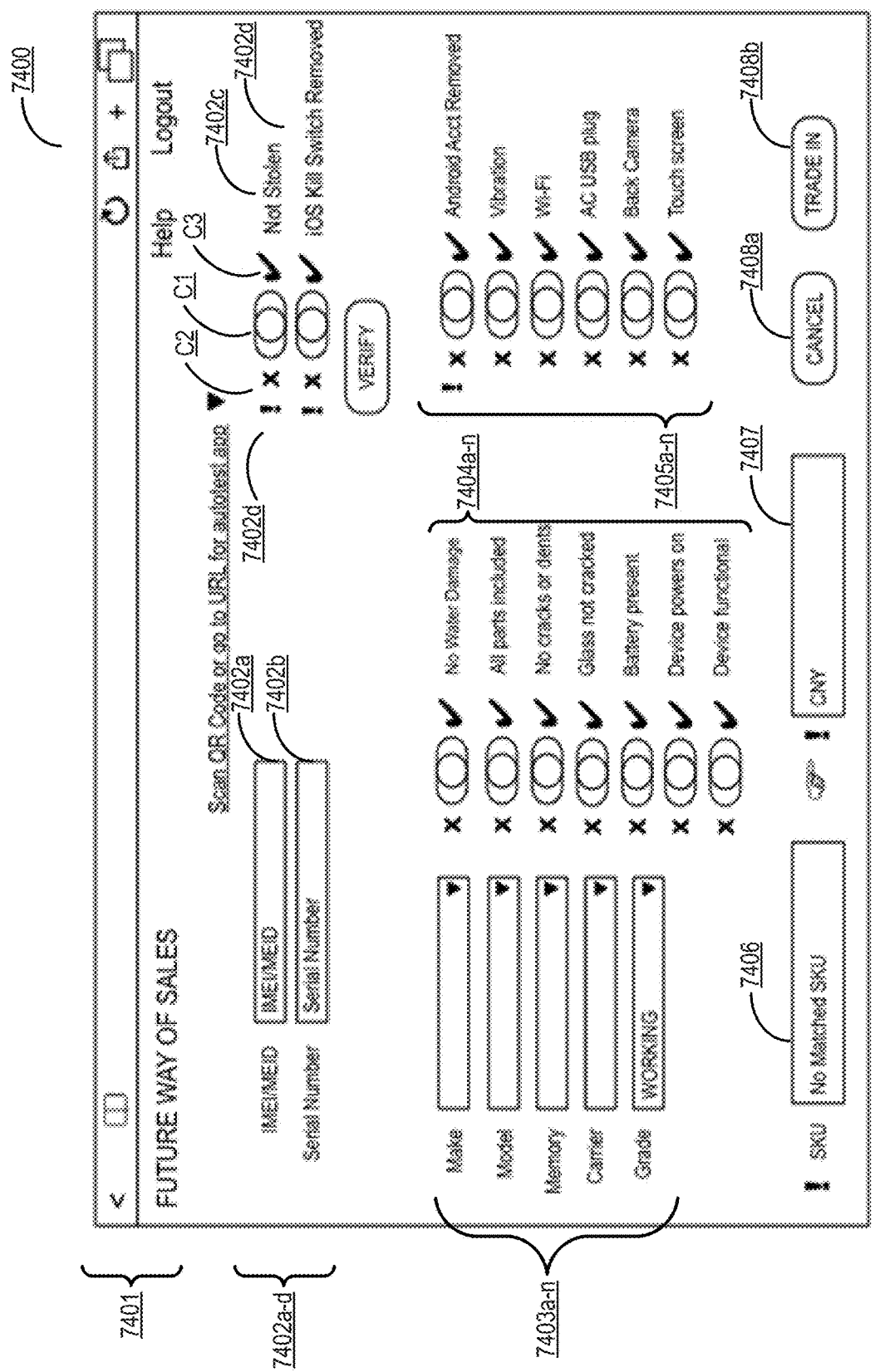
FIG. 74 shows exemplary screen 7400 that follows screen 7300.

FIG. 74 shows exemplary screen 7400 that follows screen 7300, according to one aspect of the system and method disclosed herein. Screen 7400 appears when a mobile device has acquired a new transaction. It shows the interaction offered to the operator doing the transaction. On top 7401 the main header section shows 7402*a-d*, the device-specific header section after the (typically) 2-D bar code was scanned, filling in the IMEI and the serial number of the device, and at some point the results of the "stolen/not stolen" and the "kill switch removed" status messages 7402*a-d*. In some cases those databases may not be available in all regions, so the operator may have to manually enter that information. All those status messages have special unique switches that, like 7402*c*, start in a neutral position 7402*c*1 and can be moved left to 7402*c*2 or right to 7402*c*3. The operator filling in the screen data thus cannot say, "Oh, the switch was in the wrong position and I didn't notice," because the system cannot proceed with a transaction unless all the switches are in either put by an operator action to the left (c2) or right (c3) position. The number of status options available can be set or requested by the operator or the enterprise operating the system, and the transaction cannot be completed until all status options have been addressed. Some options may be automatically addressed by the software on the device under test, or by the person operating the device. For example, an operator reviews and then selects "No Water Damage," thus moving switch 7404a (top line) to the right, position 7404a3. Similarly, the operator may select "Glass not cracked" 7404d3, indicating no observable cracks on the screen that would prevent the device from working properly when the screen is swiped. Other switches, likewise, indicate that the battery is present, etc. Data fields such as 7403a-n may populate automatically, mostly when the software is launched on the device. Once all the tests are complete, the system derives the identity of the operator who performed the tests from the ID of the operator who initially logged in. Then typically the device is assigned an SKU 7406, based on the grade and the answers provided. Also, the system assigns a value, in this example Chinese currency "CNY" 7407, or any other desired currency or value, for example, store bonus points, etc. Then the device owner can say if he wants to proceed with a trade-in and the operator accordingly selects either the "Trade in" button 74708b or the "Cancel" button 7408a.

Figure 75:
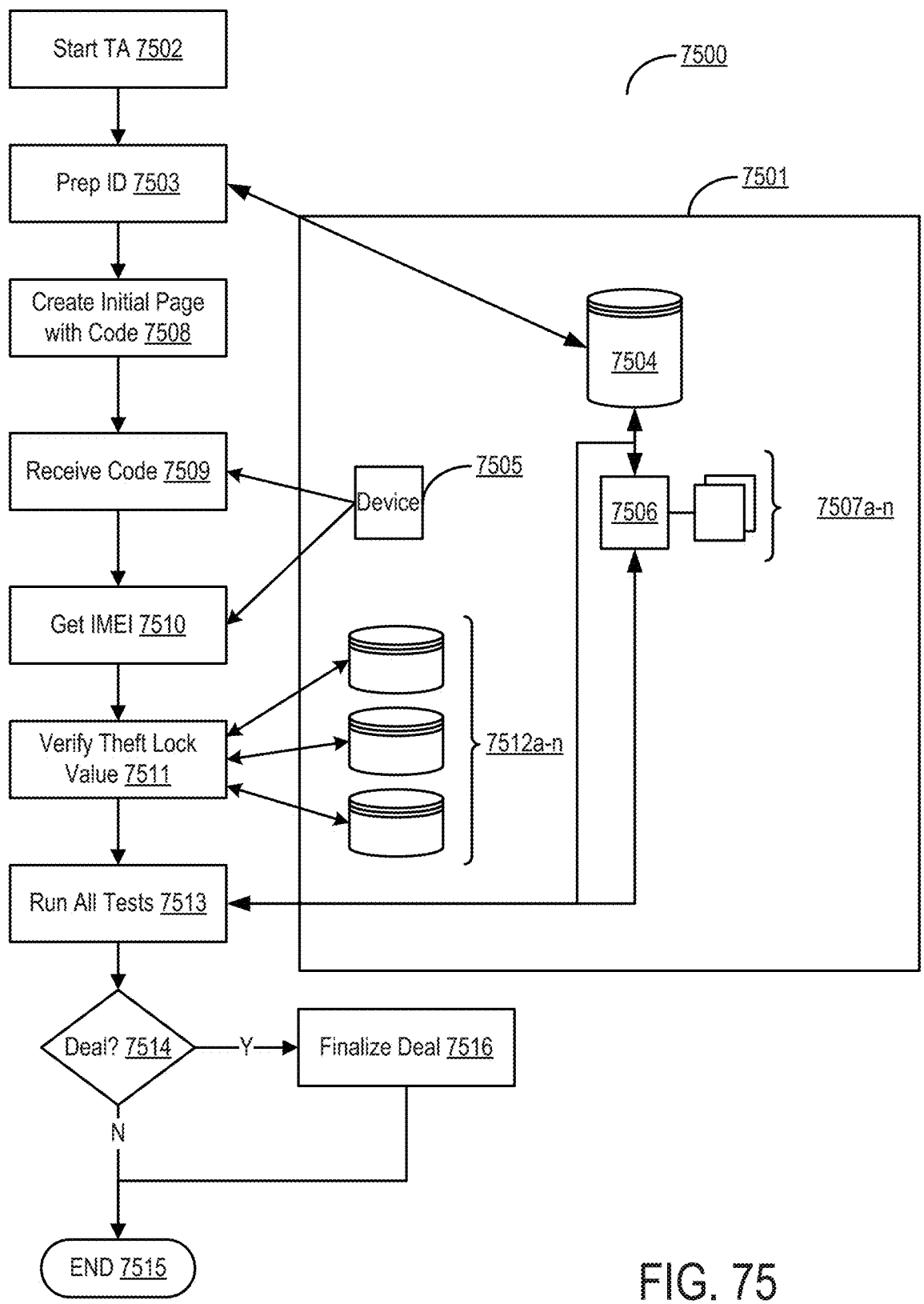
FIG. 75 shows an exemplary process 7500 for executing a transaction.
Figure 76:
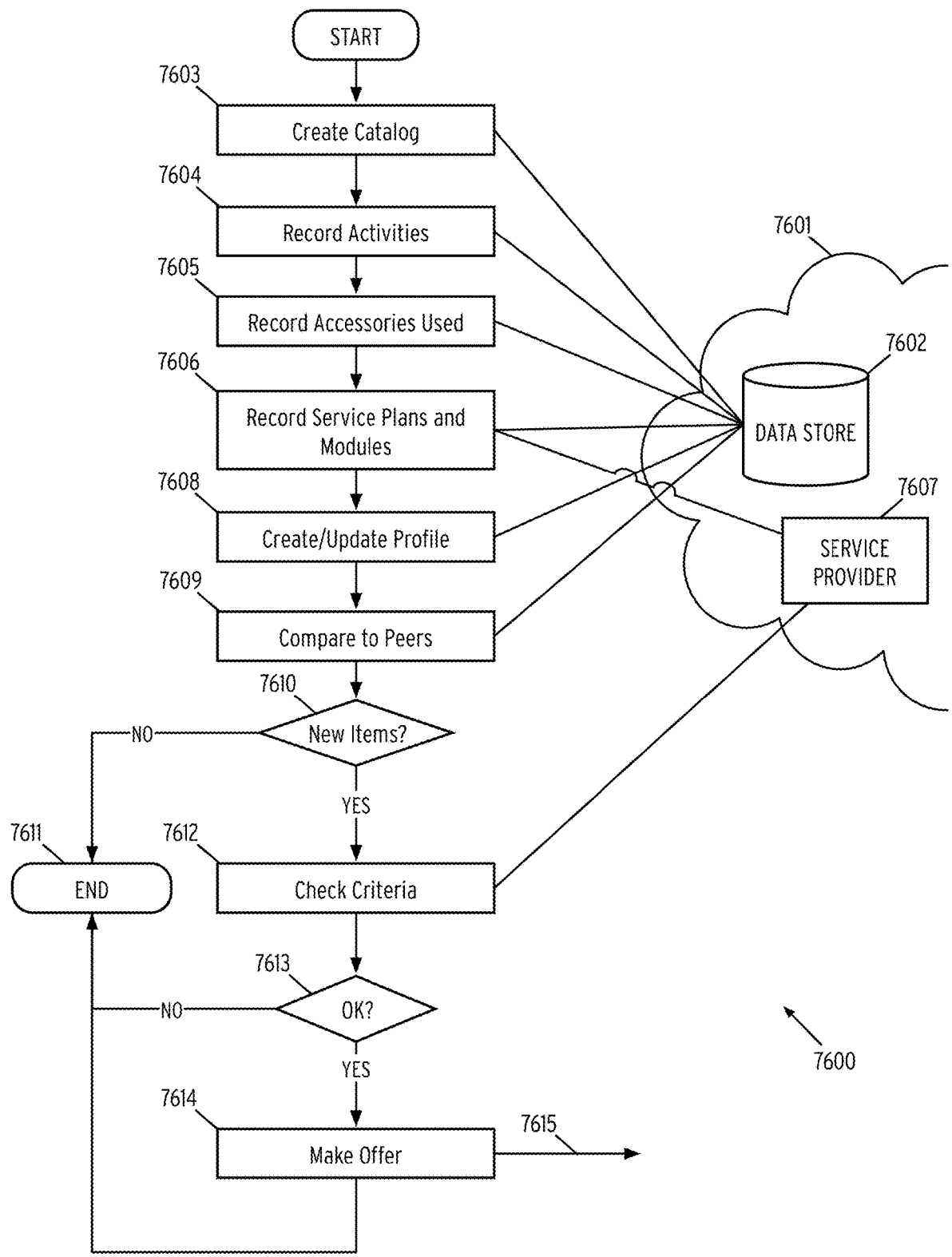
FIG. 76 shows an exemplary process 7600 for generating further sales offers to existing customers.

FIG. 75 shows an exemplary process 7500 for executing a transaction, according to one aspect of the system and method disclosed herein. In step 7502 the transaction is initiated. After login and preparation in step 7503 the system pulls a transaction ID from database 7504. Typically step 7503 is a web-based transaction on a server 7506 and database 7504 in network 7501, typically the Internet. Server 7506 also contains a multitude of programs 7507a-n, some of which are operating system and some of which are the system disclosed herein throughout. The system is typically distributed, with multiple components housed in various different physical and logical locations. Typically the transaction process has some component running as an app on the device under test; it has a component running as a web app in a browser on a tablet or computer in a retail or testing location; and it has a server component that is the main driving software. In step 7508 the initial web application page is created, as described earlier, with, for example, a bar code that enables download of the app to the device under test. It also has the initial transaction ID. In step 7509, device 7505, which is typically connected through a wi-fi and/or Internet connection, sends the code to the application, either via server 7506 or the browser through a web interface. Next, in step 7510 the system receives the IMEI and other information from the device under test, depending on the configuration and requirements. In step 7511 the system verifies the received data, such as the theft, lock, and value data. This data verification step may use internal and/or external databases 7512a-n, in any combination. They are shown here as separate databases. Some may be third-party databases; some may be integrated, or separated, or combined with database 7504. The actual pulling of this information may be done in any of various steps in the process and is shown here are one separate, unified step solely for purposes of simplicity and clarity. In step 7513 the system ensures that the operator or user runs through all the required step of the script, ensuring that all tests are run properly and completely. Based on the test results, a final value for the device under test is pulled from one of databases 7504 and 7512a-n. Based on the final value, the operator extends an offer to the device owner. If, in step 7514, the user accepts the deal (yes), in step 7516 the system finalizes the deal electronically and, in step 7515, the process terminates. If the user does not accept the deal (no), the process immediately terminates in step 7515.

In relation with FIGS. 29 to 40, FIG. 76 shows an exemplary process 7600 for generating further sales offers for existing customers according to one aspect of the system and method disclosed herein.

In step 7603 the system creates a catalog, typically, from data store 7602 in cloud 7601. Even though data store 7602 is shown here in a cloud, it may alternatively or additionally be in a local device, on a network server, or in any other accessible location. In one embodiment, a catalog comprises a set of attributes associated with a mobile device operated by a user. As described herein, a catalog may represent a centralized storage mechanism used to store all attributes of a mobile device.

In step 7604 the actual activities of the various apps on the user's mobile device are recorded, so the system can examine the different apps used and so forth. In one embodiment, activities of a user comprise cell changes, roaming table updates, installation and activation of software applications, installation and activation of plug-in software, phone calls, etc. In some embodiments, the actual activities of a mobile device are recorded in the catalog created in step 7603.

In step 7605 the system records in a log the various mobile device accessories, such as, for example, the types of headsets and other Bluetooth accessories. In one embodiment, the method updates the catalog with the mobile device accessories recorded in step 7605. This profile may also be stored in data store 7602 for subsequent use.

In step 7606 the system similarly examines and records in data store 7602 service plans and modules. In one embodiment, this data is extracted from a service module of service provider 7607. In other cases (not shown) the system could communicate with an app on the mobile device itself and extract this information locally, or it could talk to a dedicated server (not shown) or any other equivalent means could be used.

In step 7608 the system then creates or updates a profile of this specific mobile device associated with a given account. In one embodiment, the method may create separate profiles for the cataloged activities, the cataloged accessories and/or the cataloged service plans/modules. In one embodiment, the method saves the profile(s) to data store 7602 for subsequent use.

In step 7609 the system compares the user of this mobile device to other peers, meaning people who have either the same activity profile, the same accessory profile, or the same service plan profile. For example, if a user has the same activities and the same accessories but not the same service plans, the user may be a candidate for upgrading or changing his service plan. However, if a user has the same service plans and the same activities and apps, but not the same accessories, he may be a candidate for buying different accessories. In another embodiment, the method may recommend an accessory if a profile of cataloged activities and a profile of cataloged service plans or modules matches a given peer and a profile of cataloged accessories does not match the given peer. In another embodiment, the method may recommend an activity if a profile of cataloged accessories and a profile of cataloged service plans or modules matches a given peer and a profile of cataloged activities does not match the given peer.

Thus the system creates several types of peer groups for each device, and then in step 7610 it looks to see if it can propose new items to a user. If no, the process ends in step 7611.

If yes, the system then checks offering criteria in step 7612, determining whether the new items meet various criteria to make an offer. The criteria could be set by the carrier, in some cases, so the system checks with service provider 7607, or in some other cases it could be a filter set by the user in his profile. For example, the user may indicate that he does not want to get certain types of offers because he considers them as spam (and vice versa). In yet other cases both could set rules that are combined. In one embodiment, the offering criteria comprises a list of activities (e.g., applications), accessories, and/or service plans/modules offered by, for example, a carrier.

In step 7613 the system then determines whether it can make an offer to a user, based on the criteria checks. If no, the process terminates in step 7611. If yes, in step 7614 the system makes an offer. This offer may appear as a pop-up (not shown) on the user's device, or it could be sent via arrow 7615 as an email to the user, or both. In some cases, the offer may have a limited special discount attached. For example, if it's a service offer, if the user takes advantage of the offer within a specified time from the date of the offer, the user may receive an incentive such as, for example, the first month free, or the first three months at a discounted rate, etc. if he signs up immediately, as a way to motivate the user to sign up quickly.

Figure 77:
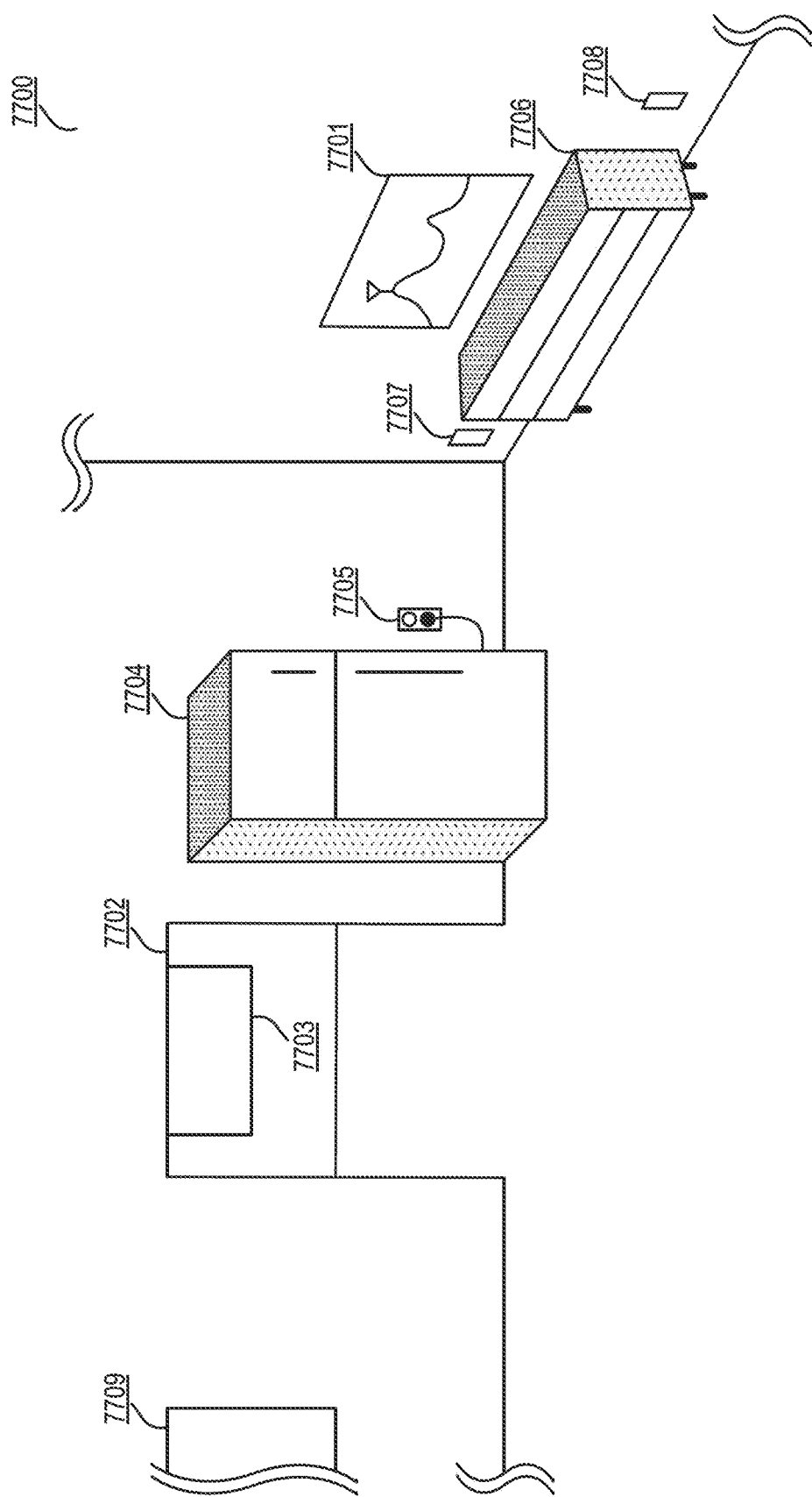
FIG. 77 shows an exemplary layout of a portion of a simple apartment.

FIG. 77 shows an exemplary layout 7700 of a portion of a simple apartment. Shown are window 7701 whose view includes a transmitter station, low chest 7706, outlets 7707 and 7708, a typical metal refrigerator 7704 with its own outlet 7705, an opening 7702 to another room, another window 7703 in the other room, and part of a wall-mounted flat-screen TV 7709.

Figure 78:
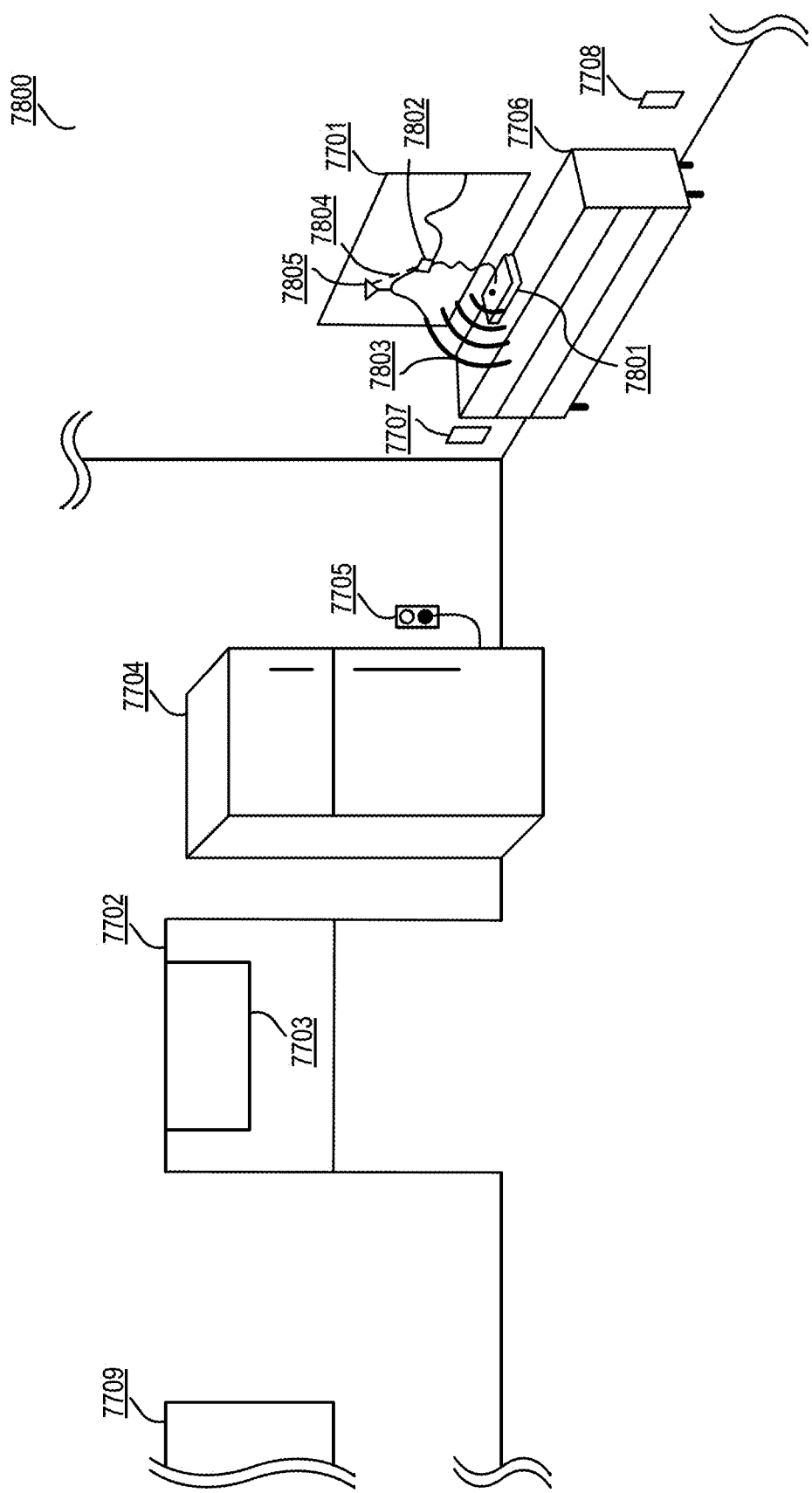
FIG. 78 shows a layout similar to the layout shown in FIG. 77, with the addition of a router or similar device.

FIG. 78 shows a layout 7800, similar to layout 7700 shown in FIG. 77. In FIG. 78, repeater or router or similar device 7801 is mounted or placed on chest 7706, with antenna 7802 that can easily receive signals from transmitter station 7805 on the hill visible from window 7701, as indicated by uninterrupted radio link 7804. Device 7801, hereinafter referred to as a router, can transfer signals from one spectrum to another, for example from 5G into a 4G or a Wi-Fi local cell. Router 7801 can then send inside the apartment different frequency signals for different devices, such as, for example, Wi-Fi signal 7803, which can easily penetrate interior walls, unlike a 5G signal, which has difficulty penetrating typical interior walls. A 5G signal has difficulty penetrating walls because it is on a very high frequency, akin to the frequency of light, which can penetrate only very thin, translucent material. Signal 7801 could link into an existing Wi-Fi infrastructure, or it could connect with more secure Wi-Fi routers, thus being transmitted into every corner of the residence. Additional router stations, while they could be installed, are not shown for purposes of clarity and simplicity.

Figure 79:
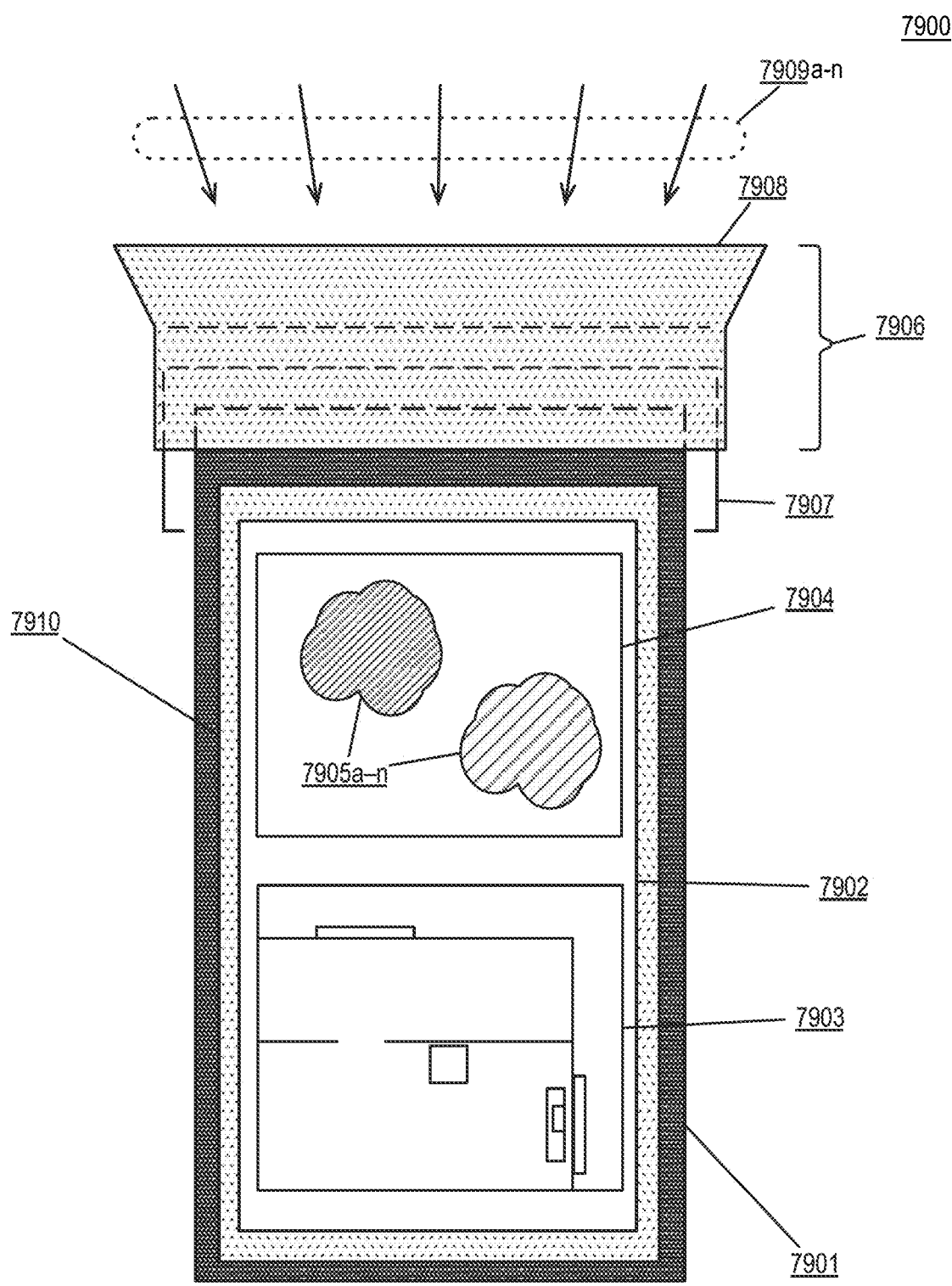
FIG. 79 shows an exemplary means that can help an unskilled user to find the best location for a router station and its antenna.

FIG. 79 shows an exemplary means 7900 that can help an unskilled user to find the best location for such a station and its antenna, according to one aspect of the system and method disclosed herein. Snapped on to ordinary "smart" telephone 7901 is a special adaptor 7906. In this case, adaptor 7906 snaps onto the top of the telephone; depending on the model of telephone, the adaptor could snap onto the bottom or some other location, based on the location in the phone of its antenna. In most such phones, the antenna is not externally visible, but these antenna locations are known and can be documented. Additional features of the adaptor may include, for example, funnel 7908 to concentrate signals 7909a-n radiated from the signal tower, and a snap-on or mounting feature 7907, such as, for example, an adhesive or an elastic band, or some other feature by which the adaptor can be attached or slipped on or otherwise mounted onto the phone.

Application 7910 running in phone 7901 displays screen images, such as, in this case, exemplary screen images 7902 and 7904. Within image 7902 is a video image 7903 of the apartment layout such as, for example, layout 7800 shown in FIG. 78. Image 7904 shows signal density areas 7905a-n such as, for example, two high-density areas roughly corresponding to the location of windows in the apartment, the windows being where the 5G signals come in. With the help of adaptor 7906 and application 7910, the user now has a map of his residence and a way to detect the best location for antenna 7802 and the maximum distance from the antenna that he can place router 7801.

Figure 80:
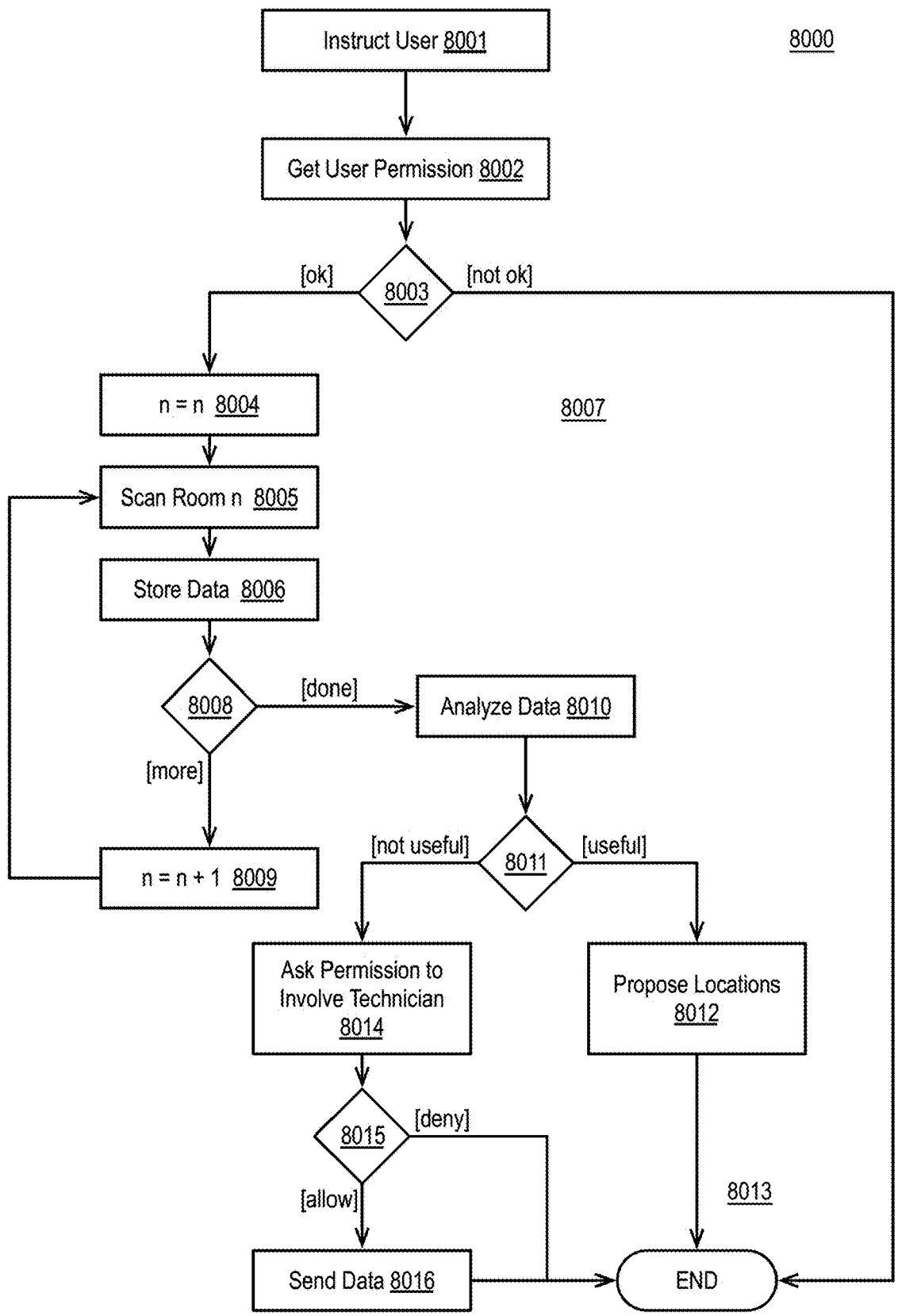
FIG. 80 shows an exemplary process of the software and implementation of its commands for locating a router for a 5G signal.

FIG. 80 shows an exemplary process 8000 of the software and implementation of its commands for locating a router for a 5G signal, according to one aspect of the system and method disclosed herein. In step 8001, the system instructs the user about how to mount the adaptor on the phone, depending on the telephone model. The adaptor and instructions could be supplied to a user in a kit. Some kits could contain multiple adaptors for various phones, in various cases either from different manufacturers or different models from the same manufacturer. Adaptors could be made from any of various materials, many of which may be recyclable; materials may include, but are not limited to, metalized plastic, cardboard, heavy aluminum foil, copper, etc. In step 8002, the system asks the user for permission to proceed with making a video of the residence interior. This step is to protect the user's privacy and to guard against claims against the system owners of privacy violation, because the system will be recording the interior of the user's residence. In step 8003, the user makes his decision to grant permission (+) or not (−). Upon being granted permission, the process moves to step 8004. If the user does not grant permission, the system moves to step 8013, where the process terminates.

In step 8004, the system sets a counter to 1, indicating room 1, and then in step 8005 the system instructs the user to move around the first room so the phone can record a video of the entire room and its furnishings, and also record signal strength in various parts of the room. All this data is stored in database 8007, which can reside in the phone and, optionally, may be uploaded to some other remote data storage unit. In step 8008, the system asks the user, after recording information about the first room, if the residence has another room. If yes (+) the system increments its room counter in step 8009 and loops back to step 8005. The system continues to cycle through step 8005 to 8008 until the user indicates no more rooms (−). Then the system moves to step 8010, where the system analyzes the data in database 8007. In step 8011, the system decides whether its analysis has resulted in useful information. If yes (+), the system proposes one or more router locations in in step 8012 and then the process terminates in step 8013.

If, in step 8011, the system does not have useful information (−), in step 8014 the system asks the user for permission to share the information in database 8007 with a technician at an online service center. Sharing this information gives the technician permission to view the video of the residence interior so he can suggest router locations. In step 8015, the user may deny permission (−) to contact a technician, in which case the process terminates in step 8013. If, in step 8015, the user gives the system permission to contact a technician (+), then in step 8016 the system sends data to the technician with permission to remotely visit the residence, the technician and the user are put in contact with each other, and the process ends at step 8013.

Figure 81:
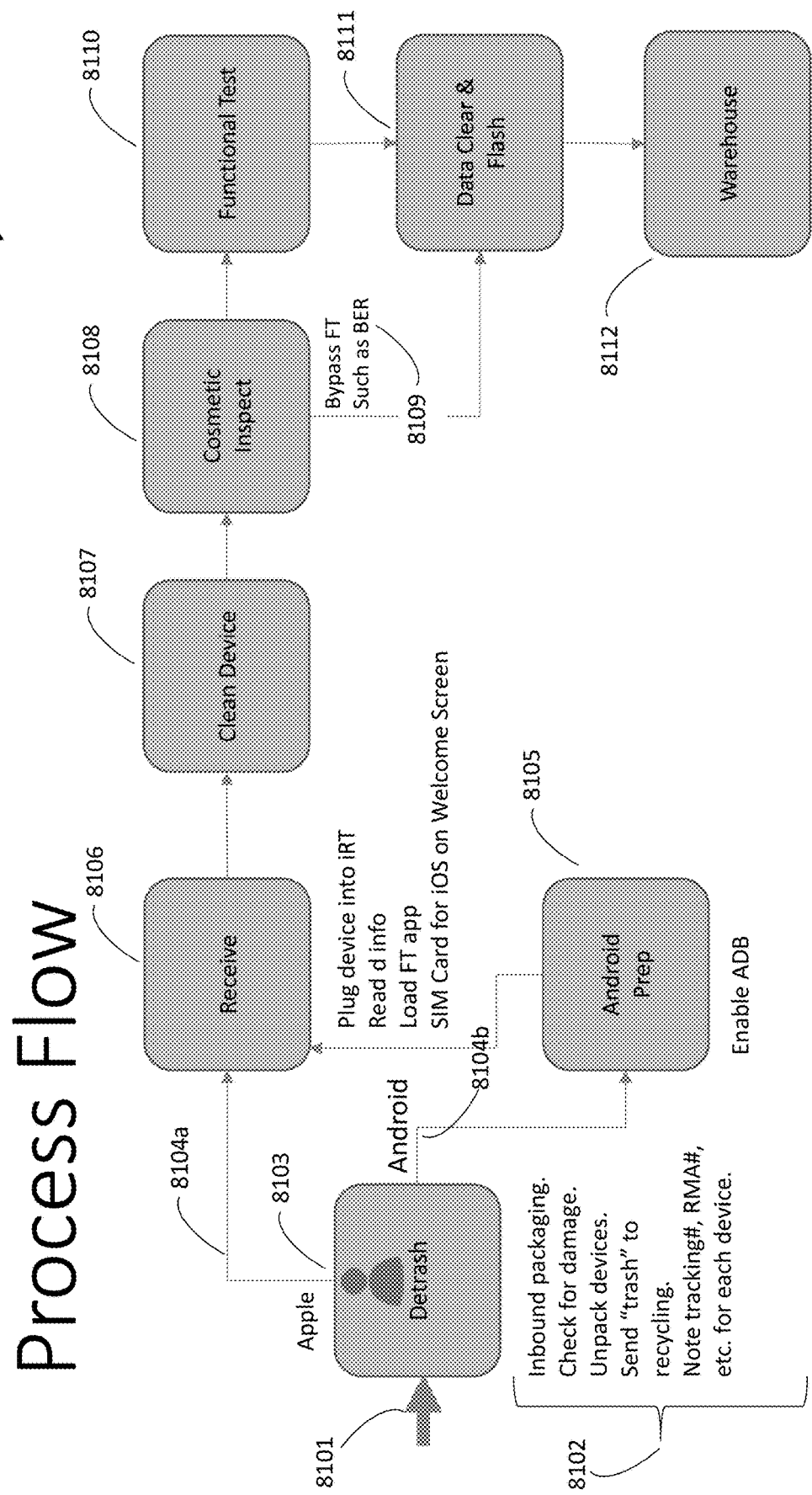
FIG. 81 shows an exemplary process of a typical work flow.

FIG. 81 shows an exemplary process 8100 of a typical work flow, according to one aspect of the system and method disclosed herein.

At step 8101 devices come in from any of various acquisition sources. The types of sources are not intended to limit the disclosed embodiments. Examples of sources can comprise electronics recycling sources, device resellers, merchants providing buyback services, and any other source that receives electronic devices.

At step 8102 the method executes a "de-trash" process on each device, separating out such extraneous material as cases, stickers, batteries, screen protectors, packaging, packing tape, etc. In the illustrated embodiment, all such material is removed, and any material that can be recycled or otherwise reused is directed to the proper destination. In the illustrated embodiment, reclamation of such "trash" where possible is critical as it is often expensive to simply discard such trash, and in some cases and localities, discarding recyclable material is illegal and subject to fines and/or other civil penalties. Then device identifiers, including a tracking number and RMA number are recorded, for example by data entry or scanning into the receiving system software. In the illustrated embodiment, the de-trash procedure can be performed manually. In other embodiments, the de-trash procedure can be performed by an automated device. For example, the various trash components can be visually identified and robotically removed. Alternatively, or in conjunction with the foregoing, after automatically identifying trash components, those containing trash can be routed to a human being for further de-trashing.

At step 8103 the method separates devices, including phones and tablets, into operating system categories Apple® 8104a or Android® 8104b. In one embodiment, step 8103 can be performed by a human being. However, in other embodiments, step 8103 can be automated using computer vision techniques. For example, as devices are passed by a camera device on a conveyor belt or other mechanism, a camera can record an image of the front and/or backside of the device depending on its position. In one embodiment, the method can extract a manufacturer based on past images of known devices. In some embodiments, the dimensions of a device can be detected using image processing techniques which can be used to identify the operating system of the device or, at a minimum, filter the possible matching devices (and operating systems). Alternatively, or in conjunction with the foregoing, the method can use optical character recognition (OCR) to extract textual identifiers from the devices such as brand names, model numbers, serial numbers, etc. As one example, the method can employ image recognition algorithms to identify the presence of an apple graphic and identify the device as an Apple® device.

In the illustrated embodiment, Android® devices undergo additional preparation in step 8105 which can be manually performed or automated. In one embodiment, step 8105 comprises enabling the Android Debug Bridge (ADB) mode to permit access to the device operating system. Alternatively, in the case of Apple® devices a test application must be trusted.

In step 8106, the method plugs a subject device into a reading device that can analyze the device and install appropriate software. In one example shown herein, the reader comprises an information reading tool (iRT) reader, but other, similar reading devices could be used to gain control of the subject device and permit installation of software that can read identifiers of each subject device, such as, make, model, memory, status, any lock status or similar such as FMIP/FMA of OEM specific locking software, etc. Alternatively, or in conjunction with the foregoing, the software can also load a functional test (FT) app into the device that can show information on the device screen, including whether the subject device has a SIM card for iOS®.

In step 8107, the method subjects the mobile device to a washing procedure after the subject device is finished with the reception process and is determined to be fit for reuse. As used herein, a "washing procedure" refers to a cleaning procedure wherein a device (or person) physically scrubs the device free of dirt, glue and spill residue, etc.

In step 8018, robotic devices visually inspect the subject device for quality and defect issues, etc. Depending on the condition of the device, it may skip a final functional test via bypass decision (8109) which determines whether a device is beyond economic repair (BER). Alternatively, the method can continue to perform a functional test (8110) if the device passes the visual inspection. In some embodiments, the robotic devices in step 8108 may comprise one more or more robotic arms for manipulating a device and one or more visual inspection devices (e.g., camera/sensor devices) that can automatically classify images of devices as containing (or lacking defects).

In step 8110, the method performs a functional test on the device. In this step (8110), robots test all usage aspects of the device, simulating not only software use, but also physical use, such as pressing buttons, touching the screen, etc. As described above, an electrical or air-based device can be used to simulate touch operations on the device. Further, mechanical elements may be used to physically push buttons on the device.

In step 8111, the method clears all test data and flashes the latest operating system and associated software into the device if the system finds that the device is fully functional. In one embodiment, the device is connected to a communications bus and a remote application clears all test data from the device. In other embodiments, an app resident on the mobile phone can be used to clear all test data. Next, a remote device flashes the non-volatile storage of the device with an operating system image. In some embodiments, this operating system image can comprise a factory reset image chosen based on the previously identified operating system of the device. In step 8112, the device is sent to the warehouse to await resale.

Figure 82:
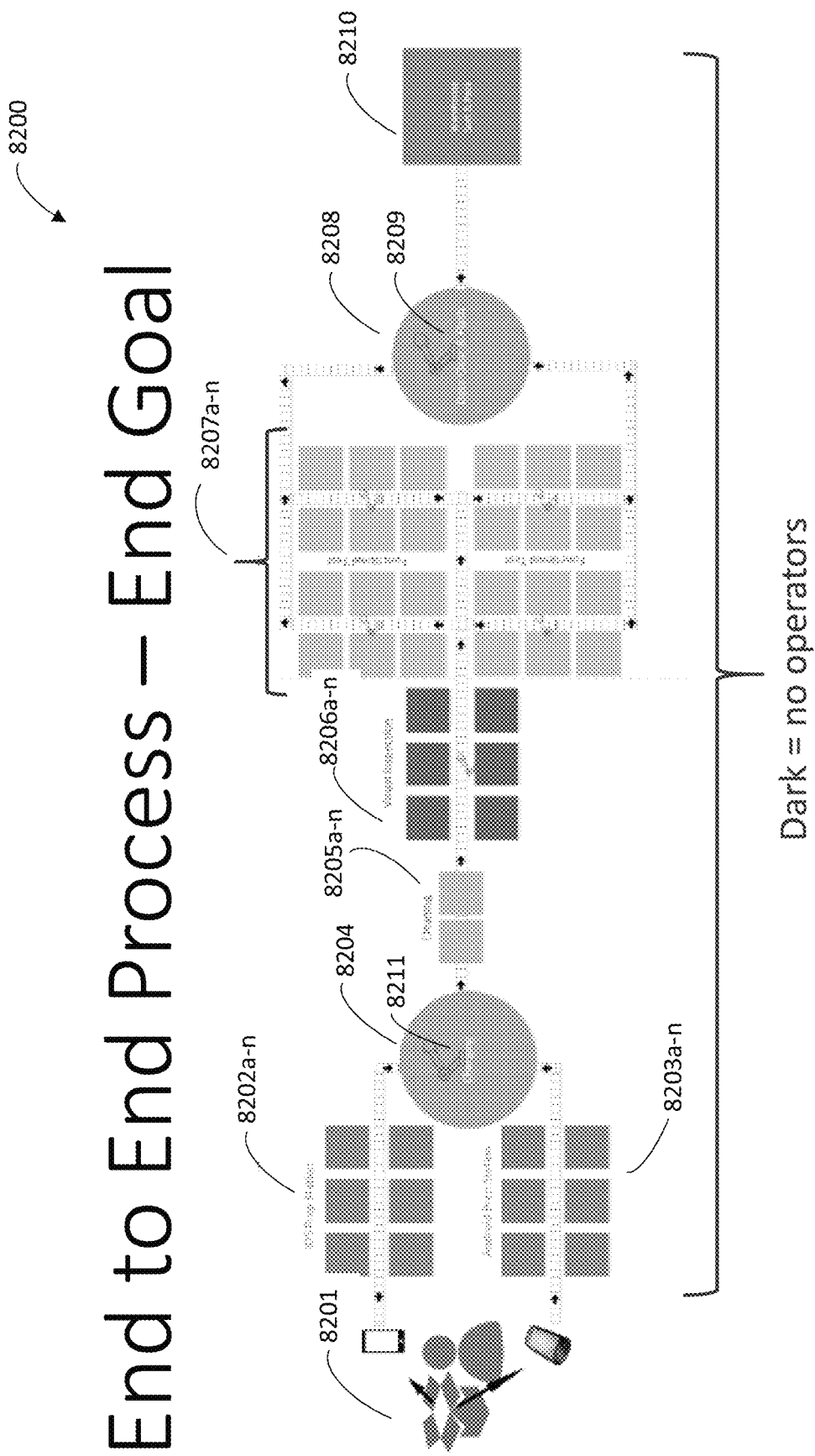
FIG. 82 shows an exemplary process of a typical physical model of the system.

FIG. 82 shows an exemplary process 8200, which is similar to the process discussed in FIG. 81, above, but in this case the example is that of a typical physical model of the system, according to one aspect of the system and method disclosed herein. In step 8201, devices are received and de-trashed, and then separated according to type, with iOS® devices going to stations 8202a-n and Android® devices going to stations 8203a-n. At charging station 8204 robotic arm 8211 takes devices off a conveyor belt and plugs them into and removes them from chargers of station 8204. Once the devices are charged, they go to washing stations 8205a-n, which may comprise multiple stations to handle multiple devices, and which may also comprise stations of various types, including washing, rinsing, and drying, etc. (two shown). After being cleaned, the devices are inspected at stations 8206a-n. More than one inspection station may be needed, because inspection may require from a few seconds to several minutes, and in the latter case, multiple stations may be needed to keep the process moving steadily. At stations 8207a-n, functional testing of the devices occurs. At station 8208 a robotic arm 8209 plugs devices into connectors so the devices may be cleared of testing data and flashed with the latest version of its software. Finally, after devices are fully programmed, robots send them to warehouse 8210.

Figure 83:
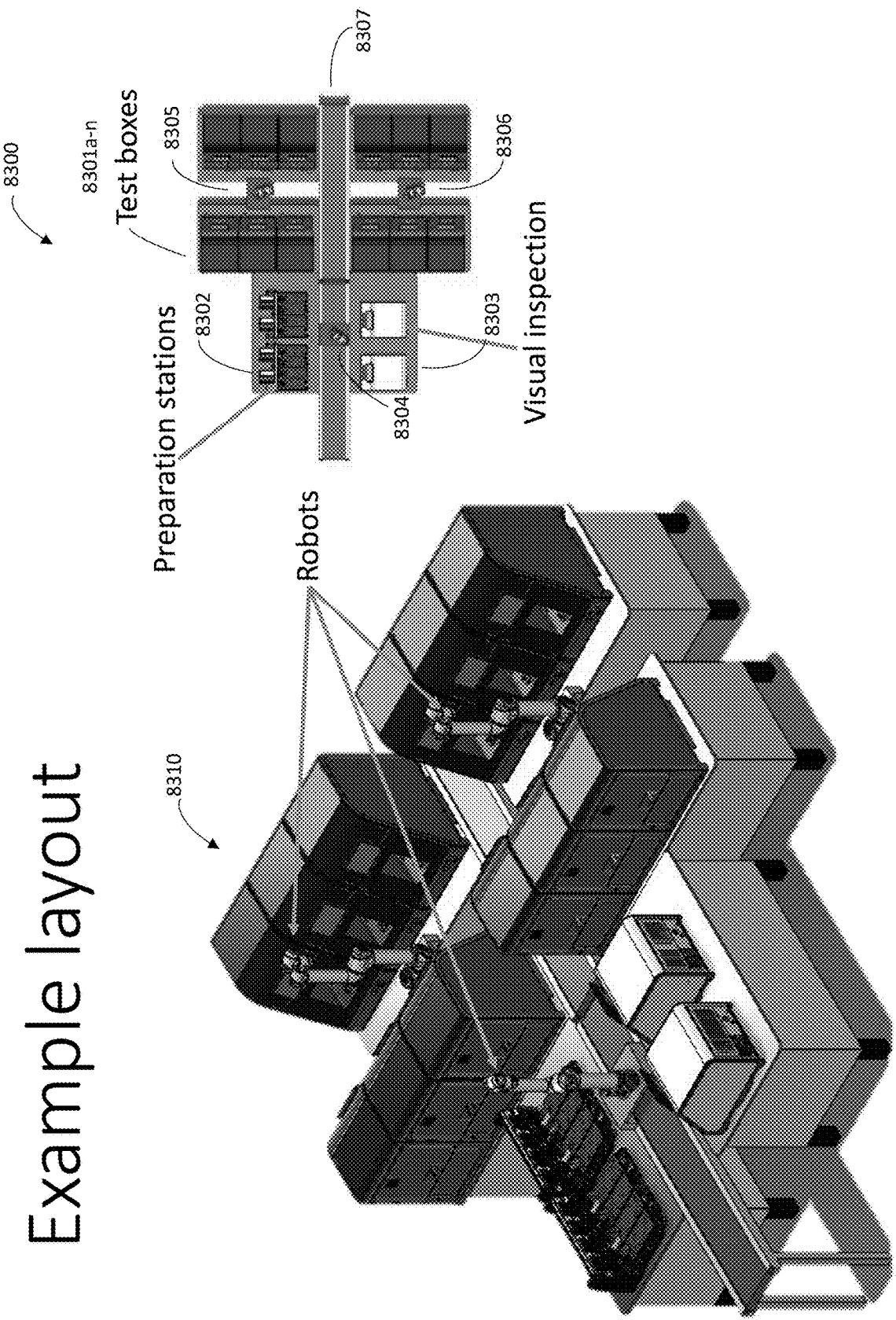
FIG. 83 shows exemplary pseudo-isometric views of a typical physical equipment layout.

FIG. 83 shows exemplary views 8300 and 8310 of a typical physical equipment layout, according to one aspect of the system and method disclosed herein. View 8300 shows an exemplary layout from the top of typical system equipment, including preparation stations 8302, test boxes 8301*a-n*, conveyer belt 8307, robot arms 8304, 8305, and 8306, and visual inspection station 8303. View 8310 presents a top perspective, showing such typical equipment as testing boxes and robot arms.

Various embodiments of the present disclosure may be implemented in computer hardware, firmware, software, and/or combinations thereof. Methods of the present disclosure can be implemented via computer program instructions stored on one or more non-transitory computer-readable storage devices for execution by a processor. Likewise, various processes (or portions thereof) of the present disclosure can be performed by a processor executing computer program instructions. Embodiments of the present disclosure may be implemented via one or more computer programs that are executable on a computer system including at least one processor coupled to receive data and instructions from, and to transmit data and instructions to, a data storage system, at least one input device, and at least one output device. Each computer program can be implemented in any suitable manner, including via a high-level procedural or object-oriented programming language and/or via assembly or machine language. Systems of the present disclosure may include, by way of example, both general and special purpose microprocessors which may retrieve instructions and data to and from various types of volatile and/or non-volatile memory. Computer systems operating in conjunction with the embodiments of the present disclosure may include one or more mass storage devices for storing data files, which may include: magnetic disks, such as internal hard disks and removable disks; magneto-optical disks; and optical disks. Storage devices suitable for tangibly embodying computer program instructions and data (also called the "non-transitory computer-readable storage media") include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

In some cases, a system for testing and reprogramming mobile communication devices, such as, for example, cellular phone, tablets, etc., may enable parallel connection of a large number of devices via, typically, USB cables, to connectors in the system box, with indicator lights for communicating to an operator the device status and readiness. Further, in such a system only one step may be required to charge the device to an operational state, without operator interaction.

In other cases, a system for testing and reprogramming mobile communication devices may enable parallel connection of a large number of devices to connectors in the system box, with the system using different sequences to test, verify, securely delete content, and reprogram devices. Further, the system analyzes problems such as, for example, bricked devices, dead batteries, and unprogrammable and unstable devices, and collects information about of the quality of devices based on their different sources. In addition, the system may collect data about the efficiency of the operators connecting and removing devices at any one system box, or about operators at multiple systems in one testing facility. The system may then communicate its collected data to a central server.

In some cases, a system may include with a computer containing software for processing both data and programs on mobile devices. Further, the system may perform a quick evaluation of said mobile device and where feasible, may determine the current commercial value of the mobile device based on make, model, physical condition and other parameters associated with device. Additionally the system includes a tower containing a number of lockable compartments connected to the computer. Each compartment can receive a mobile device, and an application on a mobile device, such as a tablet, of an authorized user can lock the compartment so the device in the compartment can be tested for certain parameters. After a successful test, the system makes an offer to the device owner, and upon legally binding electronic acceptance of the offer, the system locks the drawer of the owner's device and back up into secure local storage the owner's data as needed, with determination of the need based on questions presented to the owner during or immediately after the presentation and/or acceptance of the offer. Then the owner's address book is processed, so it is available as quickly as possible so the owner can then transfer it to a new device without undue delay. Subsequently, large bulk data can be transferred in a throttled mode, on a first-come, first-serve manner. Additionally, the system makes provisions for the onward disposition logistics of the owner's device, based on information supplied by or in conjunction with the entity taking possession of the device.

In some cases, a system for migration of computer content, including but not limited to applications and various types of data, from one computing device, such as, for example, a smartphone, a phablet, a tablet, or other, similar device, and from cloud services to another device and other cloud services may create a map showing what content needs to be migrated, and where to, so that that the content can be transferred to the new device and/or one or more cloud services upon activation of the new device.

In some cases, a system may simulate a human user touching the screen of a device, such as a cell phone or similar, that has a capacitive touch screen, with the device positioned on a touch simulator that has a matrix of individually addressable, electric structures based on an LCD display. In such a system, a camera may photograph the device screen and transmit the resulting images to a computer, where the interactions of the touch simulator and the device are recorded. Additionally, software on a computer can create scripts for future, similar interactions, using the stored images to test similar devices for functionality. Alternatively, the system may simulate human touch on the device screen through a matrix of individually addressable, XY resolved electric structures based on inflatable tubes.

In some cases, a system for reviewing returned smartphones and other computing devices may employ a device-specific protocol for a multistep procedure, with as many of the steps as possible removed from personal judgment. A matching application on the device would support certain steps of the operator and can fill in certain responses. This system may note in a log the steps that were performed without the operator's help, but the operator may override the system with a note and acknowledgement. Further, such a system may require an operator to make a deliberate choice of various status messages when starting to evaluate such a device, starting at a neutral state and actively moving a status report to a yes or a no. In many cases, a script may perform different sets of tests for different devices based on the system owner's preferences.

In some cases, a mobile device such as a smart phone or smart computing device may be connected to a network, and an operating system, an application for communicating to other devices, and applications are installed. This device may be a wireless device, a smart phone or a tablet, a mobile communication device, and/or a wearable device; and it may be connected to a wireless communication network. These applications may enable a user to pursue additional interests, including but not limited to listening to and/or creating music, viewing and/or editing documents, viewing and/or creating videos, consuming and/or creating video games, participating in social networks, etc. on the device. Additionally, software may be installed to follow user activities on the device and to catalogue and record these activities. Further, based on activities, device accessories used in the activities, and on service plans to which the user has subscribed, a user profile is created. The system may then compare this user profile to other user profiles that match at least in one of the groups of accessories, activities, and service plans and then determines whether the user could benefit from adding one of the other groups that other users have. Thus the system may determine whether an upsell opportunity exists, in which case an offer for additional products and/or services that would enable a user to take advantage of additional offerings to make better use of his device and/or services may be extended to the user.

In some cases, an attachment to a mobile device, such as a smart cell phone, may enable a 5G signal to be detected and scanned. This signal and other environmental information, including but not limited to view, GPS, Wi-Fi and other radio signals, etc., may be recorded concurrently to create a map of the environment that could be stored so an application could calculate the optimal location for a gateway type router. Thus a 5G signal from the outside could be fed securely and reliably to all rooms of a unit in a building, enabling the use of 5G communication devices inside buildings with poor or no reception, in some cases by translating the communication to an alternate band such as 4G or Wi-Fi. Such a scan could include also immediate adjacent areas outside a unit. This software could be the primary method to determine the optimal location for such a router. Additionally, the data may be sent to a technician for further review leading to determination of a preferred location, and in some cases, the user's permission must be obtained to share the data before sending the data to the technician for review.

In some cases, a system for handling reverse logistics of mobile devices may, after unpacking a device, check that device for a sufficient charge, and if a sufficient charge is not found, charge the device. Then based on its software platform software, the system installs software that reads and displays on the device screen key parameters such as model, make, memory size, OS version, wipe status, battery status and health, etc. The system may then send that information over the device's network to one or more processors in the system for further processing and control. If the device is judged worthy of further processing, it is cleaned and further prepared for data removal, testing, and reprogramming by robotic devices. Then a robotic visual inspection grades the device, with devices below a certain threshold being removed from the process, to be used as either low-end devices or for spare parts; while devices that successfully pass all tests are reprogrammed and then stored for resale.

Various embodiments of the present disclosure may be implemented in computer hardware, firmware, software, and/or combinations thereof. Methods of the present disclosure can be implemented via a computer program instructions stored on one or more non-transitory computer-readable storage devices for execution by a processor. Likewise, various processes (or portions thereof) of the present disclosure can be performed by a processor executing computer program instructions. Embodiments of the present disclosure may be implemented via one or more computer programs that are executable on a computer system including at least one processor coupled to receive data and instructions from, and to transmit data and instructions to, a data storage system, at least one input device, and at least one output device. Each computer program can be implemented in any suitable manner, including via a high-level procedural or object-oriented programming language and/or via assembly or machine language. Systems of the present disclosure may include, by way of example, both general and special purpose microprocessors which may retrieve instructions and data to and from various types of volatile and/or non-volatile memory. Computer systems operating in conjunction with the embodiments of the present disclosure may include one or more mass storage devices for storing data files, which may include: magnetic disks, such as internal hard disks and removable disks; magneto-optical disks; and optical disks. Storage devices suitable for tangibly embodying computer program instructions and data (also called the "non-transitory computer-readable storage media") include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
    connecting a mobile device to a reading device;
    installing, via the reading device, one or more software applications on the mobile device, the one or more software application operable to read one or more identifiers from the mobile device and perform at least one test on the mobile device when executed;
    determining a type of the mobile device;
    prior to the installing of the one or more software applications, physically grouping the mobile device with additional mobile devices that have the same type by moving the mobile device to a workstation associated with the type;
    performing a physical cleaning of the mobile device;
    visually inspecting the mobile device and classifying the physical condition of the mobile device;
    performing a functional test on the mobile device upon determining that the physical condition of the mobile device is free of defects, the functional test including simulating physical use of the device; and
    based on the functional test of the mobile device, determining that the mobile device is fully functional, removing all test data from the mobile device after performing the functional test and flashing the mobile device with a new operating system image.

2. The method of claim 1, further comprising categorizing the mobile device based on a manufacturer of the mobile device.

3. The method of claim 2, the categorizing the mobile device based on the manufacturer of the mobile device comprising capturing an image of the mobile device and comparing the image to a library of mobile device images.

4. The method of claim 2, the categorizing the mobile device based on the manufacturer of the mobile device comprising capturing an image of the mobile device and identifying a textual identifier present on the mobile device.

5. The method of claim 1, further comprising: enabling a debug bridge mode on the mobile device upon detecting that a first operating system is installed on the mobile device.

6. The method of claim 1, further comprising installing one or more functional testing applications on the mobile device.

7. The method of claim 1, wherein the type of the mobile device is determined by passing the mobile device by a camera.

8. The method of claim 7, wherein the type of the mobile device is further determined by determining a manufacture of the mobile device based on a comparison of an image of the mobile device captured by the camera with known images of other mobile devices.

9. The method of claim 7, wherein the type of the mobile device is further determined based on performing an optical character recognition (OCR) process to extract a textual identifier from an image of the mobile device captured by the camera.

10. The method of claim 1, wherein the type of the mobile device is determined by identifying an operating system installed on the mobile device.

11. A non-transitory computer-readable storage medium for tangibly storing computer program instructions capable of being executed by a computer processor, the computer program instructions defining the steps of:
connecting, via a robotic device, a mobile device to a reading device;
installing, via the reading device, one or more software applications on the mobile device, the one or more software application operable to read one or more identifiers from the mobile device and perform at least one test on the mobile device when executed;
determining, by the robotic device, a type of the mobile device;
prior to the installing of the one or more software applications, physically grouping, by the robotic device, the mobile device with additional mobile devices that have the same type by moving the mobile device to a workstation associated with the type;
performing, by the robotic device, a physical cleaning of the mobile device;
visually inspecting, by the robotic device, the mobile device and classifying the physical condition of the mobile device;
performing, by the robotic device, a functional test on the mobile device upon determining that the physical condition of the mobile device is free of defects, the functional test including simulating physical use of the device; and
based on the functional test of the mobile device, determining that the mobile device is fully functional, connecting, via the robotic device, the mobile device to a communications bus and removing all test data from the mobile device after performing the functional test and flashing the mobile device with a new operating system image.

12. The non-transitory computer-readable storage medium of claim 11, the instructions further defining the step of categorizing the mobile device based on a manufacturer of the mobile device.

13. The non-transitory computer-readable storage medium of claim 12, the categorizing the mobile device based on the manufacturer of the mobile device comprising capturing an image of the mobile device and comparing the image to a library of mobile device images.

14. The non-transitory computer-readable storage medium of claim 12, the categorizing the mobile device based on the manufacturer of the mobile device comprising capturing an image of the mobile device and identifying a textual identifier present on the mobile device.

15. The non-transitory computer-readable storage medium of claim 11, the instructions further defining the step of enabling a debug bridge mode on the mobile device upon detecting that a first operating system is installed on the mobile device.

16. The non-transitory computer-readable storage medium of claim 11, the instructions further defining the step of installing one or more functional testing applications on the mobile device.

17. An apparatus comprising:
one or more robotic arms;
a processor; and
a storage medium for tangibly storing thereon program logic for execution by the processor, the stored program logic comprising instructions that, when executed by the processor, cause the processor to perform the operations of:
connecting a mobile device to a reading device;
installing, via the reading device, one or more software applications on the mobile device, the one or more software application operable to read one or more identifiers from the mobile device and perform at least one test on the mobile device when executed;
determining a type of the mobile device;
prior to the installing of the one or more software applications, physically grouping the mobile device with additional mobile devices that have the same type by moving the mobile device to a workstation associated with the type;
performing a physical cleaning of the mobile device;
visually inspecting the mobile device and classifying the physical condition of the mobile device;
performing, via at least one of the robotic arms, a functional test on the mobile device upon determining that the physical condition of the mobile device is free of defects, the functional test including simulating physical use of the device; and
based on the functional test of the mobile device, determining that the mobile device is fully functional, connecting, via at least one of the robotic arms, the mobile device to a communications bus and removing all test data from the mobile device after performing the functional test and flashing the mobile device with a new operating system image.

18. The apparatus of claim 17, the operations further comprising categorizing the mobile device based on a manufacturer of the mobile device.

19. The apparatus of claim 18, the categorizing the mobile device based on the manufacturer of the mobile device comprising capturing an image of the mobile device and comparing the image to a library of mobile device images.

20. The apparatus of claim 18, the categorizing the mobile device based on the manufacturer of the mobile device comprising capturing an image of the mobile device and identifying a textual identifier present on the mobile device.

21. The apparatus of claim 17, the operations further comprising: enabling a debug bridge mode on the mobile device upon detecting that a first operating system is installed on the mobile device.

22. The apparatus of claim 17, the operations further comprising installing one or more functional testing applications on the mobile device.

* * * * *